(12) United States Patent
Haines et al.

(10) Patent No.: US 9,067,349 B2
(45) Date of Patent: Jun. 30, 2015

(54) APPARATUS AND METHOD FOR MANUFACTURING PRODUCTS

(75) Inventors: Roderick Andrew Haines, Cambridge (GB); Stuart Mark Banister, Peterborough (GB); Finbarr Charles Ronald Williamson, London (GB); Simon Philip Jelley, Cambridge (GB); Andrew Christopher Bufton, Birmingham (GB); Gavin Bown, Birmingham (GB)

(73) Assignee: Intercontinental Great Brands LLC, East Hanover, NJ (US)

( * ) Notice: Subject to any disclaimer, the term of this patent is extended or adjusted under 35 U.S.C. 154(b) by 129 days.

(21) Appl. No.: 13/580,981

(22) PCT Filed: Feb. 25, 2011

(86) PCT No.: PCT/GB2011/050381
§ 371 (c)(1),
(2), (4) Date: Nov. 13, 2012

(87) PCT Pub. No.: WO2011/104564
PCT Pub. Date: Sep. 1, 2011

(65) Prior Publication Data
US 2013/0216674 A1 Aug. 22, 2013

(30) Foreign Application Priority Data

Feb. 26, 2010 (GB) .................................. 1003288.6

(51) Int. Cl.
*A23P 1/12* (2006.01)
*B29C 47/08* (2006.01)
(Continued)

(52) U.S. Cl.
CPC ........... *B29C 47/0876* (2013.01); *A21C 11/163* (2013.01); *A23G 1/0059* (2013.01);
(Continued)

(58) Field of Classification Search
CPC . A23G 1/0056; A23G 1/0059; A23G 3/0021;
A23G 3/0242; A23G 3/0247; A23G 3/2015;
A23G 3/0068; A23G 3/0023; A23P 1/12;
A23P 1/125; A21C 11/163; B29C 47/0876;
A23L 1/0079
USPC .................. 426/631, 660, 103, 516; 425/132,
425/133.1, 462, 465–467
See application file for complete search history.

(56) References Cited

U.S. PATENT DOCUMENTS 3,122,789 A * 3/1964 Coffee .......................... 425/466
3,922,353 A 11/1975 Bernotavicz
(Continued)

FOREIGN PATENT DOCUMENTS

| | | |
|---|---|---|
| CN | 101355881 A | 1/2009 |
| EP | 0 232 156 A2 | 8/1987 |
| WO | 2007/056685 A2 | 5/2007 |

*Primary Examiner* — Drew Becker
(74) *Attorney, Agent, or Firm* — Hoffmann & Baron, LLP

(57) ABSTRACT

A method of manufacturing products comprising an outer casing of a first material (12) and containing at least one chamber (18) filled with a second material (14) comprises extruding the first material through a die (10) to form an extrudate body (16) and delivering the second material through at least one fluid outlet (22) in the die to form the least one filled chamber. The extrusion process is varied periodically and momentarily to produce sections (30) of extrudate body having no filled chamber. In one embodiment, the flow of the second material (14) is periodically reduced to form the unfilled sections. The flow of the second material (14) may be reduced by increasing the volume of a supply path for the second material upstream from the die (10). Apparatus for carrying out the method is also disclosed. The method and apparatus are particularly adapted for producing food, and especially confectionery, products.

8 Claims, 22 Drawing Sheets

(51) Int. Cl.
  *A23G 1/00* (2006.01)
  *A23G 3/34* (2006.01)
  *A23G 3/02* (2006.01)
  *A23G 3/20* (2006.01)
  *A23L 1/00* (2006.01)
  *A23G 7/00* (2006.01)
  *B29C 47/92* (2006.01)
  *B29C 47/00* (2006.01)
  *A21C 11/16* (2006.01)

(52) U.S. Cl.
  CPC ............ *A23G3/0023* (2013.01); *A23G 3/0247* (2013.01); *A23P 1/12* (2013.01); *A23G 1/0056* (2013.01); *A23G 3/0021* (2013.01); *A23G 3/0068* (2013.01); *A23G 3/2015* (2013.01); *A23L 1/0079* (2013.01); *A23P 1/125* (2013.01); *A23G 7/0068* (2013.01); *B29C 47/92* (2013.01); *B29C 47/0066* (2013.01); *B29C 2947/92142* (2013.01); *B29C 2947/92619* (2013.01); *B29C 2947/92628* (2013.01); *B29C 2947/92638* (2013.01)

(56) References Cited

U.S. PATENT DOCUMENTS

| | | | |
|---|---|---|---|
| 4,442,070 A * | 4/1984 | Proksa et al. | 422/133 |
| 4,659,580 A * | 4/1987 | Svengren | 426/516 |
| 4,834,635 A * | 5/1989 | Groen | 425/72.1 |
| 4,835,000 A * | 5/1989 | Kehoe | 426/516 |
| 5,209,156 A * | 5/1993 | Lombard | 99/450.1 |
| 5,718,926 A | 2/1998 | Dambrine et al. | |
| 5,788,998 A * | 8/1998 | Gross | 425/145 |
| 7,090,797 B2 * | 8/2006 | Kirjavainen | 264/167 |
| 2003/0206990 A1 * | 11/2003 | Edmondson et al. | 425/466 |
| 2005/0025879 A1 | 2/2005 | Jury | |
| 2005/0260317 A1 * | 11/2005 | Cotten et al. | 426/516 |
| 2007/0087100 A1 * | 4/2007 | Fornaguera | 426/516 |
| 2008/0220119 A1 * | 9/2008 | Fornaguera et al. | 426/5 |
| 2008/0268120 A1 * | 10/2008 | Flambeau et al. | 426/516 |
| 2010/0129482 A1 * | 5/2010 | Barnvos et al. | 425/132 |

\* cited by examiner

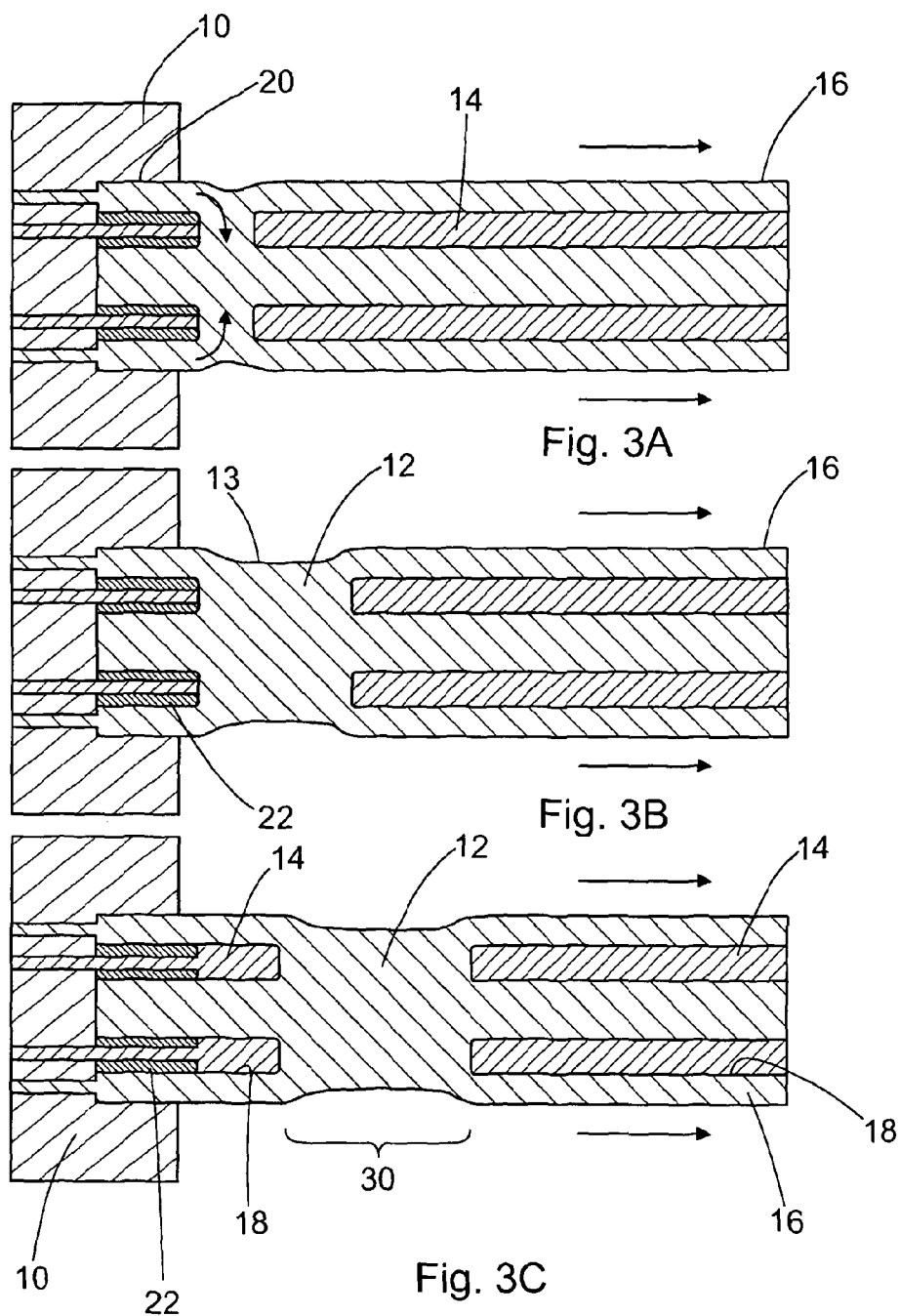

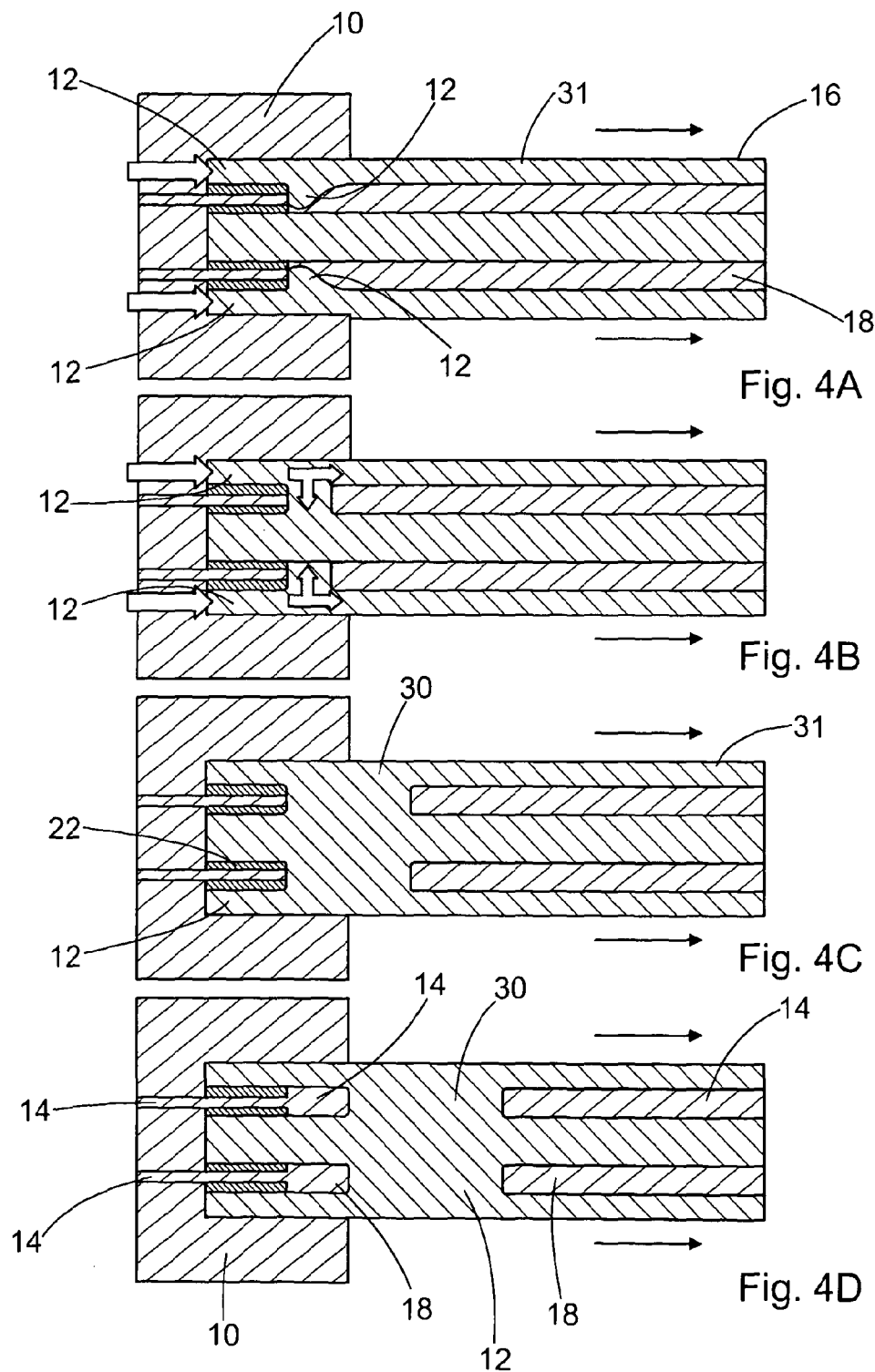

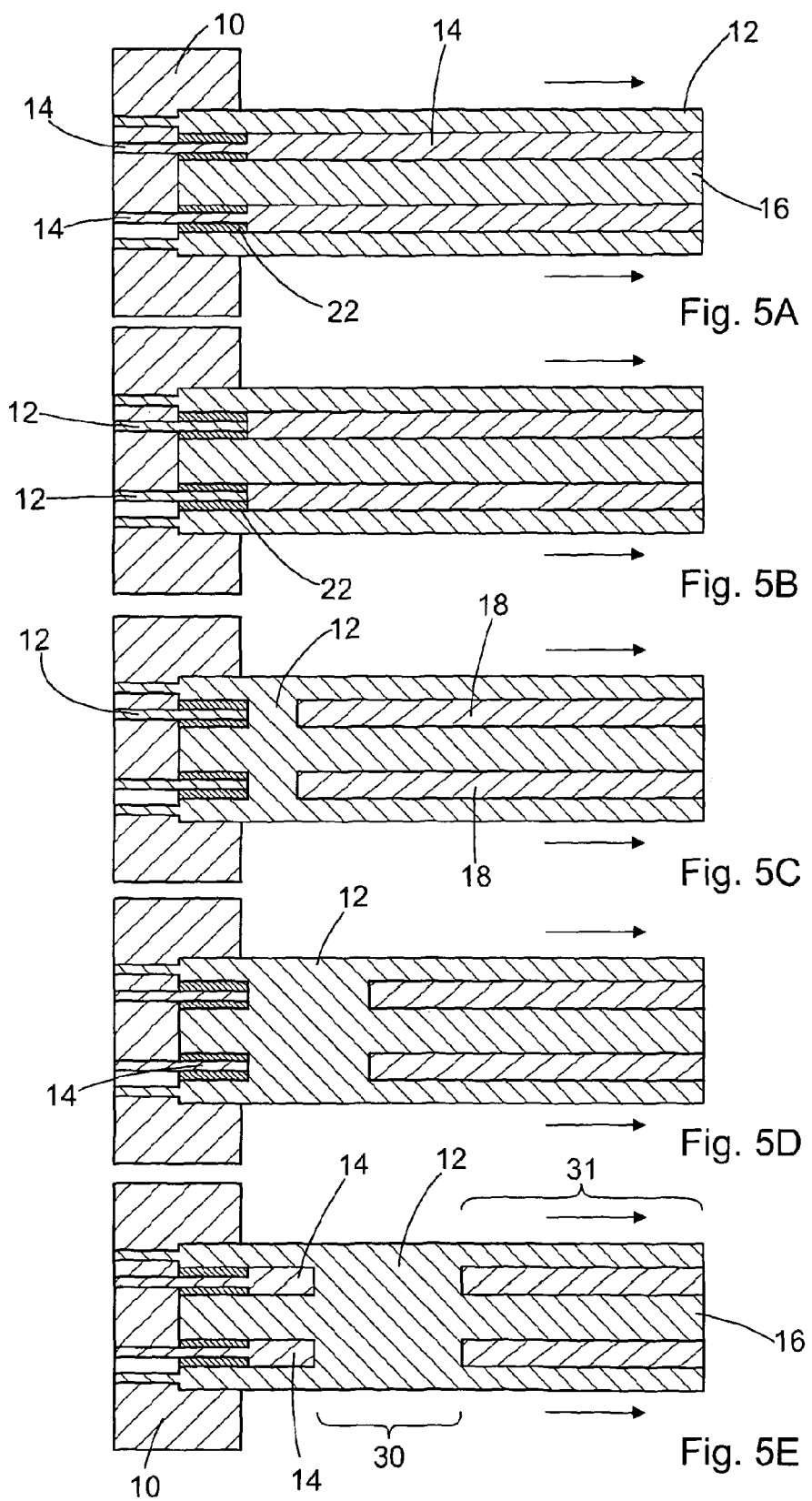

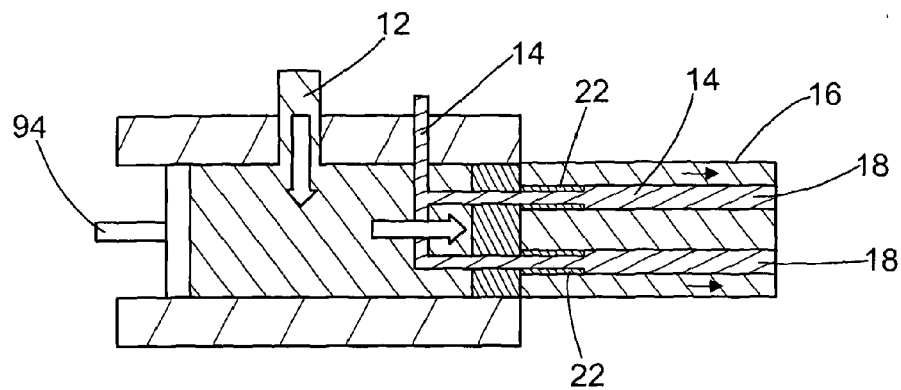
Fig. 16A
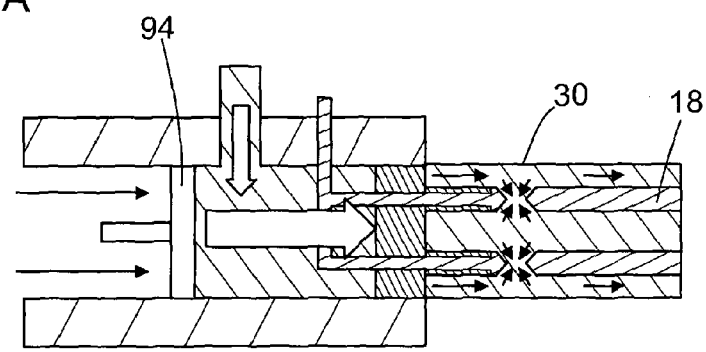
Fig. 16B
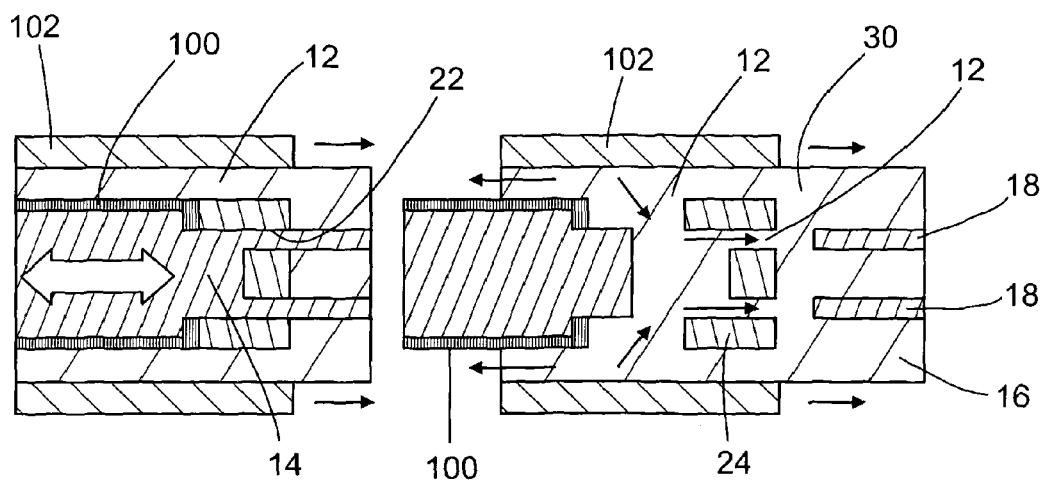
Fig. 17A                    Fig. 17B

APPARATUS AND METHOD FOR MANUFACTURING PRODUCTS

CROSS-REFERENCE TO RELATED APPLICATIONS

This application is the National Stage of International Application No. PCT/GB2011/050381, which designates the U.S., filed Feb. 25, 2011, which claims the benefit of Great Britain Application No. GB 1003288.6 filed Feb. 26, 2010, the contents of which are incorporated by reference herein.

TECHNICAL FIELD OF THE INVENTION

This invention relates to apparatus and methods for producing filled products by means of extrusion. This invention is particularly, though not exclusively, related to means for extruding filled food products and especially filled confectionery products such as chocolate bars.

BACKGROUND TO THE INVENTION

In the field of consumer products, it is desirable to be able to produce products that have an attractive and sometimes unusual appearance that will appeal to consumers. It is also desirable to produce products which have interesting taste and texture combinations that will also appeal to the consumer. This latter requirement has lead to the development of filled products in which a filling is contained in an outer casing formed from a different material.

It is known to produce food products comprising an outer casing made from a first food material which contains a filling of a second food material. A wide variety of food products are produced in this way from a range of food materials. Often, the outer casing will be made from a food material which is substantially solid at normal room temperature (20° C. to 25° C.) and pressure but which may be heated or otherwise processed to place it in a flowable, plastic or clay-like state in order that the material can be shaped. After shaping, the material is allowed to solidify so as to retain the shape and to contain the filling material. A food material of this nature will be referred to herein generally as being "solidifyable" and terms such as "solidifyable material", "solidifyable food material" and "solidifyable confectionery material" should be construed accordingly.

A variety of food materials can be used as fillings, including solidifyable food materials. However, materials which remain in a flowable state at normal room temperature and pressure are often used as fillings. These include, but are not limited to, liquid and semi-liquid fillings, soft centres and more viscous materials that will retain their shape but which are malleable to the touch, such as gums. A food material which remains in a flowable state at room temperature will be referred to herein generally as being "flowable" and terms such as "flowable material", "flowable food material and "flowable confectionery material" should be construed accordingly. The term 'flowable" as used herein may include solutions, suspensions, emulsions, semi-solids, creams, gels, etc, that may not be completely liquid, within its meaning. As used herein, the term 'liquid' refers to substances which will readily flow or maintain fluid properties at room temperature and pressure.

Filled confectionery products are particularly popular and have been produced with casings made from a wide variety confectionery materials including, but not limited to, sugar based candies and fat-containing confectionery materials such as chocolate. Chocolate is a confectionery foodstuff usually formed from one or more components of the cocoa bean. In particular, chocolate is usually formed from solids from cocoa beans, including fats, such as cocoa butter, and a sweetener such as sugar. The taste of the chocolate is typically determined by the quantity and type of fat and sweetener present, as well as the presence of other ingredients such as flavourings. A typical commercial dark chocolate will normally comprise non-fat cocoa solids, fat, sugar and optionally an emulsifier. A typical commercial milk chocolate will normally comprise non-fat cocoa solids, fat, milk solids, sugar and optionally an emulsifier. A typical commercial white chocolate will normally comprise milk solids, cocoa butter or other fat, sugar and optionally an emulsifier.

Examples of typical materials that have been used as fillings in confectionery products include: liqueurs, honey, toffee, caramel, cream, fondants, praline, fudge, gels, confectionery emulsions, jelly, jam and the like.

Filled confectionery products have been produced in a variety of different shapes and sizes and using various methods. Typically though, confectionery products filled with a flowable confectionery material are produced by moulding, such as shell-moulding or book-moulding, or by so-called "one shot" centre-in-shell depositing.

A convenient method of manufacturing elongate food products is by means of extrusion. In this method, a food material is forced through an extrusion die in a flowable, plastic or clay-like state to produce an extrudate body having a substantially constant cross section. The extrudate body is subsequent is cut into lengths and may be subjected to further processing.

One approach for producing an elongate filled chocolate confectionery product by means of extrusion is disclosed in GB 223,362. In the method described, a tubular casing of chocolate is formed by extrusion. After forming, the tube is cut into lengths and one end of each length is closed. A filling is introduced though the open end of each length before the second end is closed. The apparatus and method described GB 223, 362 is relatively complex, involving several different process steps which must be undertaken to produce the final filled product.

EP 1 166 640 A1 discloses a co-extruded confectionery product in which a fat-containing confectionery material, such as chocolate, is extruded to form a hollow or tubular form surrounding a filling of another confectionery material. However, the method disclosed is only suitable for use where the filling material does not flow when the extrudate body is cut.

Foodstuffs in general tend to be more difficult to extrude than non-foodstuffs and especially plastics and rubbers/elastomers. Handling foodstuffs gives rise to difficulties due in part to need to ensure that they are not contaminated and also that the process itself does not adversely affect the taste and/or texture of the material. For example, whilst many non-food materials can be processed at elevated temperatures, this may not be possible with certain foodstuffs. Food materials may also have non-uniform textures and/or viscosity differences within the same product batch. In contrast, non-food materials can usually be processed prior to extrusion to ensure uniform and consistent texture and/or viscosity. These issues give rise to particular problems when attempting to extrude food materials that are not met when extruding non-food materials. Accordingly, apparatus and methods used to extrude non-food materials such as plastics or rubbers/elastomers are often not suitable for extruding food materials. Extruding chocolate is particularly problematical and is rarely carried out in practice because of its low viscosity when liquid. At elevated temperatures the cocoa butter in chocolate becomes melted and flows easily. If liquid chocolate is extruded it is generally too thin to retain the extruded shape, unlike more viscous materials such as meat or dough. The above problems have meant that other, less efficient, processes such as moulding have to be used where the shape of the product is not suited to manufacture using the known extrusion apparatus and methods or the extruded product has to be subjected to further shaping processes. Attempts to co-extrude confectionery products and other food products with a flowable filling have proven particularly difficult because there is a tendency for the filling material to leak from the ends when the extrudate body is cut. Even where the filling material is not flowable, the results of co-extrusion are not always satisfactory as the filling material is visible at the ends of the product. Where this is not desirable, the product must be subjected to further processing to apply a coating over, or to otherwise cover, the cut ends.

Products other than food products can also be produced by means of co-extrusion to have an outer casing made from a first material which contains a filling of a second material and similar problems to those discussed above arise, particularly where the second material is a flowable material.

There is a need then for improved methods and apparatus for producing filled products which overcome, or at least mitigate, some or all of the limitations of the previously known apparatus and methods.

There is in particular a need for improved methods and apparatus for producing filled food and more especially filled confectionery product which overcome, or at least mitigates, some or all of the limitations of the previously known apparatus and methods.

SUMMARY OF THE INVENTION

In accordance with a first aspect of the invention, there is provided a method of manufacturing confectionery products, each product comprising an outer casing of a first confectionery material and containing at least one chamber filled with a second confectionery material, the method comprising extruding the first material through a die to form an extrudate body and delivering the second material through at least one fluid outlet in the die to form at least one chamber filled with the second material within the extrudate body, wherein the method comprises periodically and momentarily varying the extrusion process to produce a section of extrudate body having no chamber filled with the second material.

Use of the method in accordance with the first embodiment of the invention enables a filled confectionery product having longitudinal end cap regions which generally match the external appearance of the sides of the product and/or which seal the ends of the internal chamber to be produced by means of extrusion without necessarily having to undertake additional process steps to cover and/or seal the ends.

For the avoidance of doubt, the term "periodically and momentarily" as used herein should be understood as referring to something that occurs at, usually regular, intervals and for a limited period of time. Thus in the method according to the first aspect of the invention, the manufacturing process can be considered a multi-phase process in which during one phase, which can be referred to as a filling phase, the apparatus is configured to extrude a length of extrudate body containing a filled chamber (a filled section) and which during in a further phase, which can be referred to as a non-filling phase, the apparatus is configured to extrude a length of extrudate body in which there are no filled chambers (an intermediate section), the process repeatedly alternating between the filling and non-filling phases. The length of time spent in each phase determines the overall length of the final product, the length of the intermediate sections and the length of the filled sections. It is expected that in most applications the filling phase will be longer than the non-filling phase so that the filled sections are longer than the intermediate sections. The process need not be constant during each of the filling and non-filling phases and may be subject to variations within each phase in order to create additional extrusion effects on the product. For example, the flow rates of the first and/or second materials may be varied during the filling phase so as to vary the cross-sectional profile of the product whilst still producing filled chambers.

In a first embodiment, the method of the first aspect of the invention is carried out using apparatus comprising an extrusion die defining an extrusion aperture and at least one fluid outlet within the die, the apparatus defining a first material supply path along which the first material flows to the die and a second material supply path along which the second material flows to the at least one fluid outlet, and the step of periodically and momentarily varying the extrusion process to produce a section of extrudate body having no chamber filled with the second material comprises periodically and momentarily increasing the volume of the second material supply path to temporally reduce the flow of the second material into the extrudate body from the at least one fluid outlet.

The method according to the first embodiment of the first aspect of the invention, or according to the second aspect of the invention as set out below, may comprise increasing the volume of the second material supply path so as to substantially stop the flow of the second material through the at least one fluid outlet in order to produce an unfilled section of the extrudate body. The volume of the second material supply path may be increased rapidly so as to abruptly stem the flow of the second material from the at least one fluid outlet into the extrudate body. The method may comprise increasing the volume of the second material supply path rapidly so as draw or suck back the second material from within the fluid outlet into the second material supply path. In this embodiment, the method also comprises subsequently decreasing the volume of the second material supply path to recommence the flow of the second material through the at least one fluid outlet into the extrudate body.

The method according to the first embodiment of the first aspect of the invention or the second aspect of the invention may also comprise periodically and momentarily increasing or surging the flow of the first material through the die. The flow of the first material may be increased or surged during at least part of the time when the flow of the second material into the extrudate body through the at least one fluid outlet is reduced. The step of periodically and momentarily increasing or surging the flow of the first material through the die may be carried out by periodically and momentarily decreasing the volume of the first material supply path to cause an increased flow of the first material through the die. In which case, the method comprises subsequently increasing the volume of the first material supply path.

For use in the method according to the first embodiment of the first aspect of the invention or the method in accordance with the second aspect of the invention, the apparatus may comprise a movable member at least partially located in the second material supply path and movable between at least a first and a second position to vary the volume of the second material supply path, the arrangement being such that movement of the member in a direction from the first position towards the second position increases the volume of the second material supply path and that movement of the movable member in a direction from the second position towards the first position decreases the volume of the second material supply path, and the method may comprise periodically moving the member in a direction from the first position towards the second position and subsequently moving the member in a direction from the second position towards the first position in order to periodically and momentarily reduce the flow of second material into the extrudate body through the at least one fluid outlet.

For use in the method according to the first embodiment of the first aspect of the invention or the method in accordance with the second aspect of the invention, the apparatus may also comprise a movable member at least partially located in the first material supply path and movable between at least a first position and a second position to vary the volume of the first material supply path, the arrangement being such that movement of the member in a direction from the first position towards the second position decreases the volume of the first material supply path and that movement of the movable member in a direction from the second position towards the first position increases the volume of the first material supply path, in which case, the method may comprise periodically moving the member in a direction from the first position towards the second position and subsequently moving the member in a direction from the second position towards the first position in order to periodically and momentarily increase the flow of the first material through the die.

The method according to the first embodiment of the first aspect of the invention or the method in accordance with the second aspect of the invention, may comprise moving the member in a direction from the first position to the second position at a first average speed and subsequently moving the member in a direction from the second position to the first position at a second average speed which is slower than the first. The method may comprise moving the movable member in second material supply path in a direction from the second position towards the first position rapidly over an initial phase of movement to recommence the flow of the second material into the extrudate body and moving the member at a slower average rate during the remainder of its movement towards the second position.

In one embodiment, a single movable member is partly received in the second material supply path and partly received in the first material supply path, the arrangement being such that movement of the member in a direction from the first position to the second position increases the volume of second material supply path and decreases volume of the first material supply path and vice-versa.

Where the apparatus comprises a movable member in each of the first material supply path and the second material supply path, the method according to the first embodiment of the first aspect of the invention or the second aspect of the invention may comprise independently actuating each of the movable members to independently vary the volumetric flow rates of the first material through the die and of the second material through the at least one fluid outlet. The method may comprise using a programmable control system to independently actuate each of the movable members.

The method according to the first embodiment of the first aspect of the invention or the second aspect of the invention may comprise varying the rate of flow at least one of the first material and the second material during the formation of a filled section of the extrudate body and may comprise maintaining the cross-sectional areas of the extrusion aperture and the at least one fluid outlet constant throughout the extrusion process.

In a second embodiment, the method according to the first aspect of the invention is carried out using apparatus comprising an extrusion die defining an extrusion aperture and at least one fluid outlet, the apparatus defining a first material supply path along which the first material flows to the die and a second material supply path along which the second material flows to the at least one fluid outlet and comprising a second material delivery device for causing the second material to flow along second material supply path from a source to the at least one fluid outlet, and periodically and momentarily varying the extrusion process to produce a section of extrudate body having no chamber filled with the second material comprises operating the second material delivery device so as to cause the second material to flow along the second material supply path to the at least one fluid outlet in a pulsed flow.

In this second embodiment, the method may comprise periodically and momentarily reducing the output of the second material delivery device to pulse the flow of the second material. Where the second material delivery device comprises a pump, the method may comprise periodically and momentarily slowing or stopping the pump to create the pulsed flow of the second material. Alternatively, the second material delivery device may comprise a reciprocal ram configured to drive the second material along the second material supply path to the at least one fluid outlet in a pulsed flow whilst extrusion is taking place. The method may also comprise periodically and momentarily increasing or surging the flow of the first material through the die. The method may comprise periodically and momentarily increasing or surging the flow of the first material through the die at least during at least part of the time when the flow of the second material into the extrudate body through the at least one fluid outlet is reduced.

A third embodiment of the method according to the first aspect of the invention is carried out using apparatus comprising an extrusion die defining an extrusion aperture and at least one fluid outlet, the apparatus defining a first material supply path along which the first material flows to the die and a second material supply path along which the second material flows to the at least one fluid outlet, the at least one fluid outlet being movable within the die, and periodically and momentarily varying the extrusion process to produce a section of extrudate body having no chamber filled with the second material comprises periodically and momentarily moving the at least one fluid outlet whilst extrusion is in progress so as to mix the second and first materials in the extrudate body to produce a section of extrudate body having no chamber filled with the second material. The die may have an outer part and an inner part rotatable about a longitudinal axis of the die relative to the outer part, wherein the least one fluid outlet is defined in the inner part of the die offset from the longitudinal axis, in which case, the step of periodically and momentarily moving the at least one fluid outlet may comprise periodically and momentarily rotating the inner part of the die.

In fourth embodiment, the method according to the first aspect of the invention is carried out using apparatus comprising an extrusion die defining an extrusion aperture and at least one fluid outlet, the apparatus defining a first material supply path along which the first material flows to the die and a second material supply path along which the second material flows to the at least one fluid outlet, and periodically and momentarily varying the extrusion process to produce a section of extrudate body having no chamber filled with the second material comprises deforming the first material in the extrudate body to form a section within the extrudate body in which no chamber filled with the second material is defined in the extrudate body. The fourth embodiment of the method according to the first aspect of the invention may comprise applying pressure to the exterior of the extrudate body to deform the first material radially inwardly. The method may comprise applying a ring of pressurised fluid, such as air to the extrudate body to crimp the body. Alternatively, the method may comprise using a crimp bar to apply pressure to the exterior of the extrudate body. The extrudate body may crimped within, or at a position proximal to, the extrusion die or it may be crimped at a position spaced downstream from the extrusion die. The ring of pressurised fluid may also be used to divide the extrudate body into individual lengths. In a further alternatively, where the at least one fluid outlet is located offset from a central longitudinal axis of the die and the extrudate body, the method may comprise deforming the first material radially outwardly from a central region of the extrudate body. In this arrangement, the extruder apparatus may comprise a mechanical ram which can be selectively moved into and retracted from a central region of the extrudate body and the step of displacing the first material in the central region of the extrudate body radially outwardly may be carried out by advancing the ram axially into the central region of the extrudate body. The method may comprise reducing or stopping the flow of the second material as the extrudate body is deformed.

In a fifth embodiment, the method according to the first aspect of the invention, the method is carried out using apparatus comprising an extrusion die defining an extrusion aperture and at least one fluid outlet, the apparatus defining a first material supply path along which the first material flows to the die and a second material supply path along which the second material flows to the at least one fluid outlet, and periodically and momentarily varying the extrusion process to produce a section of extrudate body having no chamber filled with the second material comprises periodically connecting the at least one fluid outlet with a source of the first material and subsequently reconnecting the at least one fluid outlet with a source of the second material.

In a sixth embodiment, the method according to the first aspect of the invention, the method is carried out using apparatus comprising an extrusion die defining an extrusion aperture and at least one fluid outlet, the apparatus defining a first material supply path along which the first material flows to the die and a second material supply path along which the second material flows to the at least one fluid outlet, and periodically and momentarily varying the extrusion process to produce a section of extrudate body having no chamber filled with the second material comprises periodically and momentarily closing the flow path for the second material so as to produce a section of extrudate body having no chamber filled with the second material.

Suitable first confectionery materials for use in the method according to the first aspect of the invention include, but are not exclusively limited to: hard candy, chewing gum, bubble gum, toffee, chocolate, fudge, and chewy candy.

Suitable second confectionery materials include, but are not exclusively limited to: liqueurs, honey, toffee, caramel, cream, fondants, praline, fudge, gels, confectionery emulsions, jelly, jam and the like. The second material may be gas such as air. The gas may contain a scent and/or flavouring. The second material may alternatively or additionally comprise a material independently selected from the list of first confectionery materials.

In accordance with a second aspect of the invention, there is provided a method of manufacturing products, each product comprising an outer casing of a first material containing at least one chamber filled with a second material, the method being carried out using apparatus comprising an extrusion die defining an extrusion aperture and at least one fluid outlet, the apparatus defining a first material supply path along which the first material flows to the die and a second material supply path along which the second material flows to the at least one fluid outlet, the method comprising:

a. extruding the first material through the extrusion aperture to form an extrudate body and delivering the second material through the at least one fluid outlet to form a chamber filled with the second material within the extrudate body;

b. periodically and momentarily increasing the volume of the second material supply path to temporally reduce the flow of the second material into the extrudate body from the at least one fluid outlet so as to produce a section of extrudate body having no chamber filled with the second material.

The method in accordance with the second aspect of the invention may comprise any of optional features of the first embodiment of the method in accordance with the first aspect of the invention as set out above, above including in particular any of the arrangements for varying the volume of the first and/or second material supply paths in order to vary the flow rates of the respective materials through the die and the fluid outlets.

In accordance with a third aspect of the invention, there is provided a method of manufacturing products, each product comprising an outer casing of a first material containing at least one chamber filled with a second material, the method being carried out using apparatus comprising an extrusion die defining an extrusion aperture and at least one fluid outlet, the apparatus defining a first material supply path along which the first material flows to the die and a second material supply path along which the second material flows to the at least one fluid outlet, and comprising a second material delivery device for causing the second material to flow along second material supply path to the at least one fluid outlet, the method comprising operating the second material delivery device so as to cause the second material to flow along the second material supply path to the at least one fluid outlet in a pulsed flow so as to alternately produce sections of extrudate body comprising at least one chamber filled with the second material and sections of the extrudate body in which no chamber filled with the second material is defined.

The method in accordance with the third aspect of the invention may comprise periodically and momentarily reducing the output of the second material delivery device to pulse the flow of the second material. Where the second material delivery device comprises a pump, the method may comprise periodically and momentarily slowing or stopping the pump to create the pulsed flow of the second material. Alternatively, the second material delivery device may comprise a reciprocal ram configured to drive the second material along the second material supply path to the at least one fluid outlet in a pulsed flow whilst extrusion is taking place. The method may comprise periodically and momentarily increasing or surging the flow of the first material through the die. The method may also comprise periodically and momentarily increasing or surging the flow of the first material through the die at least during at least part of the time when the flow of the second material into the extrudate body through the at least one fluid outlet is reduced.

In accordance with a fourth aspect of the invention, there is provided a method of manufacturing products, each product comprising an outer casing of a first material containing at least one chamber filled with a second material, the method being carried out using apparatus comprising an extrusion die defining an extrusion aperture and at least one fluid outlet, the apparatus defining a first material supply path along which the first material flows to the die and a second material supply path along which the second material flows to the at least one fluid outlet, wherein the apparatus comprises an arrangement for selective adjusting the position of the at least one fluid outlet in the die and the method comprises periodically and momentarily moving the at least one fluid outlet whilst extrusion is in progress so as to mix the first and second materials in the extrudate body to produce a section of extrudate body having no chamber filled with the second material. The die may have an outer part and an inner part rotatable about a longitudinal axis of the die relative to the outer part, wherein the least one fluid outlet is defined in the inner part of the die offset from the longitudinal axis, in which case, the step of periodically and momentarily moving the at least one fluid outlet may comprise periodically and momentarily rotating the inner part of the die.

In accordance with a fifth aspect of the invention, there is provided a method of manufacturing products, each product comprising an outer casing of a first material containing at least one chamber filled with a second material, the method being carried out using apparatus comprising an extrusion die defining an extrusion aperture and at least one fluid outlet, the apparatus defining a first material supply path along which the first material flows to the die and a second material supply path along which the second material flows to the at least one fluid outlet, the method comprising periodically deforming the first material in the extrudate body to form a section within the extrudate body in which no chamber filled with the second material is defined in the extrudate body. The method may comprise applying pressure to the exterior of the extrudate body to deform the first material radially inwardly. The method may comprise crimping the extrudate body by subjecting the exterior of the extrudate body to a ring of pressurised fluid, such as air. Alternatively, the method may comprise using a crimp bar to apply pressure to the exterior of the extrudate body. The extrudate body may crimped within, or at a position proximal to, the extrusion die or it may be crimped at a position spaced downstream from the extrusion die. The ring of pressurised fluid may also be used to divide the extrudate body into individual lengths. Alternatively, where the at least one fluid outlet is located offset from a central longitudinal axis of the die, the method may comprise deforming the first material radially outwardly from a central region of the extrudate body. In this arrangement, the extruder apparatus may comprise a mechanical ram which can be selectively moved into and retracted from a central region of the extrudate body the step of displacing the first material in the central region of the extrudate body radially outwardly may be carried out by periodically and momentarily advancing the ram axially into the central region of the extrudate body. The method may comprise reducing or stopping the flow of the second material as the extrudate body is crimped.

In accordance with a sixth aspect of the invention, there is provided a method of manufacturing products, each product comprising an outer casing of a first material containing at least one chamber filled with a second material, the method being carried out using apparatus comprising an extrusion die defining an extrusion aperture and at least one fluid outlet, defining a first material supply path along which the first material flows to the die and a second material supply path along which the second material flows to the at least one fluid outlet, the method comprising periodically connecting the at least one fluid outlet with a source of the first material and subsequently reconnecting the at least one fluid outlet with a source of the second material so as to produce a section of extrudate body having no chamber filled with the second material.

The method according to any one of the first to sixth aspects of the invention may comprise delivering the second material through a plurality of fluid outlets within the die to form a corresponding number of chambers filled with the second material in each of the filled sections of the extrudate body.

The method according to any one of the first to sixth aspects of the invention may comprise producing an elongate extrudate body having a plurality filled sections containing at least one chamber filled with the second material separated by intermediate unfilled sections in which no chamber filled with the second material is defined, the method comprising dividing the elongate extrudate body into lengths, each division being made through one of the intermediate sections. The step of dividing the extrudate body into lengths may comprise dividing each respective intermediate section into two parts, with each part forming an end cap for covering an end of an adjacent filled section of the extrudate body. Each respective intermediate section may be divided substantially in half. The first material may be a solidifyable material and the step of dividing the extrudate body into lengths may be carried out after the material in the intermediate sections has solidified to a sufficient extent that said parts are able to seal the longitudinal end of the respective chamber after cutting. The step of periodically and momentarily varying the extrusion process may be carried at substantially regular intervals so as to produce an extrudate body comprising a plurality of intermediate sections substantially equi-spaced along the extrudate body. The method may be configured to produce intermediate sections having a length in the range of 0.1 mm to 200 mm, more particularly 2 mm to 20 mm, such that the end cap region at either end of the divided lengths has a thickness in the range of 0.05 mm to 100 mm, more particularly 1 mm to 10 mm. The method may be configured to produce products having an overall length in the range of 10 mm to 500 mm and more particularly in the range of 20 mm to 250 mm, although products longer than these ranges could also be produced.

The method according to any one of the first to sixth aspects of the invention may comprise extruding the extrudate body on to a belt which moves in a direction generally in-line with the longitudinal axis of the die. The method may comprise rapidly increasing the volume of the first material supply path whilst an unfilled section of extrudate body is being formed so as to substantially stop the flow of the first material through the die and separate a formed extrudate body on the belt from the first material in the die.

In the method according to any one of the first to sixth aspects of the invention, the apparatus may comprise one or more outlets for the second material arranged to form a corresponding number of chambers filled with the second material within the extrudate body, the outlets being dimensioned to produce chambers having a diameter/width of no more than 50 mm, 30 mm, 25 mm, 20 mm, 15 mm, 10 mm, 5 mm, 3 mm. The, or each, fluid outlet may be dimensioned to produce a chamber in the extrudate body having a diameter/width in the range of 3 mm to 30 mm, or 5 mm to 20 mm, or 7 mm to 15 mm.

In the method according to any one of the first to sixth aspects of the invention, the apparatus may comprise a plurality of outlets for the second material arranged to form a corresponding number of chambers filled with the second material within the extrudate body, the outlets being dimensioned to produce chambers having a diameter/width of no more than 3 mm, 2 mm, 1 mm, 0.5 mm, 0.25 mm, 100 µm, 50 µm or 10 µm or less.

The method according to any one of the first to sixth aspects of the invention may be adapted to produce elongate products. In which case, the, or each, filled chamber may be elongate extending in a longitudinal direction of the product.

In the method according any one of the first to sixth aspects of the invention, the first material may be a solidifyable material and the method may comprise delivering the first material to the extrusion die under pressure in a plasticised condition. The method may comprise tempering the first material for delivery to the extrusion die under pressure in a flowable and/or clay-like consistency. The first material may be a food material. The first material may be a solidifyable fat-containing confectionery material such as chocolate. There may be more than one first material and/or the first material may be a mixture of more than one component.

The method according to any one of the first to sixth aspects of the invention may comprise extruding the first material in a cold extrusion process.

The second material may be a flowable material. The second material may be a liquid material. More than one second material may be introduced into the extrudate body. Different second materials can be introduced into different chambers through separate fluid outlets. Alternatively, the, or each chamber, may be filled with two or more second materials. At least one chamber may be filled with a first of the second materials which is solidifyable to form a porous structure and a further flowable second material which is introduced into the pores in the first of the second products. The second material may be gas such as air. The gas may contain a scent and/or flavouring.

In accordance with a seventh aspect of the invention, there is provided an apparatus for manufacturing a confectionery product, the apparatus comprising an extrusion die defining an extrusion aperture and at least one inner fluid outlet, a first material delivery system for delivering a first confectionery material in a flowable state to the die extrusion aperture under pressure to produce an extrudate body of the first material, a second material delivery system for delivering a second confectionery material in a flowable state under pressure to the at least one fluid outlet for introduction into the extrudate body to form a chamber filled with the second material within the extrudate body, the apparatus having a control system configured to periodically and momentarily vary the extrusion process so as to form a section within the extrudate body in which there is no filled chamber.

The apparatus in accordance with the seventh embodiment of the invention can be used to manufacture a filled confectionery product having longitudinal end cap regions which generally match the external appearance of the sides of the product and/or which seal the ends of the internal chamber.

In a first embodiment of the apparatus in accordance with the seventh aspect of the invention, or in the apparatus in accordance with the eighth aspect of the invention as set out below, the second material delivery system defines a second material supply path along which the second material can flow to the at least one fluid outlet, the control system including a second material flow control mechanism in the second material supply path, the second material flow control mechanism being operative to vary the volume of the second material supply path so as to vary the rate of flow of the second material through the at least one fluid outlet in use.

The second material flow control mechanism may be operative in use to increase the volume of the second material supply path whilst extrusion is taking progress so as to reduce the flow of the second material through the at least one fluid outlet whilst extrusion of the first material continues to produce an un-filled section of the extrudate body. The second material flow control mechanism may be operative to increase the volume of the second material supply path so as to substantially stop the flow of the second material through the at least one fluid outlet in use. The second material flow control mechanism may be operative to increase the volume of the second material supply path so as to draw or suck back the second material from the at least one fluid outlet in use.

The second material delivery system includes a second material delivery device for causing the second material to flow along the second material supply path, and the second material flow control mechanism may be located in the second material supply path between the second material supply device and the extrusion die.

The control system may include a first material flow control mechanism operable to vary the rate of flow of the first material through the extrusion die whilst extrusion is in progress. The first material delivery system defines a first material supply path along which the first material can flow to the die, and the first material flow control mechanism may be operative to vary the volume of the first material supply path so as to vary the rate of flow of the first material through the extrusion die in use. The first material delivery system includes a first material delivery device for causing the first material to flow along the first material supply path, and the first material flow control mechanism may be located in the first material supply path between the first material supply device and the extrusion die.

The second material flow control mechanism may comprise a movable member at least partially received in the second material supply path and which is moveable between at least a first position and a second position to vary the volume of the second material supply path, the arrangement being such that movement of the member in a direction from the first position towards the second position increases the volume of the second material supply path and that movement of the member in a direction from the second position towards the first position decreases the volume of the second material flow path, the second material flow control mechanism including an actuator arrangement for moving the member between the first and second positions.

Where present, the first material flow control mechanism may comprise a movable member which is at least partially received in the first material supply path and which is moveable between at least a first position and a second position to vary the volume of the first material supply path, the arrangement being such that movement of the member in a direction from the first position towards the second position decreases the volume of the first material supply path and that movement of the member in a direction from the second position towards the first position increases the volume of the first material flow path, the first material flow control mechanism including an actuator arrangement for moving the member between the first and second positions.

In either of the first or second material flow control mechanisms, the movable member may be in the form of a flexible element mounted in the respective supply path and biased towards one of the first and second positions, the actuator arrangement comprising a fluid actuation system for deforming the element towards the other of the first and second positions against the bias force. The flexible element may be made of a resiliently deformable material and configured so that the inherent resilience of the material biases the element to said one of the first and second positions.

In one arrangement, the respective supply path comprises a conduit through which the respective material can flow, the flexible element being in the form of a tube mounted about an actuation member located within the conduit so that a flow path for the respective material is defined between the exterior surface of the tubular element and the conduit, a fluid chamber being defined between the actuation member and the tubular element, the tubular element being resiliently biased towards the actuation member, the control system including a fluid actuation system for selectively introducing a volume of fluid into the chamber to expand the tubular element radially outwardly against the bias force. The fluid actuation system may be operative to selectively at least partially evacuate the fluid chamber of fluid such that the bias force moves the tubular element radially inwardly towards the actuation member.

In an alternative arrangement, the respective supply path comprises a conduit through which the respective material can flow, the flexible element being in the form of a tube mounted about an inner surface of the conduit so that a flow path for the respective material is defined through the tubular element, the tubular element being resiliently biased radially outwardly towards the inner surface of the conduit, a fluid chamber being defined between the conduit and the tubular element, and the control system including a fluid actuation system for selectively introducing a volume of fluid into the chamber to deform the tubular element radially inwardly. The fluid actuation system may be operative to selectively at least partially evacuate the fluid chamber of fluid such that the bias force moves the tubular element radially outwardly.

In a still further arrangement, the apparatus comprises an inner conduit, the interior of which defines part of the second material supply path, and an outer conduit surrounding the inner conduit in spaced relation, a flow passage being defined between the inner and outer conduits which forms part of the first material supply path, the control system comprising a first annular, resiliently flexible element mounted about an inner surface of the inner conduit such that the interior of the element forms a part of the second material supply path, a first fluid chamber operatively connected with the first element, and a fluid actuation system connected with the chamber for selectively introducing a volume of fluid into the first chamber to deform at least part of the first element radially inwardly from an initial resiliently biased configuration to reduce the volume of the second material supply path, the control system also comprising a second annular, resiliently flexible element mounted about an outer surface of the inner conduit such that part of the first material supply path is defined between the second element and the outer conduit, a second fluid chamber operatively connected with the second element, the fluid actuation system being connected with the second fluid chamber for selectively introducing a volume of fluid into the second chamber to deform at least part of the second element radially outwardly form an initial resiliently biased configuration to reduce the volume of the second flow path.

Either of the first and second material flow control mechanisms could comprise a flow control module for mounting in the respective first and second material supply path. Where the apparatus has a flow control mechanism for both the first and second materials, the mechanism may be provided in regions of the first and second supply paths defined by means of separate (e.g. non-concentrically arranged) conduits upstream from the die.

In any of the above arrangements in which the movable member is a flexible element, the flexible element may be a flexible membrane and the fluid may be an incompressible fluid such has a hydraulic fluid or liquid.

The control system may be configured to actuate each of the first material flow control mechanism and the second material flow control mechanism independently of one another. The control system may comprise a programmable electronic control including a processor and memory.

The movable member could form part of a combined flow control mechanism for both the first and second materials, in which case the member is partly received in the second material supply path and partly received in the first material supply path, the arrangement being such that movement of the member in a direction from the first position to the second position increases the volume of second material supply path and decreases volume of the first material supply path and vice-versa.

In one such arrangement where the movable member forms part of a combined flow control mechanism for both the first and second materials, the apparatus comprises an inner conduit, the interior of which forms part of the second material supply path, and an outer conduit surrounding the inner conduit in spaced relation, a flow passage being defined between the inner and outer conduits which forms part of the first material supply path, the inner conduit comprising a first conduit section and an adjacent second conduit section co-axial with but separated from the first conduit section, the second conduit section having an inner diameter which is larger than the outer diameter of the first conduit section, the movable member comprising a cylindrical tubular shuttle member mounted between an outer surface of the first conduit section and an inner surface of the second conduit section for movement in an axial direction between the first and second positions.

In a further possible arrangement where the movable member forms part of a combined flow control mechanism for both the first and second materials, the apparatus comprises an inner conduit, the interior of which forms part of the second material supply path and an outer conduit surrounding the inner conduit in spaced relation, a flow passage being defined between the inner and outer conduits which forms part of the first material supply path, the inner conduit comprising a first conduit section and an adjacent second conduit section co-axial with but separated from the first conduit section, the first and second conduit sections having opposed ends that are spaced apart in an axial direction of the inner conduit sections, the movable member comprising a tubular shuttle member mounted co-axially between the spaced ends of the first and second conduit sections for movement in an axial direction between the first and second positions, the shuttle member being connected with the first conduit section by a first flexible seal and connected with the second conduit section by a second flexible seal, the seals being axially expandable and compressible to accommodate said axial movement of the shuttle and the interior of the seals defining a part of the second material supply path, one of the seals having a larger average diameter than the other of the seals such that movement of the shuttle member in a direction from the first position towards the second position acts to increase the length of said one of the seals with the larger average diameter and to reduce the length the other of the seals resulting in an overall increase in the combined interior volume of the two seals.

In either of the preceding arrangements, the actuator arrangement for selectively moving the shuttle member between the first and second positions may comprises a first magnet physically coupled to the shuttle located inside a conduit in which the shuttle is located, a second magnet located externally of the conduit and magnetically coupled with the first magnet such that movement of the second magnet in an axial direction of the conduit results in a corresponding axial movement of the first magnet and the shuttle member, and an actuator for moving the second magnet.

In a second embodiment of the apparatus according to the seventh aspect of the invention, the second material delivery system defines a second material supply path along which the second material can flow to the at least one fluid outlet and comprises a second material delivery device for causing the second material to flow along the second material supply path, the control system being configured to operate the second material delivery device so as to pulse the flow of the second material along the second material flow path so as to alternately form sections within the extrudate body having at least one filled chambers and sections in which there is no filled chamber. The control system may be configured to periodically and momentarily reduce the output of the second material delivery device to pulse the flow of the second material. The second material delivery device may be a pump and the control system may be configured to periodically and momentarily slow or stop the pump to create the pulsed flow of the second material. In an alternative arrangement, the second material delivery device comprises a ram for driving the second material along the second material supply path in a pulsed flow. The apparatus may also comprise a first material flow control arrangement for selectively increasing or surging the flow of the first material through the die momentarily whilst extrusion is in progress.

In accordance with third embodiment of the seventh aspect of the invention, the at least one fluid outlet is defined in a portion of the die which is movable relative to at least one other portion of the die and the apparatus comprises an actuation arrangement selectively moving the at least one fluid outlet whilst extrusion is in progress, the control system being configured to periodically and momentarily operate the actuation arrangement so as move the at least one fluid outlet whilst the product is being extruded to produce intermediate sections within the extrudate body in which the first and second materials are mixed and in which no chamber filled with the second material is defined within the extrudate body.

In accordance with a fourth embodiment of the seventh aspect of the invention, the apparatus comprises a mechanism for deforming the first material in the extrudate body, the control system being configured to operate the mechanism periodically so as to form a section within the extrudate body in which no chamber filled with the second material is defined in the extrudate body in use. The apparatus may comprise an arrangement for applying pressure to the exterior of the extrudate body to deform the first material radially inwardly of the extrudate body. The apparatus may comprise an annular nozzle for surrounding the extrudate body and a pressurised fluid supply system for directing a pressurised fluid through the nozzle to subject the exterior of the extrudate body to a ring of pressurised fluid, such as air. The annular nozzle may be positioned within or proximal to the extrusion die or it may be located at a position spaced downstream from the extrusion die. Alternatively, the apparatus may comprise a crimp bar and an actuator for selectively bring the crimp bar into contact with the extrudate body to crimp the extrudate body. In a further alternative arrangement, the apparatus may comprise a mechanism for displacing extrudate first material in a central region of the extrudate body radially outwardly. The mechanism may comprise a ram selectively movable in an axial direction through the centre of the die between an advanced position, in which a head of the ram is positioned for location in a central region of the extrudate body, and a retracted position, the control system having an actuator arrangement for selectively moving the ram between the advanced an retracted positions.

In accordance with a fifth embodiment of the seventh aspect of the invention, the control system is operative whilst extrusion is taking place to connect the at least one fluid outlet with a source of the first material and subsequently reconnect the at least one fluid outlet with a source of the second material so as to produce a section of extrudate body having no chamber filled with the second material. The control system may comprise a valve arrangement for selectively connecting the at least one fluid outlet between a source of the first and second materials.

In accordance with an eighth aspect of the invention, there is provided an apparatus for manufacturing a product, the apparatus comprising an extrusion die defining an extrusion aperture and at least one inner fluid outlet, a first material delivery system for delivering a first material in a flowable state to the die extrusion aperture under pressure to produce an extrudate body of the first material, a second material delivery system for delivering a second material in a flowable state under pressure to the at least one fluid outlet for introduction into the extrudate body to form a chamber filled with the second material within the extrudate body, the second material delivery system defining a second material supply path along which the second material can flow to the at least one fluid outlet, the apparatus having a control system including a second material flow control mechanism in the second material supply path, the second material flow control mechanism being operative to periodically and momentarily increase the volume of the second material supply path so as to periodically and momentarily reduce the flow of the second material through the at least one fluid outlet in use.

The apparatus in accordance with the eighth aspect of the invention may include any of optional features of the apparatus according to the first embodiment of seventh aspect of the invention referred to above including in particular any of the arrangements for varying the volume of the first and/or second material supply paths in order to vary the flow rates of the respective materials through the die and the fluid outlets.

In accordance with a ninth aspect of the invention, there is provided an apparatus for manufacturing a product comprising an outer casing of a first material containing at least one chamber filled with a second material, the apparatus comprising an extrusion die defining an extrusion aperture and at least one inner fluid outlet, a first material delivery system for delivering a first material in a flowable state to the die extrusion aperture under pressure to produce an extrudate body of the first material, a second material delivery system for delivering a second material in a flowable state under pressure to the at least one fluid outlet for introduction into the extrudate body to form a chamber filled with the second material within the extrudate body, the second material delivery system defining a second material supply path along which the second material can flow to the at least one fluid outlet, and including a second material delivery device for causing the second material to flow along the second material supply path to the at least one fluid outlet, the second material delivery device being configured to pulse the flow of the second material along the second material flow path.

The apparatus may have a control system configured to periodically and momentarily reduce the output of the second material delivery device to pulse the flow of the second material. The second material delivery device may be a pump and the control system may be configured to periodically and momentarily slow or stop the pump to create the pulsed flow of the second material. In an alternative arrangement, the second material delivery device comprises a ram for driving the second material along the second material supply path in a pulsed flow. The apparatus may also comprise a first material flow control arrangement for selectively increasing or surging the flow of the first material through the die momentarily.

In the apparatus according to any of the seventh to ninth aspects of the invention, the at least one fluid outlet may be movable and the apparatus may comprise an actuator arrangement for moving the at least one fluid outlet between at least a first and a second position.

In accordance with a tenth aspect of the invention, there is provided an apparatus for manufacturing a product comprising an outer casing of a first material containing at least one chamber filled with a second material, the apparatus comprising an extrusion die defining an extrusion aperture and at least one inner fluid outlet, a first material delivery system for delivering a first material in a flowable state to the die extrusion aperture under pressure to produce an extrudate body of the first material, a second material delivery system for delivering a second material in a flowable state under pressure to the at least one fluid outlet for introduction into the extrudate body to form a chamber filled with the second material within the extrudate body, wherein the at least one fluid outlet is defined in a portion of the die which is movable and the apparatus comprises an actuation arrangement selectively moving the fluid outlets whilst extrusion is in progress.

The apparatus may comprise a control system configured to periodically and momentarily operate the actuation arrangement so as move the at least one fluid outlet whilst the product is being extruded to produce intermediate sections within the extrudate body in which the first and second materials are mixed and in which no chamber filled with the second material is defined within the extrudate body.

In apparatus according to any one of the seventh to the tenth aspects of the invention in which the at least one fluid outlet is movable, the die may comprise an outer die part and an inner die part mounted for rotation within the outer die part about a central longitudinal axis of the die, the inner die part defining the at least one fluid outlet which is radially offset relative from the longitudinal axis, the apparatus having an actuator arrangement for selectively rotating the inner part of die about the axis. The actuator arrangement may be operative to rotate the inner part of the die between two discrete rotational orientations. Alternatively, the actuator arrangement may be operative to rotate the inner part of the die continuously for a period of time.

In accordance with an eleventh aspect of the invention, there is provided apparatus for manufacturing a product comprising an outer casing of a first material containing at least one chamber filled with a second material, the apparatus comprising an extrusion die defining an extrusion aperture and at least one fluid outlet, a first material delivery system for delivering a first material in a flowable state to the die extrusion aperture under pressure to produce an extrudate body of the first material, a second material delivery system for delivering a second material in a flowable state under pressure to the at least one fluid outlet for introduction into the extrudate body to form a chamber filled with the second material within the extrudate body, a control system and apparatus acting under control of the control system for periodically deforming the first material in the extrudate body to form a section within the extrudate body in which no chamber filled with the second material is defined in the extrudate body. The apparatus may comprise an arrangement for applying pressure to the exterior of the extrudate body to deform the first material radially inwardly. The apparatus may comprise an annular nozzle for surrounding the extrudate body and a pressurised fluid supply system for directing a pressurised fluid through the nozzle to subject the exterior of the extrudate body to a ring of pressurised fluid, such as air. The annular nozzle may be positioned within or proximal to the extrusion die or it may be located at a position spaced downstream from the extrusion die. Alternatively, the apparatus may comprise a crimp bar and an actuator for selectively bring the crimp bar into contact with the extrudate body to crimp the extrudate body. In a further alternative arrangement, the apparatus may comprise a mechanism for displacing extrudate first material in a central region of the extrudate body radially outwardly. The mechanism may comprise a ram selectively movable in an axial direction through the centre of the die between an advanced position, in which a head of the ram is positioned for location in a central region of the extruded body, and a retracted position, the control system having an actuator arrangement for selectively moving the ram between the advanced an retracted positions.

In accordance with a twelfth aspect of the invention, there is provided apparatus for manufacturing a product comprising an outer casing of a first material containing at least one chamber filled with a second material, the apparatus comprising an extrusion die defining an extrusion aperture and at least one inner fluid outlet, a first material delivery system for delivering a first material in a flowable state to the die extrusion aperture under pressure to produce an extrudate body of the first material, a second material delivery system for delivering a second material in a flowable state under pressure to the at least one fluid outlet for introduction into the extrudate body to form a chamber filled with the second material within the extrudate body, the apparatus comprising a control system operative whilst extrusion is taking place to connect the at least one fluid outlet with a source of the first material and subsequently reconnect the at least one fluid outlet with a source of the second material so as to produce a section of extrudate body having no chamber filled with the second material.

In apparatus in accordance with any of the seventh to the twelfth aspects of the invention, the die may comprise a main body portion defining one or more apertures through which the first material flows from the first material supply path, a shroud projecting axially in a downstream direction beyond an outer (downstream) end of the main body portion, the shroud defining a central extrusion aperture into which the first material is directed to form the extrudate body. The shroud may be removably mounted to the main body portion. The die may have a nozzle arrangement located centrally of the main body portion, the nozzle arrangement defining one or more apertures that are in fluid communication with the second material flow path, the one or more apertures comprising the at least one fluid outlet. The maximum lateral dimension (i.e. width or diameter) of the at least one aperture in the nozzle arrangement may be less than the maximum lateral dimension (i.e. width or diameter) of the second material supply path immediately upstream of the nozzle arrangement. The shroud may extend in an axial direction of the die beyond the outer or downstream end of the nozzle arrangement. The nozzle arrangement may be removably mounted to the main body portion of the die. The main body portion of the die may comprise an aperture plate, the aperture plate defining a central aperture in fluid communication with the second material supply path and at least one further aperture spaced radially outwardly from the central aperture, the at least one further aperture being in fluid communication with the first material supply path. The nozzle arrangement may be mounted to the aperture plate, the at least one nozzle aperture being in fluid communication with the second material supply path. The nozzle arrangement may comprise or have mounted thereto a generally conical body portion the apex of which is substantially aligned with the longitudinal axis of the die at the downstream end of the body. The at least one fluid outlet may be located adjacent the base of the conical body portion and may be aligned to direct the second material generally radially outwardly about an outer surface conical body portion.

In apparatus in accordance with any of the seventh to the twelfth aspects of the invention, the apparatus may comprise a plurality of inner fluid outlets configured so as to produce a corresponding number of chambers filled with the second material when the second material is introduced into the extrudate body through the outlets in use. The, or each, fluid outlet may be defined by means of an injector forming part of an extrusion die assembly.

In apparatus in accordance with any of the seventh to the twelfth aspects of the invention, the apparatus may comprise a moving belt located adjacent the outlet of the die onto which the extrudate body is extruded, the belt moving in a direction generally in-line with a longitudinal axis of the extrusion die.

In apparatus in accordance with any of the seventh to the twelfth aspects of the invention, the apparatus may comprise a mechanism for dividing the extrudate body into lengths, the dividing mechanism being adapted to form each division of the extrudate body through a respective one of the unfilled intermediate sections. The mechanism for dividing the extrudate body into lengths may comprise a cutter for cutting the extrudate body. The cutter may be synchronised with the action of the control system such that movement of the cutter is timed to divide the extrudate body through an intermediate section. The mechanism for dividing the extrudate body into lengths may comprise a sensor arrangement for detecting intermediate sections in the extrudate body. The apparatus may comprise an arrangement for producing an external mark on the extrudate body at or adjacent to the die to indicate the location of an intermediate section and the sensor arrangement may include a sensor for detecting the external mark.

In apparatus in accordance with any of the seventh to the twelfth aspects of the invention, the apparatus may be configured to extrude a first material which is solidifyable. The first material delivery system may comprise an arrangement for delivering the first material to the extrusion die under pressure in a plasticised condition. The first material delivery system may comprise apparatus for tempering the first material to place it in a clay-like consistency and for delivering the tempered material to the extrusion die. The apparatus may be configured to extrude a first material that is a food material. The apparatus may be configured to extrude a first food material that is a solidifyable food material and in particular a solidifyable confectionery material. The apparatus may be configured to extrude a first food material that is a solidifyable fat-containing confectionery material such as chocolate. The material delivery system may be configured to deliver more than one first material to the extruder die.

In apparatus in accordance with any of the seventh to the twelfth aspects of the invention, the apparatus may be configured to extrude a second material that is a flowable material. The apparatus may be configured to extrude a second material that is a liquid material. The apparatus may be configured to extrude a second material that is a food material. The apparatus may be configured to extrude a second material that is a flowable or liquid food material. The apparatus may be configured to extrude a second material that is a gas, which may be scented and/or flavoured.

In apparatus in accordance with any of the seventh to the twelfth aspects of the invention, the second material delivery system may be configured to introduce more than one second material into the extrudate body. The second material delivery system may comprise a plurality of fluid outlets for the second materials, at least two of the outlets being fluidly connectable with supplies of different second materials. The second material delivery system may comprise an arrangement for selectively connecting at least one of the fluid outlets with sources for any one of two or more different second materials.

In apparatus in accordance with any of the seventh to the twelfth aspects of the invention, the apparatus may be configured to produce an extrudate body having intermediate sections with a length in the range of 0.1 mm to 200 mm, more particularly in the range of 2 mm to 20 mm, such that the end cap region at either end of the divided lengths has a thickness in the range of 0.05 mm to 100 mm, more particularly 1 mm to 10 mm. The apparatus may be configured to produce products having an overall length in the range of 10 mm to 500 mm and more particularly in the range of 20 mm to 250 mm, although products longer than these ranges could also be produced.

In the apparatus according to any one of the seventh to twelfth aspects of the invention, the apparatus may comprise one or more outlets for the second material arranged to form a corresponding number of chambers filled with the second material within the extrudate body, the outlets being dimensioned to produce chambers having a diameter/width of no more than 50 mm, 30 mm, 25 mm, 20 mm, 15 mm, 10 mm, 5 mm, 3 mm.

In apparatus in accordance with any of the seventh to the twelfth aspects of the invention, the, or each, fluid outlet may be dimensioned to produce a chamber in the extrudate body having a diameter/width in the range of 3 mm to 30 mm, or 5 mm to 20 mm, or 7 mm to 15 mm. In apparatus in accordance with any of the seventh to the twelfth aspects of the invention, the apparatus may comprise a plurality of outlets for delivering the second material into the extrudate body, the outlets being dimensioned to produce chambers in the extrudate body having a diameter/width of no more than 3 mm, 2 mm, 1 mm, 0.5 mm, 0.25 mm, 100 µm, 50 µm or 10 µm or less.

In apparatus in accordance with any of the seventh to the twelfth aspects of the invention, the apparatus may be configured to produce elongate products. The apparatus may be configured to produce elongate food products, including elongate confectionery products such as bars of chocolate having a liquid filling.

The apparatus may be configured to extrude the first material in a cold extrusion process.

In apparatus in accordance with any of the seventh to the twelfth aspects of the invention, the extrusion is carried out generally horizontally.

The methods and apparatus according to the various aspects of the invention can be adapted or configured for extruding a range of materials including non-food materials such as plastics, rubber, elastomers and polymers and the like. The methods and apparatus according to the various aspects of the invention though are particularly suited for extruding food materials including:

a. Confectionery materials such as: chocolate, fudge, toffee, chewing gum, bubble gum, praline, nougat, chewy candy, hard candy, fondant, caramel;

b. Confectionery fillings such as: chocolate, praline, caramel, toffee, chewing gum, jam, jelly, syrups, cream, honey, liqueurs, fondant, fudge, gels, emulsions, yoghurt;

c. Savoury foodstuffs—cheese (especially processed cheese), dough (biscuit, cake, bread dough etc), cereals (rice, wheat, maize, oats, barley etc, milled or whole), meat, fish, food pastes;

d. Chewing gum base.

The methods and apparatus according to the various aspects of the invention are especially suited for extruding food materials including: confectionery materials, cheese (especially processed cheese), dough and cereal extrusion but most especially confectionery materials and most particularly chocolate.

For the avoidance of doubt, the term "extrusion" is used herein to refer generally to the process by which a material pushed or drawn in flowable, plastic or clay-like state through a die having an extrusion aperture in order to produce an extrudate body having a cross-sectional profile which is determined at least partially by the cross sectional profile of extrusion aperture. The term "extrusion" is not intended to be limited to processes or apparatus in which the material is delivered to the die by means of a screw extruder, although this may be the case, unless expressly stated. Rather, references to "extrusion" should be understood as encompassing any suitable means for delivering the material to the die which might include a single or twin screw extruder, a pump or any other suitable means for causing the material to flow through the die unless expressly limited.

DETAILED DESCRIPTION OF THE INVENTION

Several embodiments of the invention will now be described, by way of example only, with reference to the accompanying drawings, in which:

FIGS. 3A to 3C are a series of schematic cross sectional views though an extruder die forming part of an apparatus in accordance with the invention and part of an extrudate body produced using the die, illustrating a first technique in accordance with the invention;

FIGS. 4A to 4D are a series of schematic cross sectional views though an extruder die forming part of an apparatus in accordance with the invention and part of an extrudate body produced using the die, illustrating a second extrusion technique in accordance with the invention when used in combination with the first technique;

FIGS. 5A to 5E are a series of schematic cross sectional views though an extruder die forming part of an apparatus in accordance with the invention and part of an extrudate body produced using the die, illustrating an alternative arrangement for carrying out a combination of the first and second techniques in accordance with the invention;

FIGS. 16A and 16B are schematic cross sectional views through an extruder die forming part of an apparatus in accordance with a still further embodiment of the invention adapted for carrying out the second technique in accordance with the invention;

FIGS. 17A and 17B are schematic cross sectional views through an extruder die forming part of an apparatus in accordance with another embodiment of the invention adapted for carrying out the second technique in accordance with the invention;

DETAILED DESCRIPTION OF THE INVENTION

There will now follow a description of a number of methods and apparatus which can be used to manufacture a product comprising an outer casing made of a first material containing a filling of a second material. The specific embodiments to be described are particularly suitable for manufacturing a confectionery product such as a chocolate bar having a filling comprising a second confectionery material that is in a flowable, and in particular a liquid, form. However, the methods and apparatus described can be adapted to produce a wide range of confectionery, food and other products including materials such as plastics, polymers, rubber (natural and synthetic) and the like. For ease of reference, in the following description the first material may be referred to as "chocolate" and the second material as a "liquid filling material" but it should be understood that use of these terms in the specific description is not intended to limit the scope of the invention.

In the following description and claims, the apparatus will be referred to generally as "extrusion apparatus" and the method as "extrusion" or "co-extrusion" or the like. As noted previously, the term "extrusion" and similar terms such as "co-extrusion" are used herein to refer generally to the process by which a material pushed or drawn in flowable, plastic or clay-like state through a die having an extrusion aperture in order to produce an extrudate body having a cross-sectional profile which is determined at least partially by the cross sectional profile of extrusion aperture. It should be understood, therefore, that these terms are not intended to be limited to apparatus or methods in which the material is delivered to the die by means of a screw extruder, although this may be the case, unless expressly stated. Rather, references to "extrusion" and the like should be understood as encompassing apparatus and methods using any suitable means for delivering the material to the die, which might include a single or twin screw extruder, a pump or any other suitable means for causing the material to flow through the die unless expressly stated otherwise.

Figure 1:
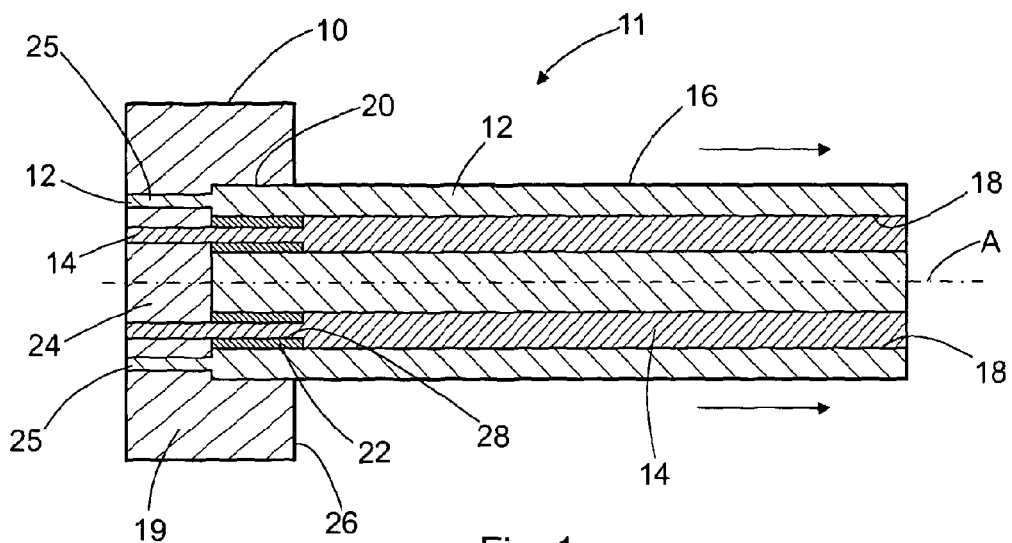
FIG. 1 is a schematic cross section view through an extruder die and part of an extrudate body produced using the die.

FIG. 1 illustrates schematically an extrusion die 10 forming part of an apparatus (indicated generally at 11) for extruding a first material 12, which in this case is chocolate 12, and second material 14, which in this case is a liquid filling confectionery material 14. The apparatus is constructed to produce an extrudate body 16 of the chocolate 12 in which there are formed a number of continuous, longitudinal chambers 18 containing the liquid filling material 14. In the plane of the section shown in FIG. 1 there are two chambers 18 but there may be additional chambers 18 in other planes. It will be appreciated, however, that the number and position of the filled chambers 18 can be varied as desired and could comprise a single, centrally located chamber and/or one or more chambers located off-centre as shown.

The die 10 comprises an outer die portion 19 having an extrusion aperture 20 through which the chocolate 12 flows. The shape of the extrusion aperture defines at least partially the outer lateral cross-sectional profile of the extrudate body 16. In the present embodiment, the extrusion aperture 20 is generally star shaped but it will be appreciated that the other shapes, e.g. circular, square, triangular, rectangular, or irregular, can be used depending on the desired profile of the product. The extrudate body 16 will typically be extruded onto a moving belt (illustrated schematically at 17 in FIG. 6A) where the chocolate 12 rapidly solidifies to retain the profile formed as it passes through the extrusion aperture 20. The belt is typically aligned generally horizontally in front of the extruder die and moves in a direction generally in-line with the longitudinal axis A of the die and the extrudate body. It the present application, extrusion is carried out generally horizontally as opposed to a vertical extrusion process.

Located within the aperture 20 are a number of injector nozzles 22 each defining a fluid outlet for introducing the liquid filling material 14 into the flow path of the chocolate 12. The injectors 22 form part of an inner part 24 of the die 10 and may protrude beyond a downstream end face 26 of the die 10 as shown in FIG. 1. Alternatively, the injectors 22 may terminate level with or upstream from the end face 26 of the die 10.

Each injector 22 has an axially extending bore 28 which is in fluid connection with a supply of the liquid filling material 14. Two injectors 22 are shown in FIG. 1 corresponding to the two elongate chambers 18 in the plane of the section shown. However, it will be appreciated that there may be further injectors 22 located in different planes and that the number and position of the injectors can be varied depending on the number and location of filled chambers 18 to be produced. The outer profile of the injectors 22 determines the cross sectional shape of the filled chambers 18 and can be selected as desired. For example, the injectors 22 may be circular, square, triangular, star shaped or any other suitable shape. The inner part 24 of the die has apertures 25 which allow the first confectionery material 12 to flow in between the injectors 22 so that each of the chambers in the extrudate body 16 is surround by continuous, i.e. imperforate, outer peripheral walls of the chocolate 12.

The apparatus 11 as so far described could be constructed broadly in accordance with the teaching in U.S. Pat. No. 4,834,635, the whole contents of which are hereby incorporated by reference. In the apparatus disclosed in U.S. Pat. No. 4,834,635, the injectors are connected with a supply of pressurised air and the arrangement is used to extrude a confectionery product having a plurality of hollow longitudinal passages. However, by connecting the injector arrangement in U.S. Pat. No. 4,834,635 with a supply of a liquid filling material rather than air, the arrangement can be adapted in order to produce a product having a plurality of chambers filled with a liquid material 14.

In a conventional extrusion process, the flow rate of the material delivered to and passing through the die is maintained at a substantially constant nominal value so as to fill the extrusion aperture and produce an extrudate body with a substantially constant cross-sectional profile as determined by the extrusion aperture, which is usually the object of the process. However, as discussed in more detail below, the applicants have found that the cross-sectional profile of the extrudate body can be varied along its length by changing the volumetric flow rate of the material through the extrusion aperture during the extrusion process. For example, if the flow rate is reduced from the nominal value, the material will not completely fill the extrusion aperture and a region of reduced cross sectional area can be produced within the extrudate body. Alternatively, the flow rate may be increased above the nominal value to produce a bulge in the extrudate body. Whilst such changes in the cross-sectional profile of the extrudate body would not be desirable in many applications, when producing food products, and in particular confectionery products, these and other extrusion effects can be used to produce products having shapes that are unusual and potentially appealing to consumers.

As described, the apparatus 11 is suitable for producing a product in which the filling material 14 is solidifyable so that it does not flow when the extrudate body is cut into individual lengths as disclosed in EP 1 166 640 A1. However, if the chambers 18 are filled with a flowable filling material, the filling material would tend to flow out of the ends of each length when the extrudate body 16 is cut. Furthermore, even if a solidifyable material were used as the filling, the filling material will be exposed at the cut ends, which may not be desirable.

Figure 2A:
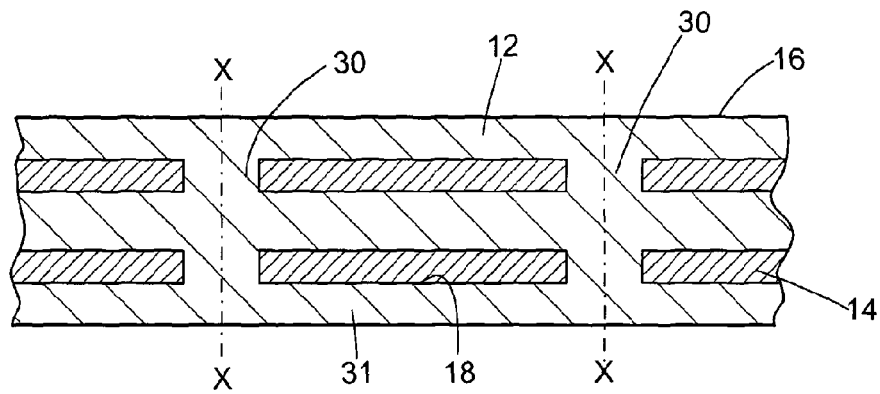
FIG. 2A is cross sectional view through part of an extrudate body produced using the methods and apparatus of the present invention.
Figure 2B:
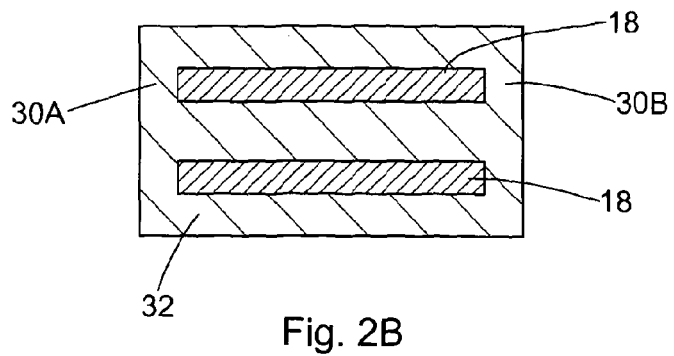
FIG. 2B is a cross sectional view through a product which is produced by cutting the extrudate body of FIG. 2A.

In accordance with the invention, the applicants have found that the apparatus 11 can be modified and/or the operating parameters of the method of manufacture can be changed so that an extrudate body 16 is produced with longitudinally spaced, intermediate sections through the extrudate body in which there are no filled chambers 18 and which contain substantially only the first material 12 or a mixture of the first material 12 and the second material 14, as illustrated in FIG. 2A. These intermediate sections 30 are formed periodically along the length of the extrudate body 16 with filled sections 31 of the extrudate body 16 containing one or more filled chambers between the intermediate sections 30. The intermediate sections 30 are evenly spaced along the extrudate body so that after the extrudate has set sufficiently, the extrudate body 16 can be cut or otherwise divided through the middle of an intermediate section 30, as indicated at lines X-X, to produce individual lengths or products 32 such as that shown in FIG. 2B. After cutting, each of the products 32 is capped at either longitudinal end by means of a respective part 30A, 30B of the adjacent intermediate sections.

Where the filling material 14 is flowable, it will usually be necessary to produce end caps 30A, 30B that are solid so as to seal the longitudinal ends of the chambers 18 to prevent leakage. If the first material 12 is a solidifyable material which passes through the die in a flowable state, such as chocolate and the like, the material will tend to coalesce so that a solid intermediate section 30 is produced when the first material solidifies. In some cases, only the regions of the intermediate sections 30 immediately adjacent the filled sections need be solid. In other words, the end caps may contain small cavities or occlusions, provided that the overall integrity of the end caps is not compromised and the filling material is not able to leak out of the ends of the chambers 18.

The end caps 30A, 30B cover the ends of the product in a manner that generally matches the sides of the product so that the product has a substantially homogenous external appearance. This is aesthetically pleasing for the consumer and so is advantageous even where a solidifyable material is used as the filling 14.

The present invention can also have application in producing products in which the chambers are filled with a gas such as air. In the case of food and confectionery products in particular, the gas may be scented or flavoured. Where the filling is a gas other than air and/or is scented or flavoured, the end cap regions are configured to seal the chambers to prevent the gas escaping. Where the chambers are filled with air, it may be sufficient that the end cap regions cover the ends of the product in a way which generally matches the external appearance of the sides of the product.

The thickness of the end caps 30A, 30B can be selected as desired but in a typical chocolate bar may be in the range of 0.05 mm to 100 mm and more particularly in the range of 1 mm to 10 mm. The overall length of the individual products produced using the inventive methods and apparatus can also be selected as required but in a typical chocolate bar may be in the range of 10 mm to 500 mm and more particularly, in the range of 20 mm to 250 mm.

In most applications, it is expected that the extrudate body will be cut or otherwise divided at each intermediate section 30 so that each confectionery product 32 has one or more filled chambers which extend for substantially the entire length of the product apart from the end cap regions. However, it would also be possible to produce products having one or more intermediate sections spaced along their length by dividing the extrudate body at every other or every third intermediate section 30, for example.

The applicants have identified a number of different basic techniques that can be used to form the intermediate sections 30, some of which can be combined. Each technique and combination of techniques can be implemented in a variety of different ways, as will be described in more detail below.

A first technique, which can be referred to as "pulsed filling flow", is illustrated schematically in FIGS. 3A to 3C. The pulsed filling flow technique comprises periodically and momentarily stopping, or at least significantly reducing, the flow of the filling 14 through the injectors 22 into the extrudate body 16. FIG. 3A shows the extrusion line after the flow of the liquid filling material 14 has just stopped. With no liquid filling material 14 flowing through the injectors 22, the chambers 18 collapse and the chocolate forms a solid intermediate section 30 as indicated by the arrows. After a set period of time, the flow of liquid filling material is resumed so that the chambers 18 are reformed in the extrudate body as indicated in FIG. 3C. The section 30 of the extrudate body 16 produced in the period where the flow of the liquid filling material is stopped or reduced has no chambers 18 and contains predominantly or exclusively chocolate. The length of the section 30 is determined by the length of time over which the liquid filling material flow is stopped or reduced and the rate at which the chocolate extruded. Rather than simply stopping the flow of the liquid filling material 14, a negative pressure or vacuum may be applied to the liquid filling material supply path to provide a quick cut-off of the liquid filling material. This can be referred to as suck back or draw back. This reduces the run out of the liquid filling material when the flow is stopped so that the section 30 contains less or none of the liquid filling material 14 and so is more effective at sealing the ends of the chambers 18 when it solidifies.

Whilst the flow of the liquid filling material 14 is stopped or reduced, the overall volume of material extruded is reduced. Since the chocolate 12 tends to collapse inwardly closing the chambers 18, there is a certain amount of external deformation to the extrudate body 16 as indicated at B in FIG. 3B. Depending on the nature of the product and the length of the sections 30, this deformation may be acceptable in the final product.

A second technique which can be used to form intermediate sections 30 having no chambers 18 in the extrudate body 16 is to periodically and momentarily increase or surge the amount the chocolate 12 forming the extrudate body at the die head 10. Because the chocolate has a greater viscosity than the liquid filling material, creating a surge in the chocolate while keeping the flow of the liquid filling material constant will cause the liquid material to be displaced preferentially to the chocolate resulting in a section 30 being extruded in the extrudate body which is void of liquid filled chambers.

Whilst the second technique can be used independently of the pulse flow technique, combining the first and second techniques is advantageous as the flow of chocolate can be increased to compensate for the reduction in flow of the liquid filling material to maintain the overall volume of material extruded through the die as a whole substantially constant. This reduces or eliminates the problem of external deformation of the extrudate body.

A combination of the first and second techniques is illustrated schematically in FIGS. 4A to 4D. As shown in FIG. 4A, when it is desired to produce an intermediate section 30, the flow of the liquid filling material 14 is stopped or reduced and at the same time the flow of chocolate 12 is increased, or surged, to compensate. The chocolate collapses inwardly closing the chambers 18 to produce an intermediate section 30 comprising exclusively or at least predominantly chocolate. In this case, however, the increase in the flow rate of the chocolate 12 maintains the overall volume of material extruded generally constant and there is no or only reduced external deformation of the extrudate body 16, which therefore has a substantially constant cross section throughout its length. After a set period of time depending on the desired length of the intermediate section 30, the flow of the liquid filling material 14 is recommenced and the flow of the chocolate 12 is reduced to its normal or base level so that the liquid filled chambers 18 are reformed in the extrudate body 16. This is illustrated in FIG. 4C.

In the above described arrangement, the chocolate 12 continues to flow along its normal flow path but the volumetric flow is temporally increased. In an alternative arrangement illustrated schematically in FIGS. 5A to 5E, the injectors 22 can be alternately connected with a supply of the liquid filling material 14 and a supply of the chocolate 12 to achieve a similar end result. Thus as illustrated in FIG. 5A, when the injectors 22 are connected with a supply of the liquid filling material 14, liquid filled chambers 18 are produced in the extrudate body 16. Periodically, as shown in FIGS. 5B and 5C, the injectors 22 are switched to connect them with a supply of the chocolate 12 to produce an intermediate section 30 having no chambers and which contains exclusively or predominantly the chocolate. Because additional chocolate 12 is being supplied through the injectors, there is little loss in the overall volume of the material extruded and so there is no significant external deformation of the extrudate body. Once an intermediate section 30 of the appropriate length has been produced, the injectors 22 are again connected with the supply of liquid filling material 14 to reform the liquid filled chambers 18, as illustrated in FIGS. 5D and 5E.

Figure 6A:
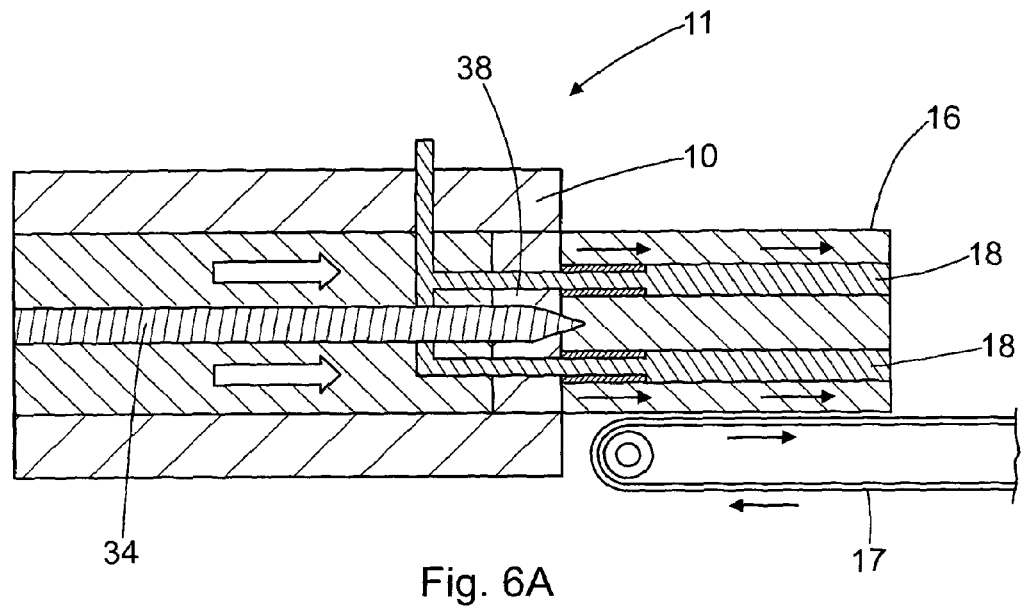
FIGS. 6A and 6B are schematic cross sectional views though part of an apparatus in accordance with the invention and part of an extrudate body produced using the apparatus, illustrating a third technique in accordance with the invention.
Figure 6B:
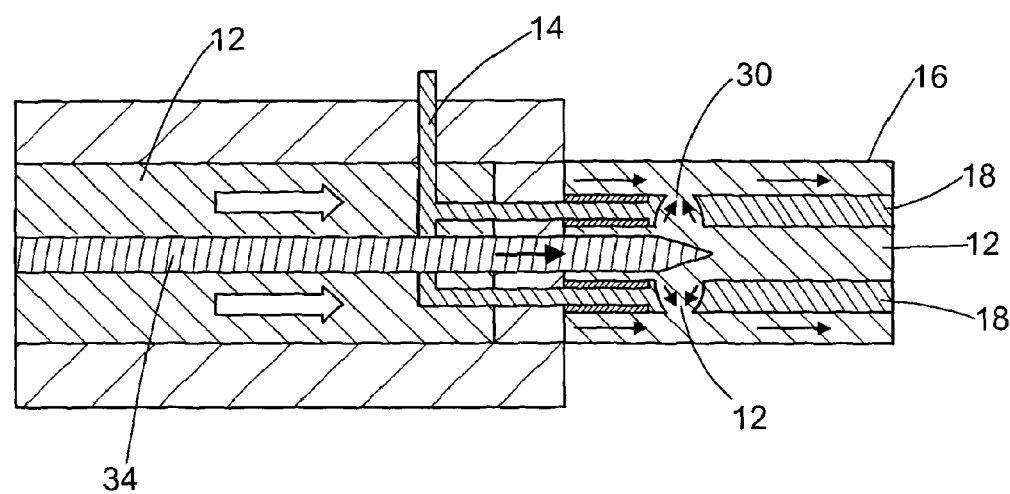

A third technique which can be used to produce intermediate sections 30 in the extrudate body 16 comprises displacing the chocolate extrudate radially outwardly from a central region of the extrudate body at, or immediately downstream from, the extrusion die 10. The liquid confectionery being less viscous than the chocolate is moved preferentially to the chocolate causing the liquid filled chambers to collapse. This third technique is illustrated in FIGS. 6A and 6B, which show schematically an arrangement in which the apparatus is provided with a mechanical ram 34 that can be selectively advanced by an actuator arrangement in an axial direction of the extruder apparatus 11 through a central region 38 of the die 10 into a central core of the extrudate body 16. The head of the ram 36 is shaped as a conical wedge which forces the extrudate chocolate 12 radially outwardly when the ram is advanced into the extrudate body. Typically, the ram 34 is advanced relatively quickly when an intermediate section is to be formed and subsequently retracted more slowly. Any suitable actuation arrangement can be used to advance and retract the ram. The third technique is particularly advantageous where the extrudate body has one or more chambers 18 that are spaced about a central core of chocolate 12.

The third technique can be combined with the first, pulsed filling flow technique so that the flow of filling through the outlet injectors 22 is temporarily reduced or stopped as the ram 34 is advanced. When used in this way, displacing the chocolate extrudate 12 radially outwardly from the centre of the extrudate body 16 prevents or reduces external deformation to the extrudate body 16, even though the overall volume of material extruded is reduced whilst each intermediate section 30 is being extruded.

Rather than using a mechanical ram 34, pressurised air, or another suitable pressurised fluid, can be used to displace the chocolate extrudate radially outwardly from the centre of the extrudate body. In this arrangement, which is not illustrated, the apparatus is provided with a central supply line with an outlet in the centre of the die 10 which is selectively connectable with a source of pressurised fluid such as pressurised air. When an intermediate section is to be formed, pressurised fluid is supplied through the additional line to form a bubble in the centre of the extrudate body, pushing the chocolate radially outwardly to collapse the liquid filled chambers. The supply of fluid in this manner is a simple way of maintaining a constant extruded volume to prevent external deformation of the extrudate body as the fluid is not viscous and does not block. The supply of pressurised fluid is stopped once an intermediate section 30 of the desired length has been produced. Again, this technique can be advantageously combined with the pulsed filling flow technique, in which case the flow of liquid filling material 14 is stopped or reduced when the pressurised fluid is supplied through the central line.

Figures 7A, 7B, 7C, 8:
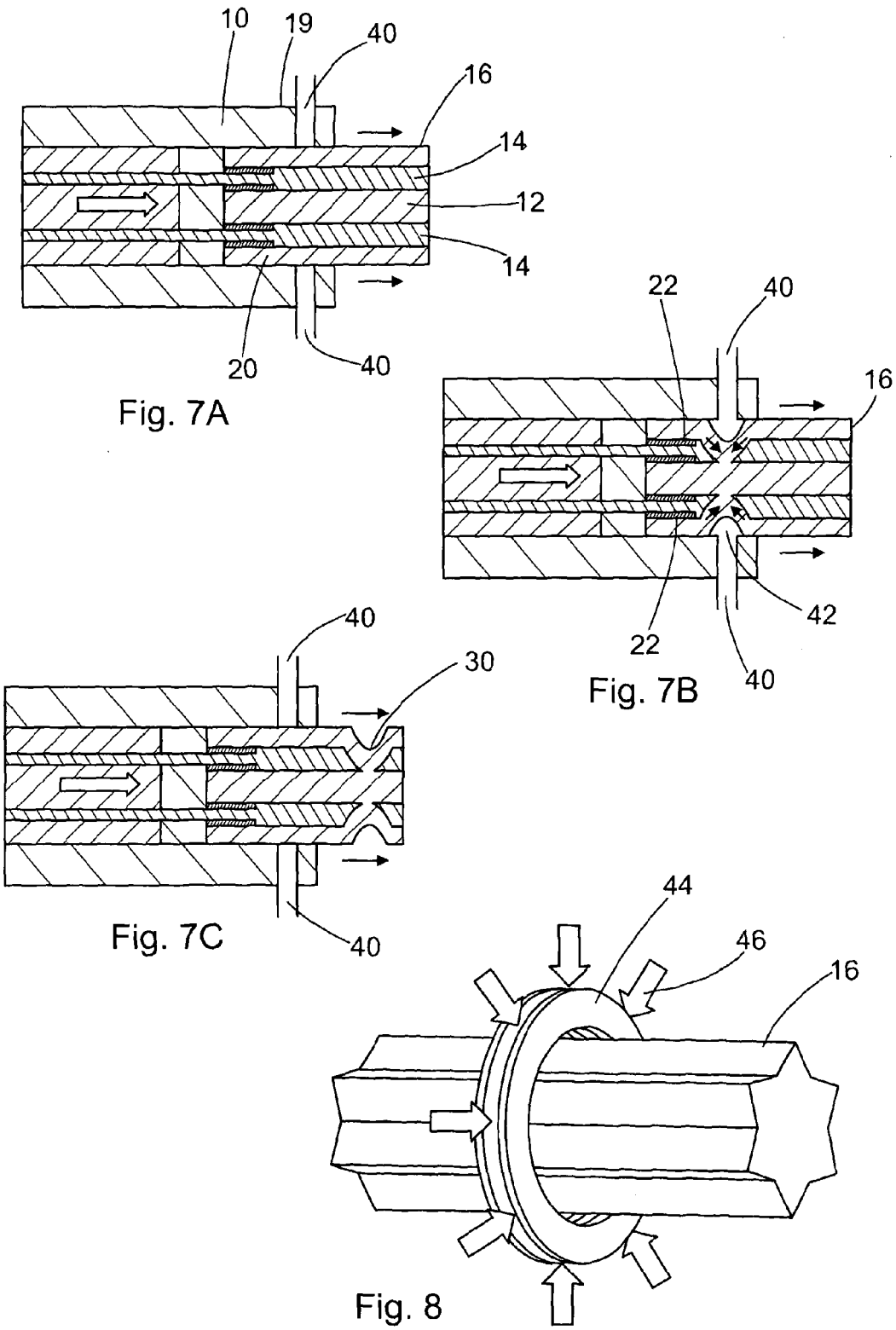
FIGS. 7A to 7C are a series of schematic cross sectional views though part of an apparatus in accordance with the invention and part of an extrudate body produced using the apparatus, illustrating a fourth technique in accordance with the invention.
FIG. 8 is a schematic perspective view of an air crimping ring in position about part of an extrudate body, the ring forming part of an apparatus in accordance with an embodiment of invention for carrying out a variation of the fourth technique.

Rather than using compressed fluid internally to displace the chocolate extrudate radially outwardly, in a fourth technique, pressurised air, or another suitable fluid, is used externally to crimp the liquid filled chambers closed as illustrated in FIGS. 7A to 7C. In this arrangement, the external part 19 of the die 10 is extended beyond the downstream ends of the, injectors 22. A pressurised air supply 40 is selectively connectable with a ring shaped outlet 42 on the inside extrusion aperture in the outer part of the die so as to form a ring of compressed air encircling the exterior of the extrudate body 16 immediately downstream from the ends of the injectors 22. In order to form an intermediate section 30 in the extrudate body, pressurised fluid is supplied to the outlet 42 to form a ring of pressurised fluid which applies pressure to the exterior surface of the extrudate body forcing the chocolate 12 inwardly to rapidly crimp the liquid filled chambers 18. Once an intermediate section 30 of the required length has been produced, the pressurised fluid supply 40 is disconnected from the outlet 42 so that the liquid filled chambers 18 are reformed.

This arrangement produces an extrudate body 16 having a series of compressed intermediate sections 30 with no liquid filled chambers which can be easily cut to produce individual confectionery products. This fourth technique can be advantageously combined with the first, pulsed filling flow technique so that ring of pressurised fluid is applied whilst the flow of filling 14 is stopped or at least significantly reduced.

In some applications, it may be desirable to crimp the extrudate body 16 at a position downstream from the die 10 where the chocolate has partially solidified. In this case, an pressurised fluid ring crimping arrangement 44 can be formed separately from the die 10. This arrangement is illustrated schematically in FIG. 8, in which the arrows 46 indicate a pressurised fluid stream.

Figure 9:
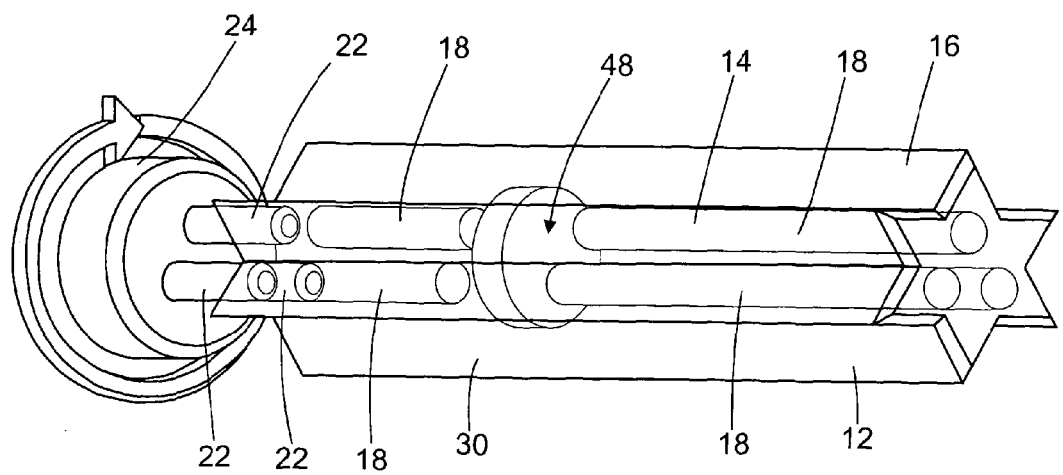
FIG. 9 is a schematic perspective view of an inner part of a die forming part of an apparatus in accordance with an embodiment of the invention and part of an extrudate body, illustrating a fifth technique in accordance with the invention.

A fifth technique for producing intermediate sections 30 in the extrudate body involves moving the position of the liquid outlets 22 in the inner die portion is illustrated schematically in FIG. 9. FIG. 9 shows only an inner part 24 of an extruder die having three outlet injectors 22 for the liquid filling material. In this embodiment, the inner die portion 24 is periodically caused to spin or continuously rotate in order to produce an intermediate section 30 having no filled chambers 18. Continuously rotating the injectors 22 in this way creates a central disc shaped region 48 in the extrudate body which contains a mixture of the chocolate and the liquid filling material. If the inner die portion 24 is rotated slowly a thin spiral of the liquid filling material 14 is formed in the chocolate 12 whilst rotating the inner die more quickly will produce a more thorough mixture of the chocolate and liquid filling. After a section 30 of the required length has been produced, the inner die 24 is held stationery so that chambers 18 containing the liquid filling material 14 are again produced in the extrudate body.

Where the filling material is a flowable confectionery material, it is necessary to ensure that the mixture 48 of chocolate 12 and filling material 14 is able to solidify sufficiently to seal the chambers and that no significant holes or imperfections are produced in the section 30 that would prevent it from sealing the ends of the chambers 18 when the extrudate body is cut into individual lengths.

Figure 10A:
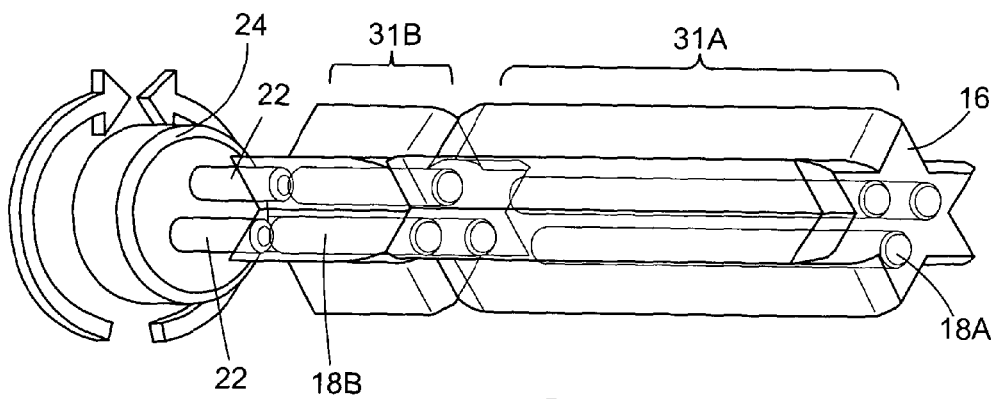
FIG. 10A is a view similar to that of FIG. 9 but illustrating an alternative embodiment of apparatus in accordance with the invention in which the fluid outlets for the second material are movable between two discrete positions.
Figure 10B:
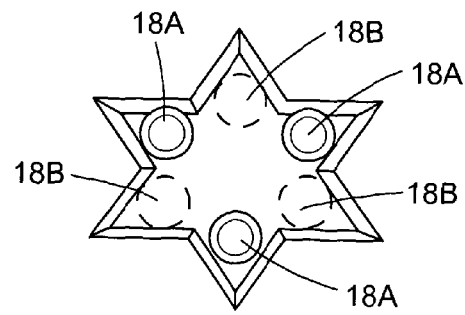
FIG. 10B is a schematic, lateral cross sectional view through an extrudate body produced using the apparatus illustrated in FIG. 10A.

The concept of moving the position of the fluid outlets for the filling material can also be used as part of the first technique of pulsing the flow of the filling material is illustrated in FIGS. 10A and 10B. In this arrangement, the inner portion 24 of the die is rotatable between two angular positions and is moved from one to the other whilst the flow of liquid filling material is stopped. This results in chambers 18 being formed in adjacent filled sections 31 that are angularly offset from one another as indicated at 18A and 18B in FIG. 10B. In the embodiment shown, this is achieved by partially rotating part of the inner die portion 24 whilst the flow of the liquid filling material is stopped to alternately move the injectors between a first position and second position. Thus, with the injectors 22 in a first position, the liquid filling material 14 is fed through the injectors to form liquid filled chambers 18A in a first filled section 31A of the extrudate body. When an intermediate section 30 of the extrudate body is to be produced, the flow of the filling material 12 is stopped or reduced as described above in relation to the first technique. Whilst the flow of filling is stopped or reduced, the inner die 24 is partially rotated to move the injectors 22 to the second position. The flow of filling 12 is recommenced with the injectors in the second position, so that chambers 18B are formed in a second filled section 31B of the extrudate body in a position which is offset from the chambers 18A in the first portion. When the next intermediate section 30 is produced, the inner part 24 of the die is rotated to move the injectors 22 back to the first position and the process repeated.

Offsetting the position of the filled chambers 18 either side of each intermediate section 30 helps to reduce stringing or carryover of the liquid filling material as the flow is stopped. This produces end caps 30A, 30B which contain fewer imperfections and which are better able to seal the chambers 18. The outer part of the die 10 containing the aperture 20 need not be moved so that the external appearance of the extrudate body 16 is not affected. In the embodiment illustrated, the extrudate body 16 has a star shaped outer profile in section and there are three injectors 22 arranged generally in a triangular configuration. It will be appreciated however, that the number and location of the injectors and the outer profile of the extrudate body 16 can be varied as desired. This approach can also be combined with either of the second or third techniques to prevent or reduce external deformation of the extrudate body 16 whilst the flow of the liquid filling material 14 is stopped or reduced.

Figure 11A:
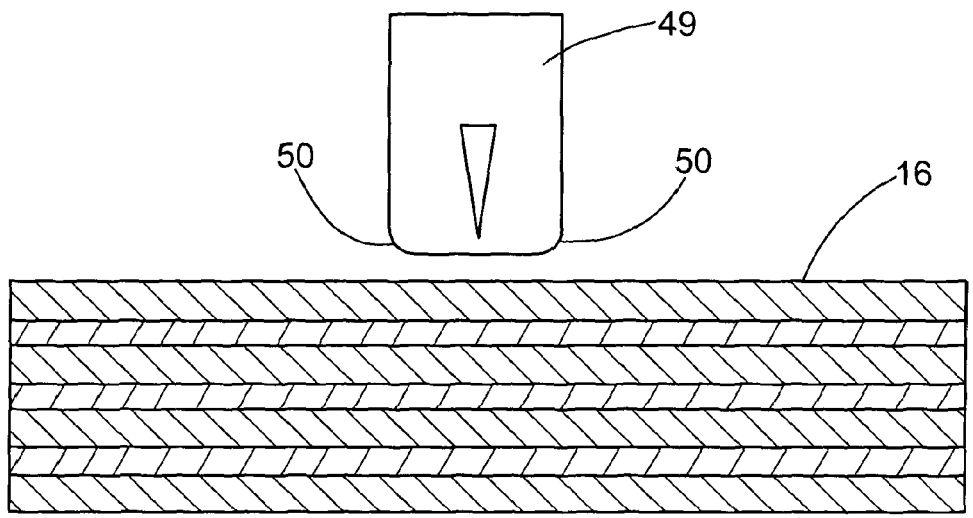
FIGS. 11A to 11D are a series of schematic cross sectional views through an extrudate body of material illustrating use of a crimp bar to carry out a sixth technique in accordance with the invention.
Figure 11B:
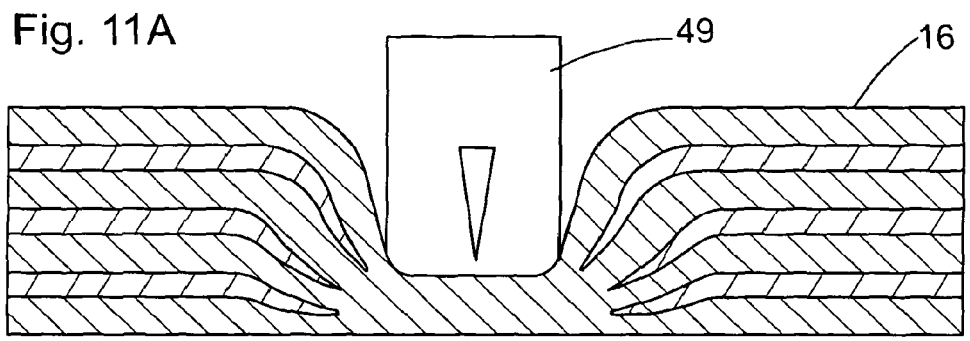
Figure 11C:
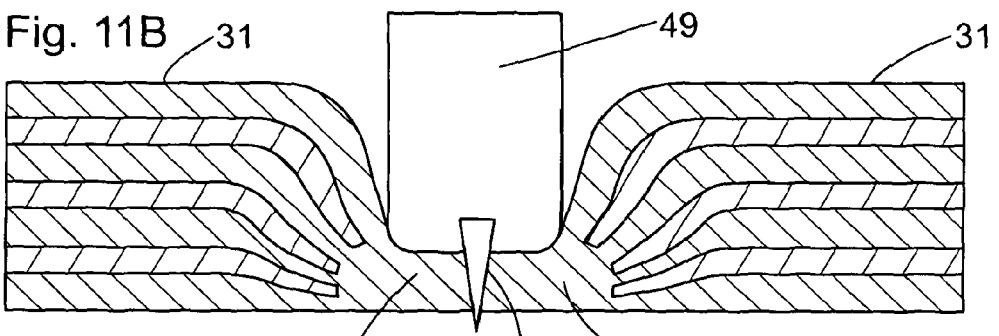
Figure 11D:
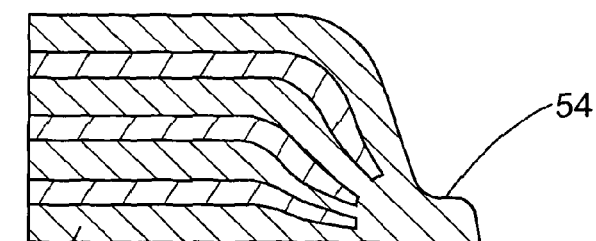

A sixth technique, which may be considered a variant of the fourth technique, is illustrated in FIGS. 11A to 11D and comprises using a mechanical crimp member or bar 49 to externally crimp the extrudate body forcing the liquid filling along the chambers 18 away from the ends of the individual lengths of extrudate body. The crimp bar has rounded edges 50 so that it tends to compress the chocolate rather than simply cut through it. This operation may be combined with the step of dividing the extrudate body into individual lengths and the crimp bar may be combined with a retractable blade 51 which is extendable to cut a compressed region 52 of the chocolate after the extrudate body has been crimped. As shown in FIG. 11D, this technique produces individual lengths or products 32 having a thin end 54 but a raising bar or further crimping heads can be used to shape the end of the product. Crimping of the extrudate body in this way likely to be carried out downstream from the die after the chocolate 12 has partially solidified. This technique can also be combined with the first, pulsed filling flow technique so that the extrudate body 16 is crimped at regions having no or reduced amounts of liquid filling.

Various embodiments for carrying out the extrusion techniques discussed generally above will now be described in more detail.

Figure 12:
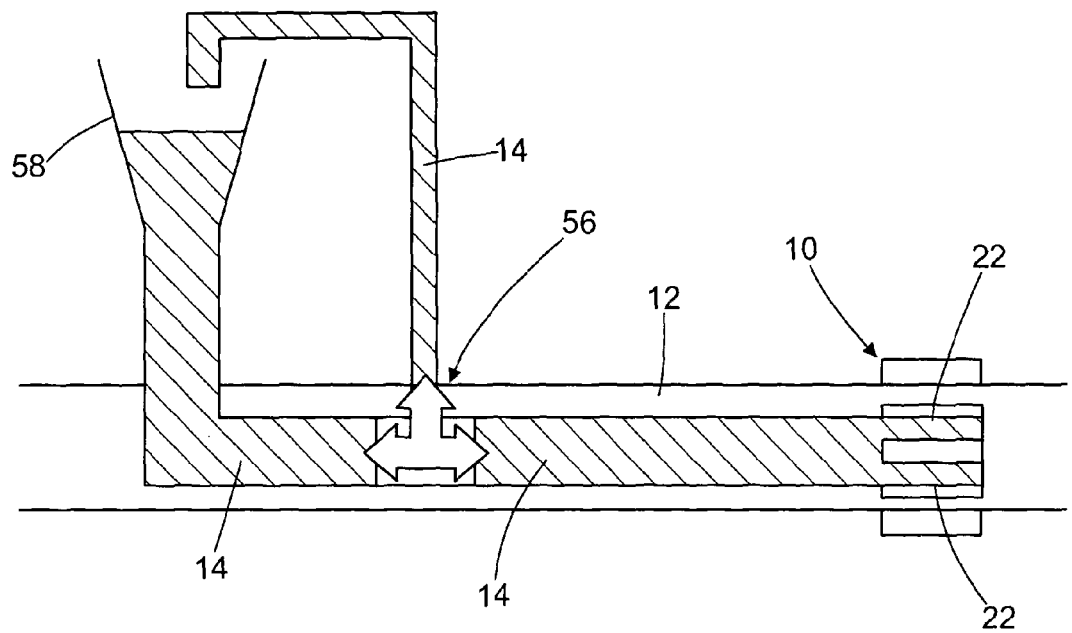
FIG. 12 is a schematic cross sectional view through an embodiment of an apparatus in accordance with the invention adapted for carrying out the first technique in accordance with the invention.

The first technique of pulsing of the liquid filling material can be achieved in a number of ways. Where the liquid filling material is supplied by means of a pump, the pump can be periodically stopped or slowed in order to stop or reduce the flow of filling material through the injectors 22 or other fluid outlets. In an alternative arrangement, which can be used regardless of the means used to deliver the liquid filling material to the injectors 22, one or more valves can be provided in the supply path to the injectors 22 with suitable control means to periodically close, or partially close, the valve(s) in order reduce or stop the flow of filling material through the injectors 22. The valve may be a simple on/off valve or, as illustrated schematically in FIG. 12, the valve may be a diverter valve 56 arranged to divert the liquid filling material back to a header tank 58 or other storage arrangement whilst the flow of liquid material through the injectors 22 is stopped or reduced.

Figures 13A, 13B:
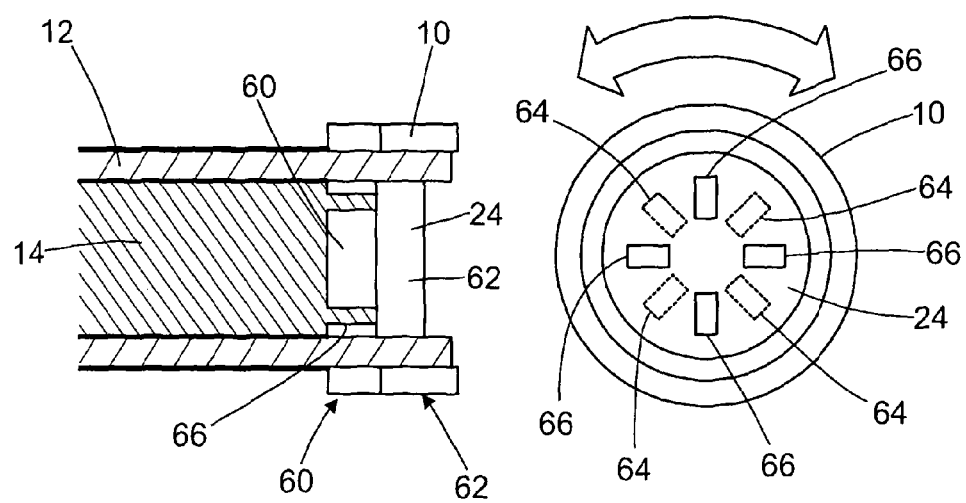
FIG. 13A is a schematic cross sectional view through part of an apparatus in accordance with the invention, illustrating an alternative arrangement for carrying out the first technique.
FIG. 13B is an end view of an extruder die forming part of the apparatus shown in FIG. 13A.

A further arrangement for pulsing the flow of filling 14 is illustrated schematically in FIGS. 13A and 13B. The inner part 24 of the die 10 comprises a rear or downstream element 60 which is rotatable and a forward or upstream element 62 which is static. The static element 62 has one or more openings 64 which may be in fluid connection with the injectors or which may themselves define fluid outlets through which the liquid filling material 12 flows into the extrudate body. The rotatable rear element 60 has corresponding openings 66 which align with the openings 64 in the static element at one or more rotational positions of the rear element to allow the liquid filling material 14 to flow through the outlets. When the holes 64, 66 are out of alignment, the flow of filling is stopped. With this arrangement, the rear element 60 is rotated to periodically open and close the flow path through the die head for the liquid filling material 14. The rear element 60 may be continually rotated in one direction to open and close the flow path or it may be moved in a stepwise or even reciprocal manner. In an alternative arrangement, the front element may be rotatable and the rear element stationery. The openings 64, 66 in the two elements may be the same size and shape or they may be different to create a particular flow pattern. The openings 64 in the front element 60 could be ramped, for example.

Figure 14:
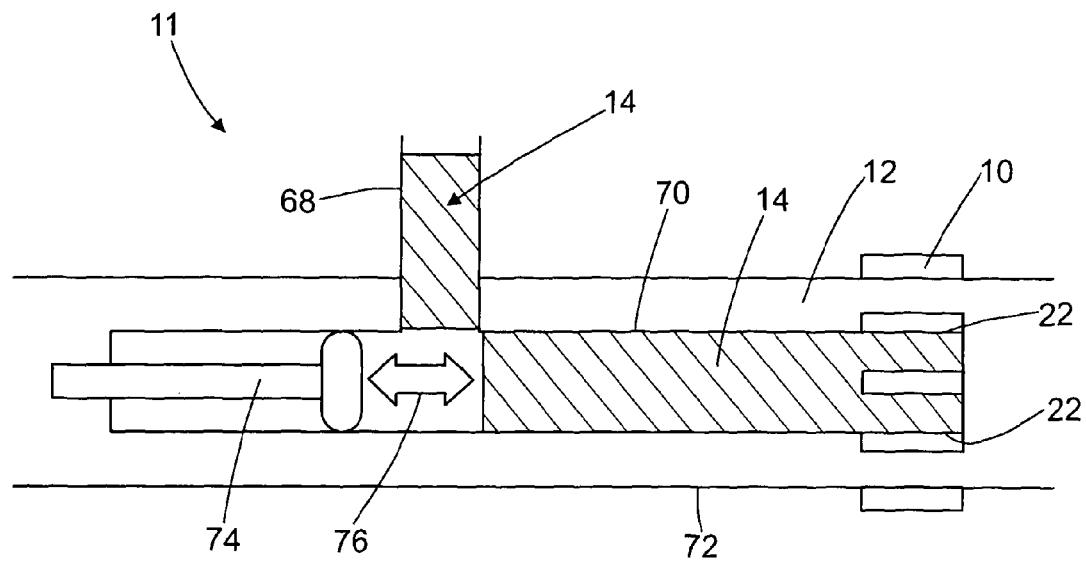
FIG. 14 is a schematic cross sectional view through a further embodiment of an apparatus in accordance with the invention illustrating a yet further arrangement for carrying out the first technique in accordance with the invention.

FIG. 14 illustrates use of a reciprocating ram to pulse the liquid filling material along the filling material supply path. In the arrangement shown, the liquid filling material is supplied to the injectors 22 by means of a pump (not shown) through a first conduit 68 to a central conduit or supply tube 70 which is located inside part of an outer conduit or barrel 72 of the extruder apparatus 11. The chocolate 12 is delivered to the die 10 through an annular gap between the inner tube 70 and the outer barrel 72. A reciprocating ram 74 is located in the liquid flow line and a mechanism is provided to move the ram rearwardly (to the left as shown) and forwardly (to the right as shown) between retracted and advanced positions as indicted by the arrow 76. Moving the ram 74 rearwardly from an initial position to a retracted position increases the volume of the liquid flow line, temporally stopping the flow of filling 14 through the injectors 22 so that an intermediate section 30 of the extrudate body having no liquid chambers is extruded. Once a section 30 of the required length has been produced, the ram 74 is advanced back to the initial position to pump liquid through the die and to extrude liquid filled chambers in the extrudate body. Repeatedly moving the ram 74 between the initial and retracted positions at an appropriate rate produces an extrudate body having intermediate sections 30 spaced along its length without having to stop the pump. Typically, the ram 74 will be retracted at a faster average rate than it is advanced In an alternative arrangement which is not illustrated, a reciprocal ram can be periodically retracted to draw filling from a supply, such as a header tank, and advanced to deliver the liquid filling material to the die injectors 22 in a pulsed flow. One way check valves are used to control the flow of the liquid filling material as required. A pulsed flow of the liquid filling material can also be provided by means of individual rams or pins in each of the injectors which are reciprocated to produce a pulsed flow.

Figure 15A:
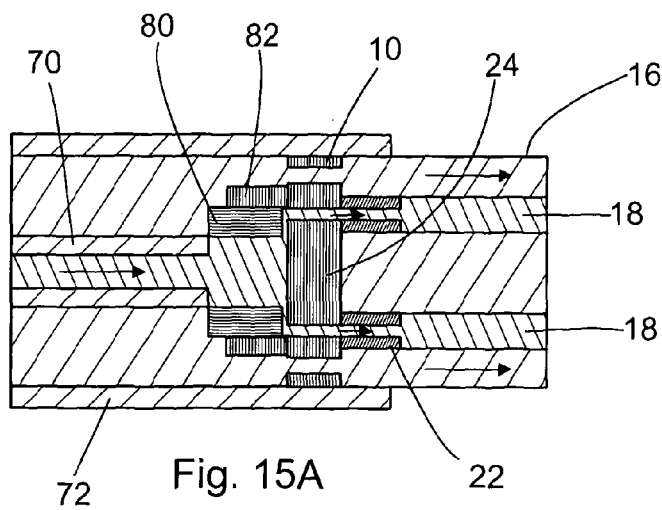
FIGS. 15A and 15B are schematic cross sectional views through an extruder die forming part of an apparatus in accordance with a yet further embodiment of the invention, illustrating use of a moving shuttle for carrying out a combination of the first and second techniques in accordance with the invention.
Figure 15B:
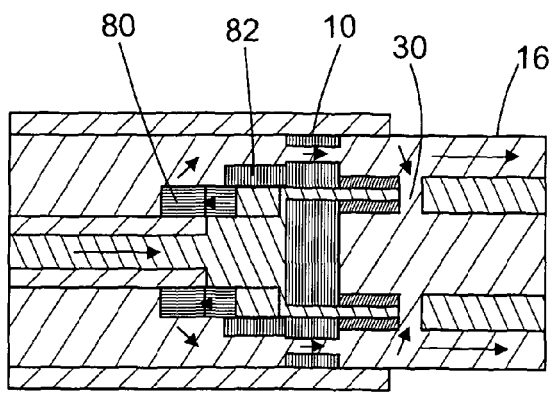

FIGS. 15A and 15B illustrate a further embodiment for pulsing the flow of the liquid filling 14 which uses a flow control device in the form of reciprocating member 80 in the liquid flow path. The drawings show the die head 10 and an end region of an inner tube 70 through which filling is supplied to the inner part 24 of the die and injectors 22. The inner part 24 of the die 10 has a rearwardly projecting annular flange portion 82 having a larger inner diameter than the outer diameter of the liquid feed tube 70 and which overlaps an end region of the tube 70 by a small distance. The reciprocating member 80 is in the form of a tubular shuttle which is slidably mounted about the outer diameter of the tube 70 and inside the annular portion 82 of the inner part 24 of the die. Part of the reciprocating member 80 is located inside the annular flange 82 of the inner part of the die, which forms an integral part of the liquid supply path. Appropriate seals are provided to prevent the liquid filling material 14 from leaking between the reciprocating member 80 and the tube 70 and between the reciprocating member 80 and the annular portion 82 of the inner part 24 of the die 10.

The reciprocating member 80 is reciprocally movable at least between a nominal advanced position (which can be considered a first position) as shown in FIG. 15A and a nominal retracted position (which can be considered a second position) as shown in FIG. 15B. In the advanced position, a larger proportion of the reciprocating member 80 is located inside the liquid supply path line that when it is in the retracted position. Accordingly, moving the reciprocating member 80 rapidly from the advanced position to the retracted position during extrusion will cause a sudden increase in the volume of the liquid supply path. This temporally stops the flow of liquid filling through the injectors 22 and can also be arranged to draw the liquid filling material back from the injectors 22 to give a rapid cut-off in the flow. Whilst the flow of filling is stopped, the chocolate continues to be extruded to produce an intermediate section 30 in the extrudate body which comprises only, or at least predominantly, the chocolate. After a period time, the enlarged liquid supply path will re-fill and the liquid filling material 14 will again begin to flow through the injectors 22 to produce liquid filled chambers 18 in the extrudate body 16. During this phase of the extrusion, the reciprocating member 80 is moved forward slowly to the advanced position ready to be retracted again to produce the next intermediate section 30.

In many applications, it is preferable to have greater control when restarting the flow of the filling material. In these cases, the flow of the filling material is restarted by advancing the reciprocating member 80 before the enlarged supply path has refilled sufficiently for the filling material to start flowing again of its own accord. In this arrangement, it is necessary to ensure that movement of the reciprocating member to the retracted position increases the volume of the second, filling material supply path sufficiently to accommodate at least a volume of the filling material 14 equivalent that that which would have been delivered through the injectors 22 during the period when the intermediate section is being extruded. The volume increase in the supply path required may vary depending on the nature of the filling material. For example, where the filling material is viscous such as a caramel, the volume increase may have to be significantly larger than the volume of the filling material that would normally be delivered through the nozzles during the period when the intermediate section is being extruded.

Controlling the flow of the filling material by varying the volume of the supply path for the second material 14 is advantageous as the flow control can be carried out close to the extruding face and the flow of second material from the source to flow control mechanism is not stopped. This is beneficial as there is less risk of material solidifying the supply path or of damaging the pump or other supply device which is used to move the liquid filling material along the supply path. Furthermore, rapidly increasing the volume of the second material supply path can be used to such or draw back the second material from the fluid outlets 22 as previously discussed. In this case, however, it is necessary for the flow path from the flow control mechanism to the fluid outlets remains open.

In the flow control device as shown in FIGS. 15A and 15B, a rear portion 80a of the reciprocal member 80 is arranged to project into the supply path for the chocolate, at least when the reciprocal member is in the retracted position. This is illustrated in FIG. 15B in which the chocolate is supplied to the die 10 along an annular passage between the inner tube 70 and the outer barrel 72. This has the benefit that retracting the reciprocal member 80 simultaneously reduces the volume of the chocolate flow line causing a surge in the flow of the chocolate 12 through the die as the flow of the liquid filling material 14 is stopped. By appropriate design, it can be arranged that the total volume of material extruded remains substantially constant so as to reduce or eliminate external deformation of the extrudate body 16.

The limits of movement of the reciprocating member 80 can be adjustable. This would enable the same apparatus to be used to produce a range of products having end cap regions of differing thickness and/or differing overall length. In addition, movement of the reciprocating member 80 can also be used during the filling phase to produce different extrusion effects. Thus the reciprocating member 80 can be used to form the intermediate sections 30 and also to vary the cross section of the extrudate body or the chambers along each individual product length between the intermediate sections 30, for example. The reciprocating member may be arranged so that it can be advanced beyond the nominal advanced first position to increase the flow of the liquid filling material and to decrease the flow of the chocolate to produce particular extrusion effects. Several embodiments of apparatus incorporating a reciprocating member 80 as part of a flow control device and variations thereon will be described in more detail below with reference to FIGS. 18 to 21.

Several arrangements for creating a surge of the chocolate at the die will now be described.

Where the chocolate is pumped to the die 10, a simple method of creating a surge is to temporally boost the speed of the pump to accelerate the flow of chocolate through the die. In an alternative approach, rather than increasing the rate of flow of the chocolate through the die, the belt onto which the chocolate is extruded can be temporally stopped or its speed reduced to cause an effective increase or surge of the chocolate in the die. During normal extrusion conditions whilst the liquid filled chambers are being produced, the speed of the belt is synchronised with the rate of extrusion so that the extrudate body is carried away from the extruder die without being deformed. If the belt is temporality stopped or its speed reduced, the extrudate body 16 is not moved away from the die but the chocolate continues to be fed through the die at the same rate. This causes a build up or surge of the chocolate at the die which collapses the chambers 18 to produce an intermediate section 30. After a period of time, the belt 84 is re-started or re-synchronised and the chambers 18 are re-formed. The flow of liquid filling material may be stopped or reduced whilst the belt is stopped or its speed reduced.

In the arrangement schematically illustrated in FIGS. 16A and 16B, a reciprocal ram 94 is located in the flow line for the chocolate 12. To create an intermediate section 30, the ram 90 is advanced rapidly to increase the flow rate through the die as shown in FIG. 16B. After an intermediate section 30 of appropriate length has been produced, the ram 90 is retracted slowly and the liquid filled chambers 18 are reformed in the extrudate body. The ram can also be used to surge or reduce the flow of the chocolate at other times to produce alternative extrusion effects on the extrudate body.

Many alternative arrangements for surging the flow of chocolate can be used. For example, an arrangement for selectively varying the resistance to flow of the chocolate can be incorporated in the flow line. By periodically and momentarily reducing the resistance to flow, a temporary surge in the flow of the chocolate is produced. Alternatively, an arrangement can be provided in which a volume of the chocolate is allowed to build up in a reservoir close to the die together with a mechanism for displacing the built up volume into the die to create a surge. Thus, during normal extrusion when the liquid filled chambers are being formed in the extrudate body, a volume of the chocolate is accumulated close to the die. When an intermediate section of extrudate body is to be produced, the accumulated volume is displaced into the die to create the required surge of chocolate.

In another alternative arrangement which is not shown, the chocolate 12 is supplied to the die 10 under pressure by means of an auger pump screw which can be selectively moved in an axial direction within a portion of the chocolate flow line. To create a surge of the chocolate, the auger screw is advanced rapidly. The resultant surge in chocolate causes the liquid filled chambers to collapse to produce an intermediate section 30 having no chambers. After the surge in chocolate has stopped, the liquid chambers 18 in the extrudate body 16 re-form and the auger screw is slowly retracted to its initial position. The process is repeated periodically.

In all the arrangements described so far, the chocolate continues to flow through the same supply path or flow lines when it is being surged as when it is not. The flow of chocolate is thus pulsed by varying the volumetric flow rate through the supply path to the die. In alternative arrangements, an additional flow line or supply path may be used to create a surge or increase in the chocolate at the die head.

An arrangement for alternately supplying filling material 14 and chocolate 12 to the injectors 22 as discussed above in relation to FIGS. 5A to 5E will now be described.

FIGS. 17A and 17B illustrate apparatus in which the liquid filling material is supplied to the inner die part 24 by means of an inner tube 100 with the chocolate being supplied to the die through an annular passage between the inner tube 100 and an outer tube 102. The inner tube 100 is axially movable between an advanced position as shown in FIG. 17A and a retracted position as shown in FIG. 17B. When the inner tube 100 is in the advanced position, the forward end of the tube is in engagement with the inner part 24 of the die and filling material 14 is supplied to the injector nozzles 22 to produce liquid filled chambers 18 in the extruded extrudate body 16. When the inner tube 100 is retracted, its forward end partially or fully disengages from the inner part 24 of the die to open a flow path by means of which the chocolate is able to enter the inner part of the die to be extruded through the injectors 22. With the inner tube 100 retracted, an intermediate section 30 of the extrudate body with no liquid filled chambers 18 and comprising substantially only the chocolate 12 is extruded. The supply of liquid filling material along the inner tube 100 will usually be stopped whilst the inner tube is retracted. The inner tube 100 need not completely disengage from the inner part 24 of the die, provided that retraction of the inner tube opens a flow path from the chocolate to the injectors 22. For example, there may be inlet openings formed about the inner die through which the chocolate can flow to the injectors 22 when the inner tube 100 is retracted without the inner tube disengaging from the die. The flow of chocolate along the supply path may be increased when the intermediate sections are being extruded and chocolate is being directed through the injectors 22.

Various other arrangements can be used to alternately direct the chocolate 12 and liquid filling material 14 through the injectors 22. These could include rotary inner die arrangements in which the injectors 22 are alternately connected with supply lines for the liquid filling material and the chocolate. Alternatively, the inner part of the die may be arranged for linear movement in an axial direction or other translatory movement to alternately connect the injectors 22 with supply lines for the liquid filling material and the chocolate. In a further alternative arrangement, one or more valves can be used to alternately connect the injectors 22 with the liquid filling material and chocolate supply lines.

Figure 18:
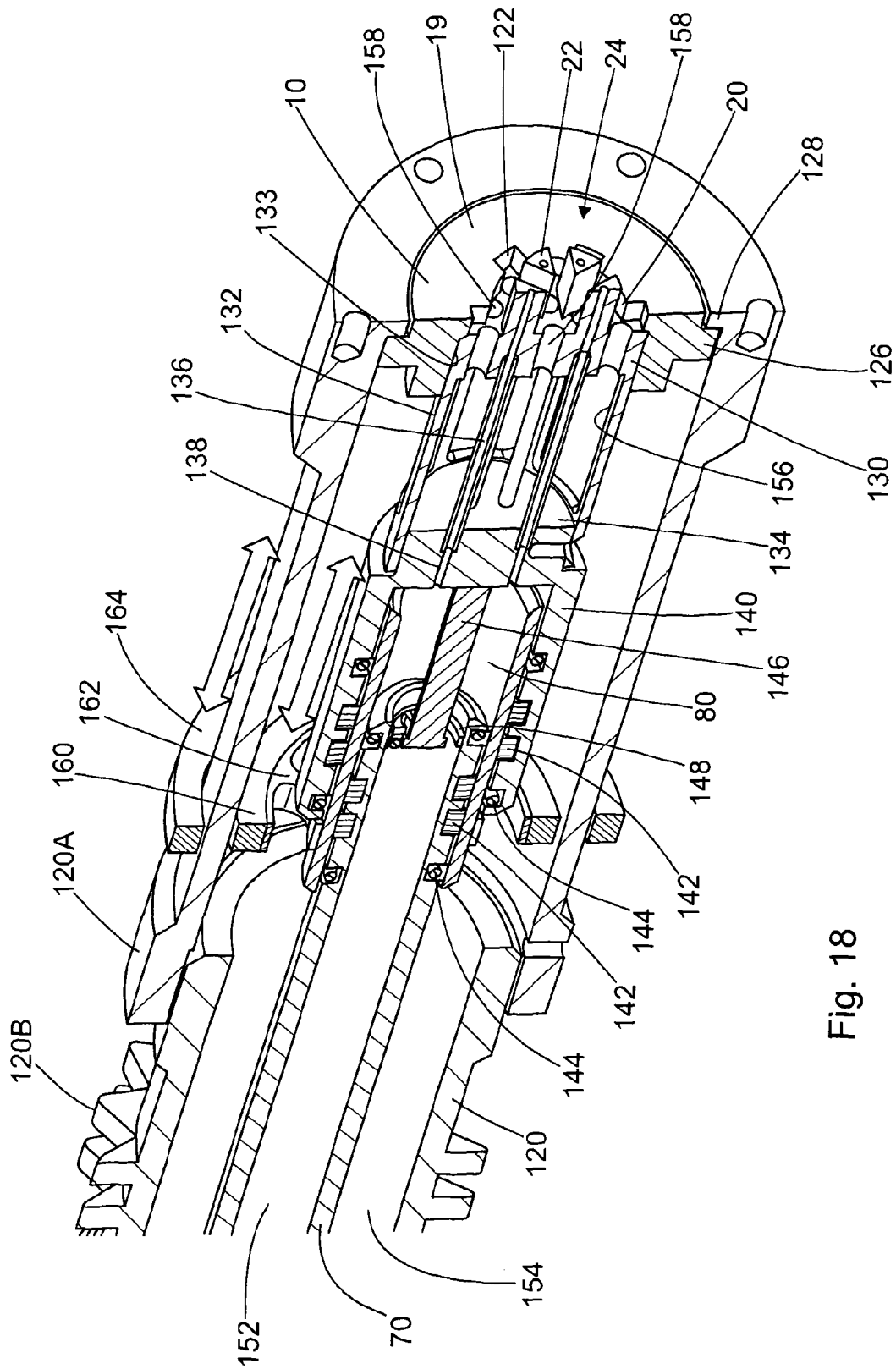
FIG. 18 is a perspective sectional view through a die head region of an apparatus in accordance with an embodiment of the invention, the apparatus incorporating a moving shuttle similar to that illustrated in principle in FIGS. 15A and 15B.

A more detailed embodiment of an apparatus 11 in accordance with the invention and which incorporates a flow control device comprising a reciprocal shuttle member arrangement of the type described above with reference to FIGS. 15A and 15B is illustrated in FIG. 18.

The apparatus 11 comprises an outer supply tube or conduit 120 in the form of an extruder barrel. The extruder barrel 120 includes a number barrel sections 120A, 120B assembled together in a known manner. An extruder die 10 is mounted to a forward or downstream end of the barrel 120. The extruder die 10 comprises an annular outer die part 19 having a central extrusion aperture 20. The aperture 20 in this embodiment is generally circular with a number of radially outwardly extending recesses 122 equi-spaced around its periphery. The outer part 19 of the die can be mounted in the extruder barrel using any suitable arrangement as known in the art. In the present embodiment, which is illustrated somewhat schematically in FIG. 18, the outer part 19 of the die has a main body portion 124 from which a radial flange 126 projects outwardly for location behind an inwardly projecting flange 128 at the downstream end of the barrel 120.

The die 10 further includes an inner die part 24 including a multiplicity of spaced apart injectors 22 which are disposed within aperture 20. The injectors 22 are of segmental shape with their inner peripheries arranged on a pitch circle centred on the axis of the aperture 20 so that they are spaced apart about a core-forming space. The injectors 22 extend axially from an outer face of an apertured plate 130. The aperture plate 130 is formed at one end of a cylindrical cage 132. The outer periphery of the plate 130 is circular and locates in a circular recess 133 in the outer die part 19, the respective mating surfaces thereof being sufficiently close to provide an effective seal against passage of extrudable material there between. In the present embodiment, the inner die part 24 is stationary relative to the outer die part 19. However, in alternative embodiments, the outer periphery of the support plate 130 can be arranged to serve as a bearing surface for the outer die part 19 which is an accurate sliding fit there over so that relative rotation between the support plate 130 and the outer die part 19 is permitted. The support cage 132 is firmly secured to a manifold 134. Pipes 136 extend in spaced apart relationship between the manifold 134 and the support plate 130 and serve to connect bores 138 in the manifold with respective injectors 22.

A cylindrical, annular flange 140 projects rearwardly from the manifold 134 within the barrel 120. An inner tube 70 for the liquid filling material 14 is mounted concentrically within the barrel 120 and has a forward end which projects inside the cylindrical annular flange 140 of the manifold by a short distance. The inner tube 70 and the annular flange 144 can be considered as first and second sections of an inner conduit forming part of a supply path for delivering the second liquid filling material to the die head 10. The outer diameter of the inner tube 70 is smaller than the inner diameter of the circular annular flange so that there is an annular gap between the two. A cylindrical, tubular shuttle member 80 is slidably mounted in the annular gap between the inner tube 70 and the annular flange 140. Seals 142 are mounted about the forward end of the inner tube 70 and inside the cylindrical annular flange 140 to prevent extrudable material from passing between the shuttle member 80 and the inner tube and between the shuttle member 80 and the annular flange 140. Bearings 144 are also provided on the exterior of the inner tube 70 and the interior of the annular flange 140 to slidably support the shuttle member. The forward end of the inner tube 70 is supported by means of a rod 146 which projects rearwardly from the manifold 134. An annular flange 148 on the rear end of the support rod 146 contacts the inner surface of the inner tube 70. Apertures in the annular flange allow for the flow of liquid filling material 14 past the flange.

The interior of the inner tube 70, the interior of the annular flange 140, the bores 138 in the manifold and the pipes 136 all form part of a second material supply path 152 by means of which liquid filling material 14 is delivered to the injectors 22 of the inner part 24 of the die. An annular passage defined between the barrel 120 and the outer surfaces of the inner tube 70, the annular flange 140 and the manifold 134, form part of a first material supply path 154 by means of which the chocolate is supplied to the die 10. Upstream of the manifold, the chocolate 12 flows through apertures 156 in the cage and through the apertures 158 in the plate 130 to pass through the central extrusion aperture 20 in outer part 19 of die, between the injectors 22 and into the core region inside the inner peripheries of the injectors.

The shuttle member 80 is slidably moveable in an axial direction of the barrel 120 between a nominal advanced first position, as shown in FIG. 18 and a nominal retracted second position. When in the advanced position, a forward end part of the shuttle projects inside the annular flange 140 beyond the forward end of the inner tube 70 to occupy a first volume of the second material supply path. In the present embodiment, a rear end region of the shuttle member also projects beyond the downstream end of the annular flange 140 about the inner tube 70 so as to occupy a first volume of the first material supply path. Movement of the shuttle member rearwardly to the second retracted position reduces the extent by which the shuttle projects into the second material supply path whilst increasing the amount by which the shuttle projects into the first material supply path. Thus moving the shuttle member 80 from the first advanced position to the second retracted position simultaneously increases the effective volume of the second material supply path 152 and reduces the effective volume of the first material supply path 154.

In operation, with the shuttle 80 in the nominal first advanced position, chocolate is extruded through the die 10 to form an extrudate body and the liquid filling material is extruded through the injectors 22 to produce liquid filled chambers in the extrudate body. When an intermediate section 30 is to be extruded, the shuttle member 80 is moved rapidly from the first nominal advanced position to the second nominal retracted position. The resultant rapid increase in volume of the second material supply path 150 reduces the pressure of the liquid filling material 14 at the injectors 22 so that delivery of the liquid filling material through the injectors 22 into the extrudate body is temporally stopped or at least significantly reduced. At the same time, the rapid reduction in volume of the first material supply path increases the pressure of the chocolate at the die resulting in a surge in the volume of the chocolate which is extruded. Whilst the flow of filling material 14 through the injectors 22 is stopped, an intermediate section 30 of the extrudate body having no chambers 18 and containing substantially only the chocolate is extruded. The shuttle member arrangement can be configured so that the surge in extrusion of the chocolate balances out the reduction in extrusion of the liquid filling material so that the overall volume of material extruded remains substantially constant.

Once an intermediate section of desired length has been extruded, the shuttle member 80 is moved back towards the first nominal advanced position to recommence formation of the liquid filled chambers in the extrudate body. The shuttle member 80 is typically moved back towards the first advanced position more slowly than it was retracted so as not to significantly affect the pressure the chocolate in the first material supply path. The shuttle member need not be moved between the first and second positions at a constant speed but the rate of movement can be varied as required. It should also be appreciated that the shuttle member 80 may be in continuous movement from the first position to the second position and then back to the first position over the course of a single extrusion cycle and need not be held.

The speed and distance over which the shuttle member 80 moves between the advanced and retracted positions and the thickness of the shuttle member can all be configured to extrude intermediate sections 30 of the required length. In one example in which it takes approximately 4 seconds to extrude an individual confectionery bar length of extrudate body (e.g. from the middle of one intermediate section to the middle of the next intermediate section), the shuttle member 80 had a thickness of about 2 mm and is moved though 80 mm from the nominal advanced position to the nominal retracted position in a time of around 0.1 to 0.4 seconds. The shuttle member is moved back to the advanced position over the remainder of the 4 second cycle. This produced intermediate sections 30 approximately 10 mm in length so that once the extrudate body is divided, the end caps at either end of each bar are approximately 5 mm thick.

It will be appreciated that various modifications can be made to the apparatus as described above whilst still functioning substantially as described. For example, the inner tube 70 and the annular flange 140 need not overlap, provided that the shuttle member 80 is adequately supported and sealed. Furthermore, when in the advanced position, the shuttle member 80 need not project beyond the upstream end of the annular flange into the first material supply path and when in the retracted position it need not project beyond the downstream end of the inner tube 70 into the second material supply path.

Any suitable actuation arrangement can be used to move the shuttle member 80 between the advanced and retracted positions. In the embodiment shown in FIG. 18, a magnetic drive arrangement is used. In this arrangement, a first annular or part annular magnet 160 is positioned close to the inner surface of the barrel 120 and is operatively connected with the shuttle member 80 by means of an annular flange 162 so that linear movement of the first magnet 160 in an axial direction of the barrel causes a corresponding linear movement of the shuttle member 80. Apertures in the flange 162 allow the chocolate to flow through to the die 10. A second magnet 164 is mounted about the exterior of the barrel 120 and is magnetically coupled to the first magnet so that linear movement of the second magnet 164 results in a corresponding movement of the first magnet 160 and hence of the shuttle member 80. A suitable actuator mechanism (not shown) is provided to move the second magnet 164. The actuator can be of any suitable form and could comprise a fluid actuated ram, a mechanical actuator, or an electro-magnetic actuator for example.

A magnetic drive arrangement of this nature is advantageous as it requires no mechanical linkages to pass through the outer barrel and hence there are no sealing requirements. Furthermore, a balanced load can be applied to the shuttle by using annular magnets or several part-annular magnets which encircle the shuttle. This reduces the risk of the shuttle member seizing.

Figure 19:
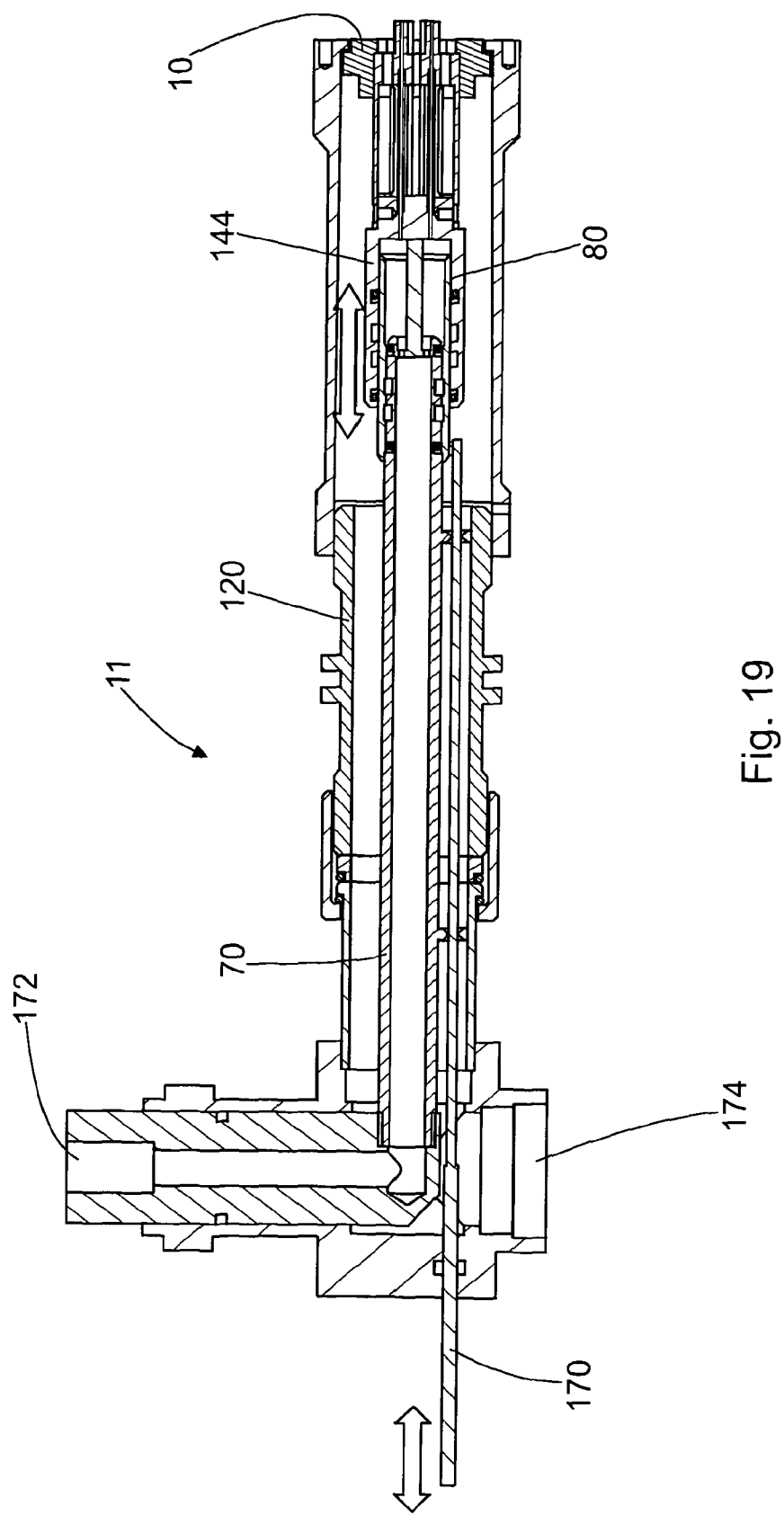
FIG. 19 is a cross sectional through part of an apparatus in accordance with a further embodiment of the invention, the apparatus incorporating a moving shuttle similar to that shown in FIG. 18 but illustrating an alternative actuator arrangement for moving the shuttle.

An alternative drive arrangement for the shuttle member 80 is shown in FIG. 19. In this arrangement, a push rod 170 is connected with the shuttle member and extends through a rear end of the extruder for cooperation with an actuator (not shown). Suitable seal arrangements are provided were the push rod passes through the outer conduit 120. FIG. 19 shows a rear end of the apparatus 11 including a first inlet port arrangement 172 through which the liquid filling material is introduced into the inner tube 70. A second inlet port arrangement 174 is fluidly connected with annular passage between then barrel 120 and the inner tube 70 for the chocolate.

Figure 20:
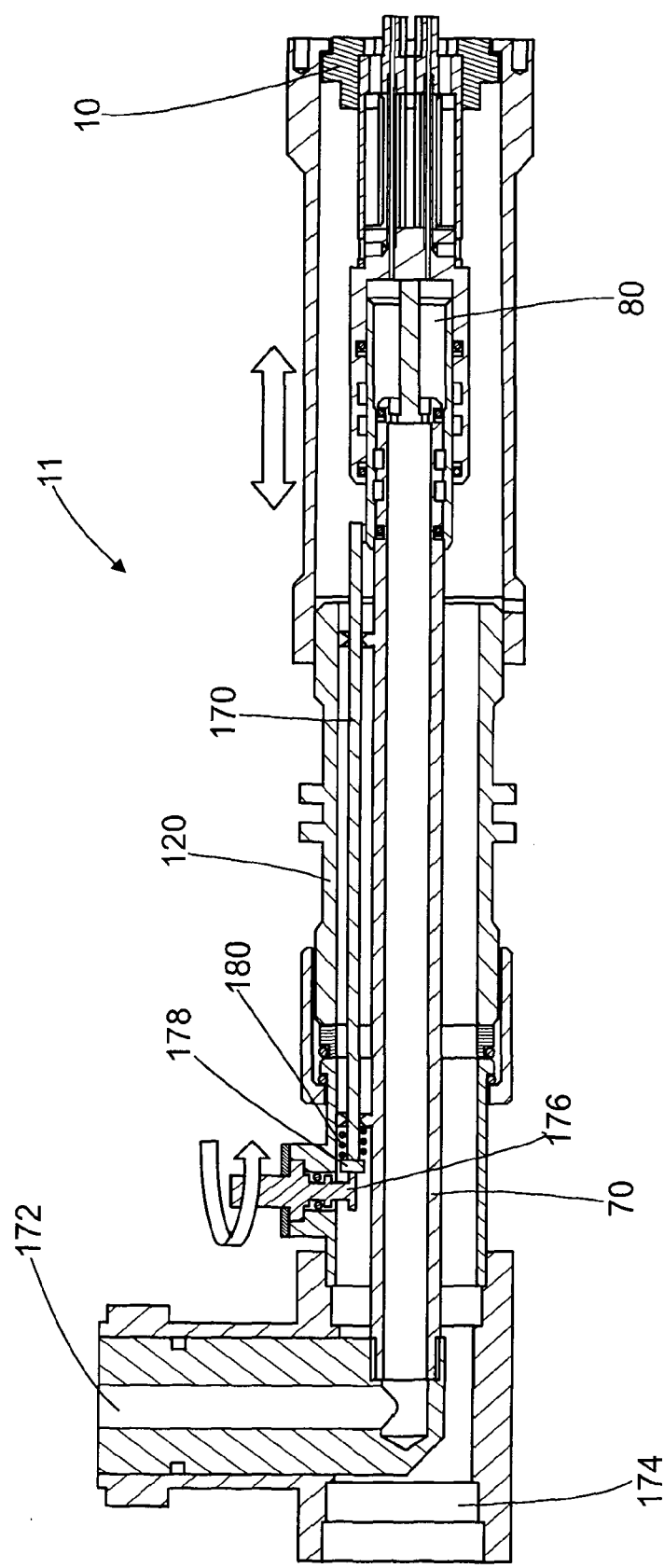
FIG. 20 is a view similar to that of FIG. 19 but showing a further embodiment of the apparatus having a yet further alternative actuator arrangement for moving the shuttle.

A yet further drive arrangement for the shuttle member 80 is illustrated in FIG. 20 in which a push rod 170 attached to the shuttle member is moved reciprocally by means of a rotary cam 176 mounted in a stationary section of the outer barrel. The cam 176 engages with a cam follower 178 on the end of the push rod 170 and a spring 180 holds the cam follower in engagement with the cam 176. In this case, the second port 174 is arranged in-line with the axis of the barrel. The cam 176 is driven by any suitable actuation arrangement (not shown). Rather than using a cam, a similar drive arrangement can be constructed by attaching the push rod 170 to a crank on the end of a rotary drive member which extends through the outer barrel.

Figure 21:
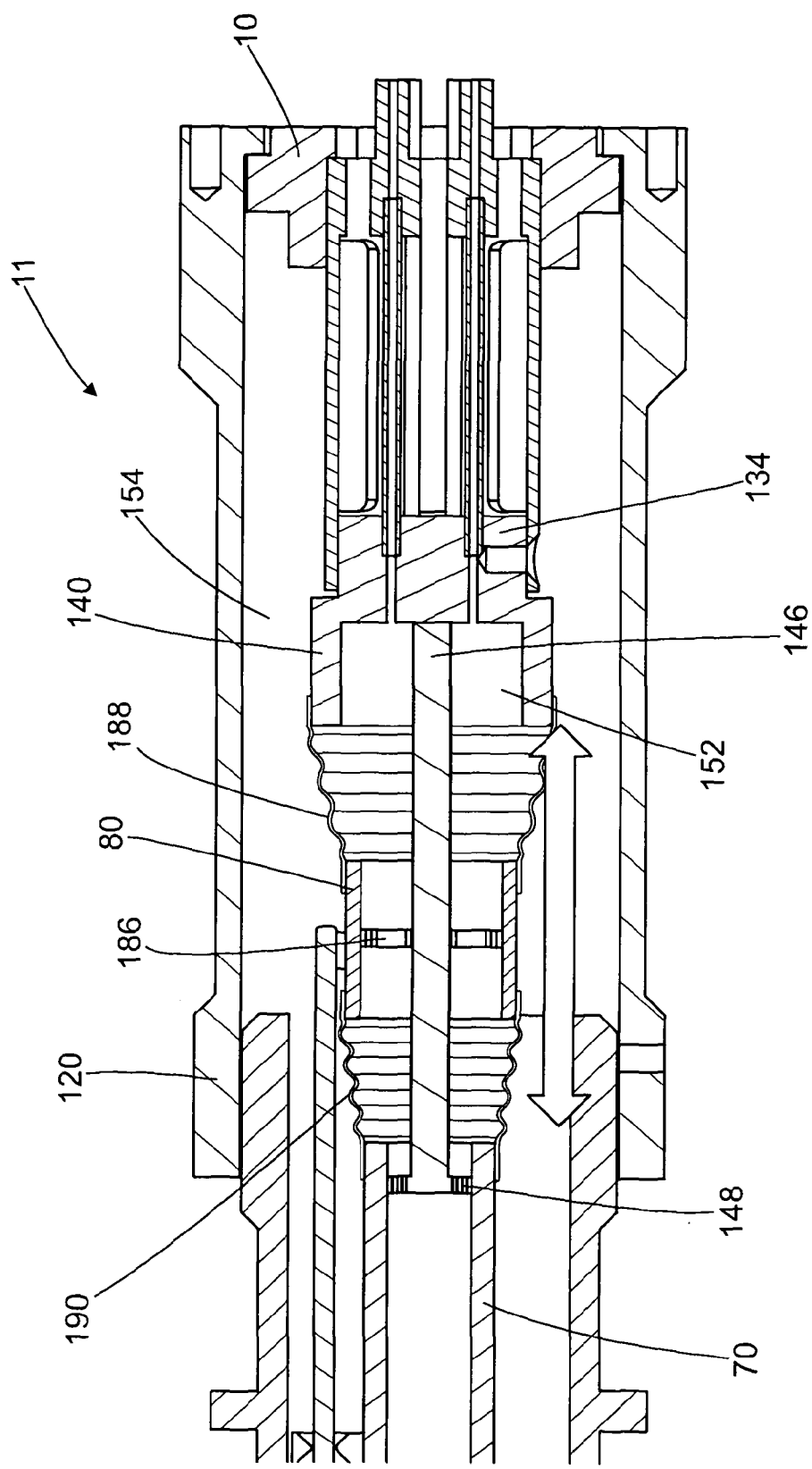
FIG. 21 is a cross sectional view through part of an apparatus in accordance with a further embodiment of the invention, the apparatus incorporating an alternative moving shuttle arrangement.

FIG. 21 illustrates a further embodiment of an apparatus 11 in accordance with the invention which uses a modified shuttle arrangement to periodically and momentarily stop or reduce the flow the liquid filling material whilst surging the flow of the chocolate. The apparatus 11 is otherwise substantially the same as the apparatus described above in relation to FIG. 18 and so only the modified shuttle arrangement will be described in detail.

In the embodiment shown in FIG. 21, the inner tube 70 and the annular flange 140 on the manifold 134 do not overlap but rather the forward (downstream) end of the inner tube 70 is spaced from the rear (upstream) end of the annular flange 140 so that there is an axial gap between them. The forward end of the inner tube is supported by means of a first annular flange 148 on the end of a modified support rod 146 projecting rearwardly from the centre of the manifold 134. A cylindrical, tubular shuttle member 80 is located between the forward end of the inner tube 70 and the rear end of the annular flange 140 and is slidably supported by means of a second annular flange 186 on the support rod 146, for reciprocal movement in an axial direction of the barrel 120. Both of the flanges 148, 186 on the support rod 146 have apertures through which the liquid filling material can flow.

A forward end of the shuttle member 80 is connected to an outer diameter surface of the rearward end of the annular flange 140 by a first flexible generally frusto-conical bellows 188. The rear end of the shuttle member 80 is connected with the outer diameter surface of the forward end of the inner tube 70 by a second flexible generally frusto-conical bellows 190. The first and second bellows 188, 190 are axially expandable and compressible to accommodate axial movement of the shuttle 80 between a first advanced position and a second retracted position and the bellows 188, 190 form seals between the shuttle member 80 and the annular flange 140 and the inner tube 70 respectively to separate the supply paths 152, 154 for the liquid filling material and the chocolate.

The annular flange 140 has a larger outer diameter than the shuttle member 80, whilst the shuttle member 80 has a larger outer diameter than the outside of the inner tube 70. Accordingly, the first bellows 188 has a larger average diameter than the second bellows 190 and so the first bellows has a larger interior volume per unit length than the second bellows. Movement of the shuttle member 80 in a rearward direction from an advanced first position to a retracted second position has the effect of increasing the length of the first bellows 188 whilst reducing the length of the second bellows by the same amount. Due to the difference in the average diameters of the two bellows, this has the effect of increasing the combined volume of the inside of the two bellows 188, 190 and so increasing the volume of the second material supply path 152 for the liquid filling material whilst also decreasing the volume of the first material supply path 154 around the outside of the bellows for the chocolate.

The modified shuttle arrangement as shown in FIG. 21 is operated in a manner similar to the shuttle arrangement as described above in relation to FIG. 18. Accordingly, when an intermediate section 30 is to be extruded, the shuttle member 80 is rapidly moved in a rearward direction from a first advanced position to a second retracted position. This increases the volume of the second material supply path 152 and temporally stops the flow of the liquid filling material through the injectors 22. Retraction of the shuttle member 80 also has the effect of decreasing the volume in the first material supply path and so causing a surge in the chocolate extruded through the die 10. After an intermediate section 30 of appropriate length has been produced, the shuttle member 80 is slowly moved forward towards the first advanced position to recommence the flow of filling material through the injectors 22 and is moved fully to the first advanced position whilst a filled section 17 of the extrudate body containing liquid filled chambers 18 is extruded.

The shuttle member 80 in the modified shuttle arrangement illustrated in FIG. 21 can be moved using any of the drive arrangements described above with reference to FIGS. 18 to 20. In particular, the modified shuttle 80 as shown in FIG. 21 could be adapted for use with a magnetic drive arrangement as described with reference to FIG. 18.

As discussed above in relation to FIGS. 15A and 15B, the limits of movement of the reciprocating shuttle member 80 in either of the above embodiments can be adjustable. This would enable the same apparatus to be used to produce a range of products having end cap regions of differing thickness and/or overall length. In addition, movement of the reciprocating shuttle member 80 can be used during the filling phase of extrusion to produce different extrusion effects. Thus the reciprocating shuttle member 80 can be used to form the intermediate sections 30 and also to vary the cross section of the extrudate body and/or the chambers along each individual product length, for example. The reciprocating shuttle member may be arranged so that it can be advanced beyond the nominal advanced position to increase the flow of the liquid filling material and to decrease the flow of the chocolate to produce particular extrusion effects.

Using a movable member to vary the volumes of the chocolate or other first material supply path and the second material supply path in order to produce the intermediate sections is advantageous in that the control takes place close to the die. This provides a rapid and fine control of the flow rates of the first and second materials. The pump or other device used to move the materials along the respective supply paths need not be stopped which reduces the risk of material solidifying in the device and where a pump is used to deliver the filling material, the pump is not dead headed. Furthermore, neither of the supply paths need be physically blocked off or closed which also reduces the risk of material solidifying in the apparatus. In the embodiments shown in FIGS. 18 to 21, a single movable member in the form of the reciprocal shuttle 80 is used to simultaneously vary the flow of the filling 14 and the chocolate 12. This arrangement has the benefit of using only a small number of components and requires only a single actuator with relatively simple control requirements. However, in some applications it is desirable to be able to control the flow of the first and second materials 12, 14 independently. For example, where the filling material 14 is viscous, such as in the case of a caramel, it can be difficult to ensure a quick cut-off of the flow through the injectors or other fluid outlets 22. This can lead to the filling material stringing in the intermediate sections. To reduce this problem, it can be advantageous to commence surging the flow of the chocolate 12 slightly before the flow of the filling material 14 is stopped or reduced. Independent control of the flow of the first and second materials can be achieved by using separate, independently actuatable flow control devices in the respective supply paths for each of the first and second materials. Suitable flow control devices may take the form of a member at least partly located in the respective supply path and movable to vary the volume of the supply path together with an actuation arrangement for moving the member under the control of a control system. A further advantage of having independently actuatable flow control device for each of the first and second materials is that one or both can be actuated to create different extrusion effects other than the formation of unfilled intermediate sections of the extrudate body. When producing a chocolate bar for example, the chocolate can be surged by a limited amounted whilst still producing filled chambers in the extrudate so as to vary the outer profile of the bar in an attractive manner.

Figure 22:
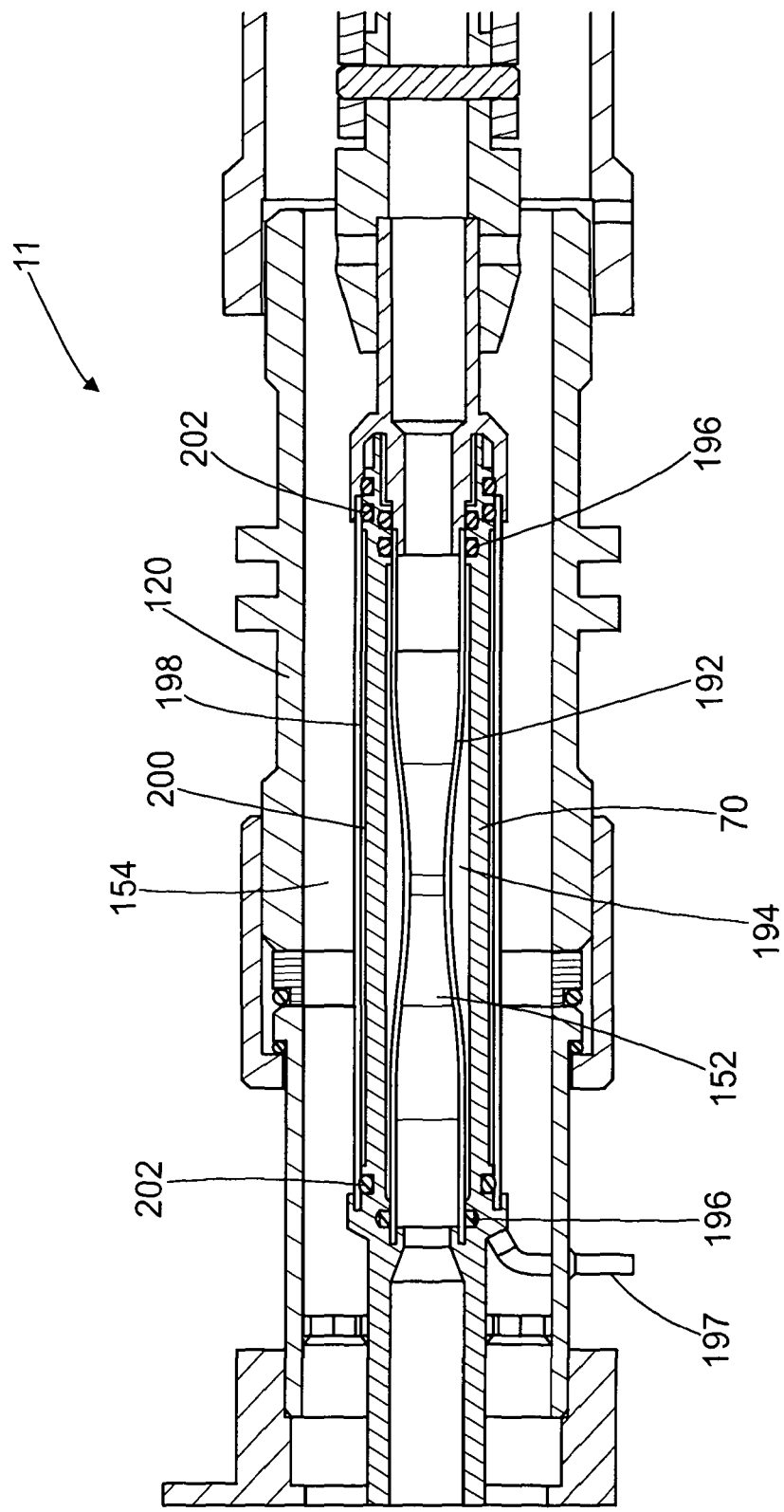
FIG. 22 is a cross sectional view through part of an apparatus in accordance with a further embodiment of the invention, the apparatus incorporating an alternative arrangement for carrying out a combination of the first and second techniques in accordance with the invention.

FIG. 22 illustrates an alternative embodiment of an apparatus 11 having independently actuatable flow control mechanisms for the chocolate and the filling material and which can be used to produce intermediate sections in the extrudate body. A first flexible element in the form of a resiliently deformable tubular member 192 is mounted about the inside surface of an inner supply conduit 70 which forms part of a second material supply path 152 for the liquid filling material. A first hydraulic chamber 194 is defined between the first flexible element 192 and the inner conduit 70 by means of seals 196. The apparatus has a control system which includes a hydraulic actuation system for selectively introducing a volume hydraulic fluid into the first hydraulic chamber 194 through a supply line 197 to deflect the first flexible element 192 inwardly to a first position as shown in FIG. 22. In this first position, the pressurised fluid holds the first element 192 against the inherent resilience of the material and the hydraulic fluid will usually be pressurised to overcome the resilience of the flexible element. When the first chamber 194 is fully or partially vented of fluid, the resilience of the material biases the first flexible element 192 radially outwardly to a second position in which the volume of the second material supply path is increased compared to the volume when the flexible element 192 is in its first position.

A second flexible element in the form of a resiliently deformable tubular member 198 is mounted about the outside of the inner conduit 70 and a second hydraulic chamber 200 is defined between the second element 198 and the inner conduit 70 by means of further seals 202. The hydraulic actuation system is operative to selectively introduce hydraulic fluid under pressure into to the second chamber 200 and to vent the second chamber independently of actuation of the first element 192. The second element 198 is resiliently biased to a first position as shown in FIG. 22 and can be deformed radially inwardly by the introduction of a volume of fluid in the second chamber to a second position in which the volume of the annular passage between the flexible element 198 and the outer barrel 120, which forms part of a first material supply path 154 for the chocolate, is reduced when compared to the volume when the second element is in the first position.

FIG. 22A shows the apparatus at the end of a filling phase of the extrusion cycle in which filled chambers 18 are being produced in the extrudate body. In this configuration, a volume of hydraulic fluid is present in the first chamber 194 so that the first element 192 is deflected inwardly against its inherent resilient bias to its first position, whilst the second hydraulic chamber 200 is fully or partially vented so that the second element is held in its first position by the resilience of the material. When an intermediate section 30 is to be extruded, the control system is operative to fully or partially vent the first chamber 194 rapidly so that the first element 192 deforms radially outwardly to its second position, rapidly increasing the volume in the second material supply path 152. This temporally stops, or at least significantly reduces, the flow of liquid filling material 14 through the injectors. The rapid increase in volume of the second material supply path helps to draw or suck back the filling material from the injectors to reduce the flow of the filling material into the extrudate body as quickly as possible. To create a surge of chocolate at the die, the control system is operative to introduce a volume of hydraulic fluid into the second chamber 200 to expand the second element 198 to its second position hence reducing the volume of the first material supply path 154.

After an intermediate section of desired length has been formed in the extrudate body, the control system is operative to introduce a volume of hydraulic fluid in to the first chamber 194 to deform the flexible element 192 radially inwardly to recommence the flow of filling material through the injectors and to return the first element 192 to its first position, but usually at a slower average rate than the chamber was vented so that the first element 192 returns to its first position more slowly than it was moved from its first position to its second. The control system also fully or partially vents the second hydraulic chamber 200 so that the second element 198 returns to its first position, increasing the volume of the first material flow path. Again, movement of the second element 198 back to its first position will usually be slower than the movement from the first to the second position when the chocolate surge is commenced.

Movement of the flexible elements 192, 198 when the hydraulic fluid is exhausted from the chambers 194, 200 is usually dependent on the inherent resilience of the material. However, a vacuum could be applied to one or both of the chambers to assist in moving the elements or other means of positively moving the elements in both directions can be used. It is also possible to use flexible elements that are not made of a resilient material, in which case some other arrangement for biasing the elements to one of their respective first and second positions will be required.

The control system provides independent control over the speed, timing and amount (volume) of movement of each of the two flexible elements 192, 198 and so can independently control the speed, timing, and volume of the pulsed flow of each of the first and second materials. This provides increased flexibility in optimising the process depending on the nature of the first and second materials and other process requirements compared with previous embodiments in which a single movable member varies the flow of both the first material and the second, filling material.

Figure 25:
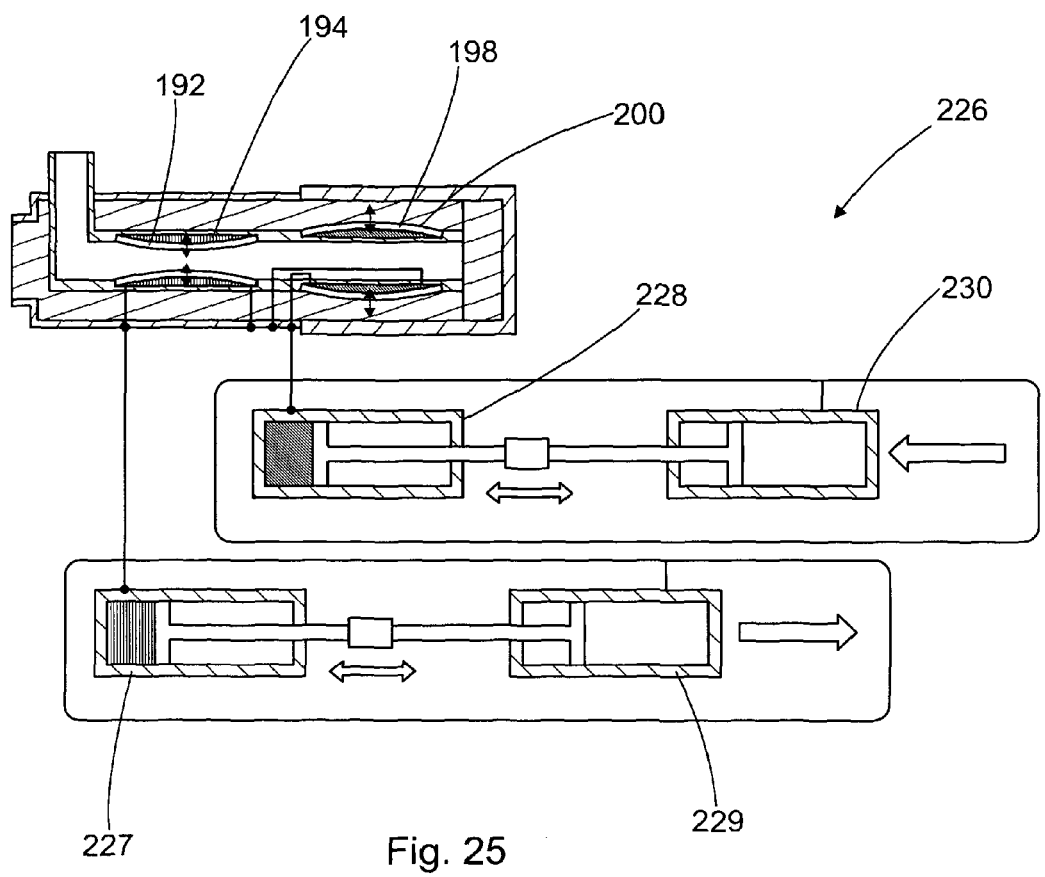
FIG. 25 is a schematic illustration of a yet further embodiment of an apparatus in accordance with the invention, the apparatus incorporating a further alternative arrangement for carrying out a combination of the first and second techniques incorporating a hydraulic actuation system.

In an alternative arrangement, the second flexible element 198 could be located about the inner surface of the outer conduit or barrel 120 and the second fluid chamber 200 defined between the second element 198 and the outer conduit. In this embodiment, hydraulic fluid is directed into the second fluid chamber 200 by the hydraulic actuation system to deflect the second element 198 radially inwardly to move the element from a first to a second position to reduce the volume of the first material supply path. Furthermore, the first and second flexible elements 192, 198 need not be located concentrically but could be spaced longitudinally from one another in separate flow control modules as illustrated schematically in FIG. 25. FIG. 25 also shows schematically part of a hydraulic fluid actuation system 226 which forms part of a control system for the apparatus. The hydraulic actuation system includes first and second hydraulic cylinders 227, 228 fluidly connected to the first and second hydraulic chambers 194, 200 respectively. The hydraulic cylinders 227, 228 are operated via actuators 229, 230 to selective move the first and second flexible elements 192, 198 between their respective first and second positions by introducing hydraulic fluid into and removing the fluid from the chambers. The actuators can be of any suitable type such as double acting pneumatic actuators or electronic liner actuators.

Figure 26:
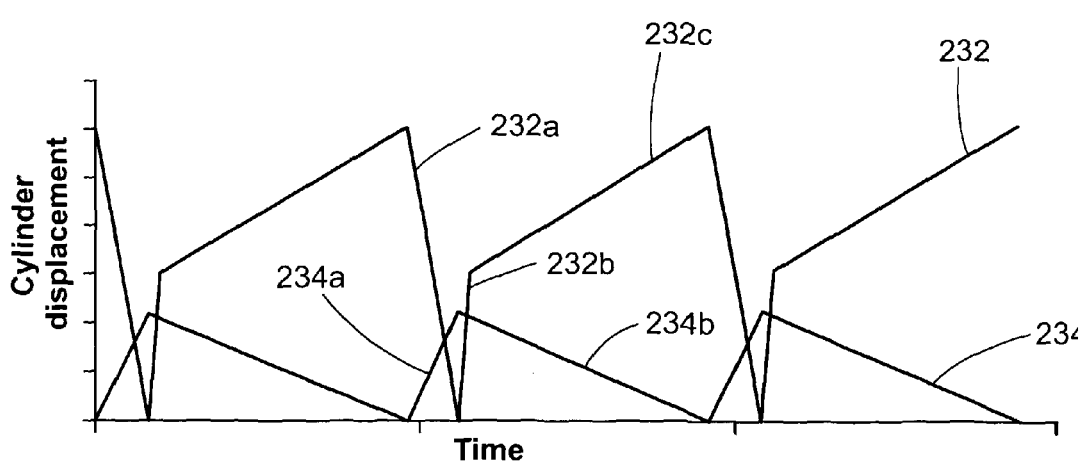
FIG. 26 is a graph showing displacement against time for two hydraulic cylinders forming part of the hydraulic actuation system of FIG. 25 for a typical extrusion sequence in accordance with the invention.

FIG. 26 is a graph showing displacement of the first and second hydraulic cylinders 227, 228 against time for a typical extrusion sequence. In FIG. 26, line 232 represents displacement of the first hydraulic cylinder 227 which controls movement of the first flexible element 192 to vary the volume of the second material 14 supply path and so vary the flow rate of the second material through the fluid outlets. Section 232*a* illustrates displacement of the first cylinder 227 as hydraulic fluid is drawn out of the first chamber 194 to allow the first flexible element 192 to resiliently deform radially outwardly increasing the volume of the second material supply path and reducing the flow of the second material through the fluid outlet nozzles. This phase takes place rapidly so that the second material is sucked back into the second supply path from the outlet nozzles. Sections 232*b* and 232*c* illustrate displacement of the first hydraulic cylinder as pressurised fluid is re-introduced into the chamber first chamber 192 to deform the first flexible element 192 radially outward to reduce the volume of the second material supply path and return the first flexible element to its first position. It can be seen that line section 232*b* is steeper than line section 232*c* illustrating how the first flexible element can be moved back towards the first position more rapidly over an initial phase of movement to re-start the flow of the second material through the nozzles. Thereafter the first flexible element is moved back towards the first position more slowly so as not to surge the flow of the second material whilst the filled chambers are produced in the extrudate body.

Line 234 in FIG. 26 illustrates displacement of the second hydraulic cylinder 228 controlling movement of the second flexible element 198. Line section 234*a* illustrates a displacement of the second hydraulic cylinder 228 as hydraulic fluid is introduced into the second chamber 200 to reduce the volume of the first material supply path and so surge the flow of chocolate through the die and line section 234*b* illustrates displacement as the hydraulic fluid is drawn out of the second chamber 200 to allow the second flexible element to return to its first position. It can be seen that the displacement of the second hydraulic cylinder 228 is less than that of the first cylinder 227 and that displacement 234*b* during the return phase is slower than during the surge phase. It will also be noted that the first and second hydraulic cylinders and thus the first and second flexible elements are constantly actuated over the whole extrusion cycle. This is not essential but will often be the case in any of the embodiments described herein.

In the example shown in FIG. 26, movement 234a of the second hydraulic cylinder 228 to surge the chocolate commences and ends at about the same time as movement 232a of the first hydraulic cylinder 227 to stop the flow of the second material. However, as previously noted it can be advantageous in certain applications to begin surging the first material 12 slightly before or slightly after the flow of the second material is stopped to provide a clean transition from a filled section to an unfilled section in the extrudate body or to create other extrusion effects. In the example shown in FIG. 26, the movement of the flexible elements 192, 198 back to their first positions from their second positions is controlled so as to maintain a generally steady state of extrusion through the die whilst a filled section of extrudate body is produced. However, this need not be the case and the rate and direction of travel of the flexible members could be varied by the control system in order to either increase or decrease the flow of either of the first and second materials to create different extrusion effects. Thus, for example, the flow of first material through the die might be periodically surged and reduced during the filling phase to produce an extrudate body whose width varies along its length.

As with the reciprocating shuttle member 80, the limits of movement of the flexible elements 192, 198 may be adjustable so that the same apparatus can be used to produce products having end regions of differing thickness and/or different overall length. This can also allow the flexible elements to be moved beyond their nominal first and second positions if desired during the filling phase. In this case, the chambers 194, 200 may not be fully filled and/or fully ventured to move the flexible elements 192, 198 between their first and second positions. Hence, during a filling phase of an extrusion cycle, the first flexible element 192 could be moved beyond its first position to create a surge of the second material and subsequently returned to the first position before the end of the filling phase ready for the formation of an intermediate unfilled section in the extrudate body during the non-filling phase of extrusion.

Figure 27:
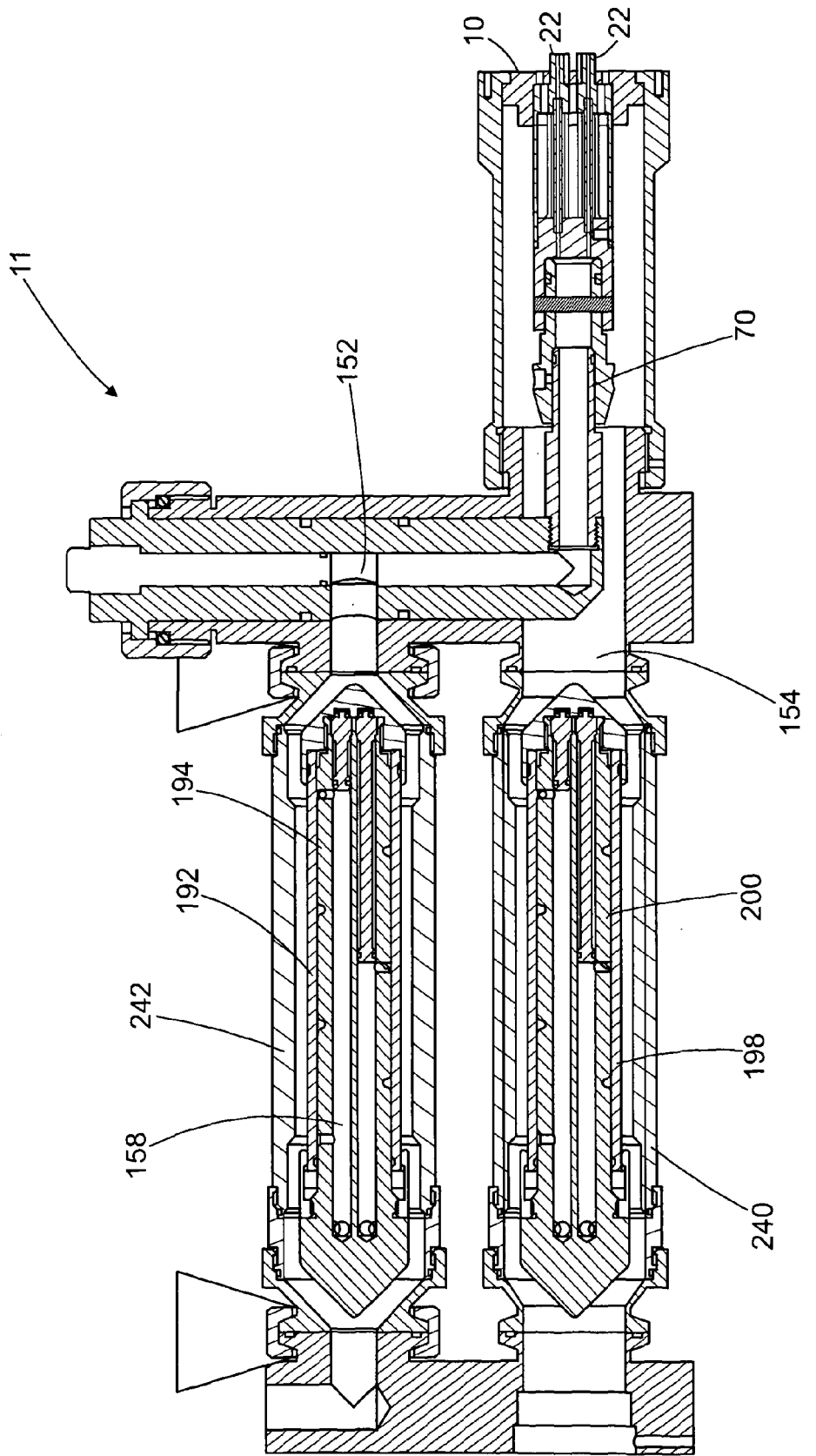
FIG. 27 is a longitudinal cross sectional view through part of an apparatus in accordance with a yet further embodiment of the invention, the apparatus incorporating an alternative arrangement for carrying out a combination of the first and second extrusion techniques in accordance with the invention.

FIG. 27 illustrates a further embodiment of the apparatus 11, in which the flexible elements 192, 198 are provided as part separate flow control modules 240, 242 in each of the first and second material supply paths. In the apparatus 11 as shown in FIG. 27, a first material flow control module 240 forms part of a first material supply path 154 along which the first material flows from a source to the die head 10. A second material flow control module 242 forms part of the second material supply path 152 along which the second filling material 14 flows from a source to the injectors 22. In this embodiment, the flow control modules 240, 242 are arranged in parallel in separate conduits rather than concentrically or in-line. This is advantageous as connections to each of the flow control modules are simplified. Furthermore, maintaining the first and second material supply flow paths 154, 152 separate from one another over a significant portion of their length makes it easier to regulate the temperatures of the first and second materials 12, 14 independently from one other. The second material flow control module 242 is fluidly connected at its downstream end with a conduit 70 located concentrically within first material supply path to deliver the second material 14 to the injectors 22 in a manner similar to previous embodiments.

Figure 28:
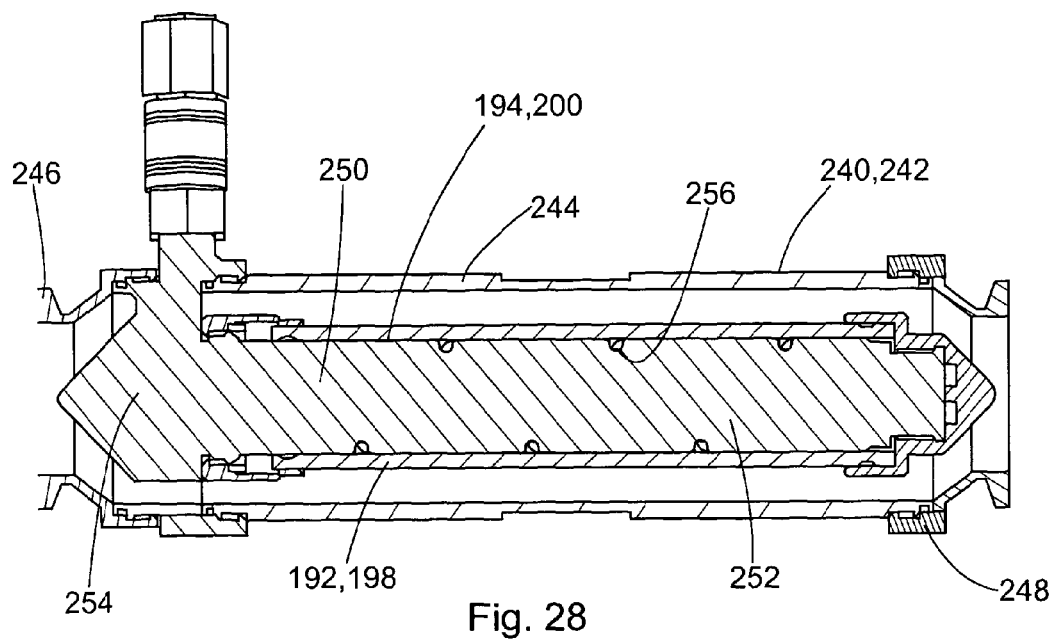
FIG. 28 is a cross-sectional view through a flow control mechanism forming part of the apparatus of FIG. 27.
Figure 29:
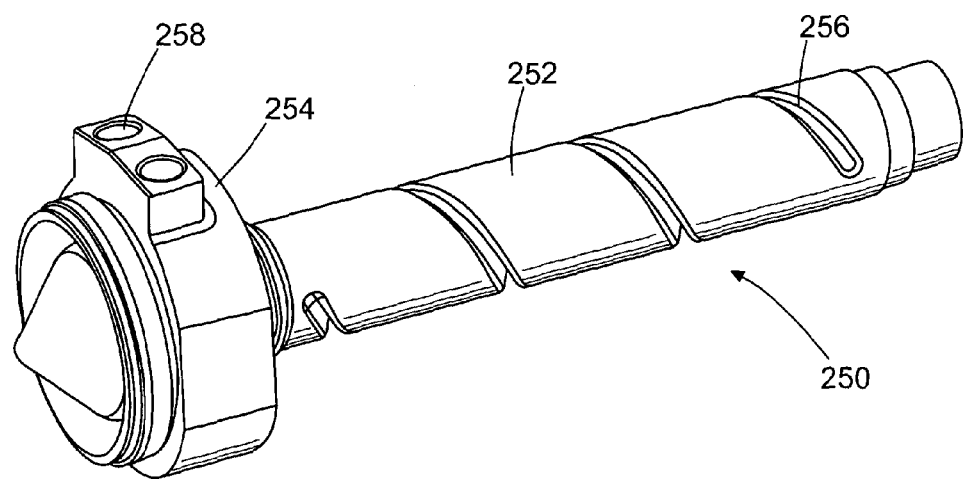
FIG. 29 is a perspective view of an inner actuation member forming part of the flow control mechanism of FIG. 28.

Each of the flow control modules 240, 242 are essentially the same and are shown in more detail in FIGS. 28 and 29.

Each flow control module 240, 242 comprises a generally cylindrical outer conduit member 244 with quick fit connectors 246, 248 at either end to enable the modules to be rapidly assembled and disassembled from the apparatus for cleaning and maintenance. An actuation member 250 has a generally cylindrical portion 252 and mounting portion 254 at one end of the cylindrical portion which is mounted between one of the end connectors 246 and the outer conduit member 244 so that the cylindrical portion 252 is supported generally concentrically within the outer conduit member 244. A helical fluid channel 256 is provided on the outer surface of the actuation member and is fluidly connected via internal fluid passages 258 which pass through the end connector 254 with the hydraulic actuation system 226. A flexible element in the form of a resiliently deformable tubular member 192, 198 is mounted about the cylindrical portion 252 of the actuation member 250 and clamped at either end so as to overlie the helical fluid channel. The flexible element 192, 198 is resiliently biased to a position, as shown in FIG. 28, in which it tends to lie proximal to the outer surface of the cylindrical portion 252 of the actuation member 250 at which the volume of the annular space between the flexible element 192, 198 and the outer conduit member 244 is at a maximum. Hydraulic fluid chambers 194 200 are effectively defined in the space between the flexible element 192, 198 and the actuation member and hydraulic fluid can be selectively introduced into the chambers through the internal passages 258 and the helical channel 256 to deflect the flexible element radially outwardly against the resilience of the material to reduce the volume of the of the annular space between the flexible element 192, 198 and outer conduit member 244.

At the end of a filling phase of the extrusion process in which filled chambers are produced in the extrudate body, a volume of hydraulic fluid is present in the hydraulic chamber 194 of the second material flow control module 242 to hold the flexible element 192 in a first, outwardly deformed, position whilst the hydraulic chamber 200 of the first material flow control module 240 is fully or partially vented so that the second flexible element is in a first, radially inwardly resiliently biased, position. To form an intermediate section 30 of the extrudate body, the control system is operative to fully or partially vent the hydraulic chamber 194 of the second material flow control module 242 rapidly so that the flexible element 192 collapses radially inwardly towards the actuation member 248 towards its second position, rapidly increasing the volume in the second material supply path 152. This temporally stops, or at least significantly reduces, the flow of liquid filling material 14 through the injectors. The rapid increase in volume of the second material supply path may be arranged so that the second filling material is drawn or sucked back into the second material supply path from the injectors to try and ensure a quick and clean cut-off of the flow of the second material into the extrudate body. The control system also introduces pressurised hydraulic fluid into the hydraulic chamber 200 of the first material flow control module 240 to expand the second element 198 to its second position, reducing the volume of the first material supply path 154 and surging the flow rate of the chocolate through the die.

To begin the next filling phase of the extrusion cycle, the control system is operative to introduce a volume pressurised hydraulic fluid in to the chamber 194 of the second material flow control module 242 to expand the flexible element 192 radially outwardly to recommence the flow of filling material through the injectors and to return the first element 192 towards its first position, but typically at a slower average rate than the chamber was vented so that the first element 192 returns to its first position more slowly than it was moved from its first position to its second. The control system also fully or partially vents the hydraulic chamber 200 of the first material flow control module 240 so that the second element 198 returns to its first position, increasing the volume of the first material supply path. Again, movement of the second element 198 back to its first position will usually be slower than the movement from the first to the second position when the chocolate surge is commenced so that the flow of chocolate through the die is not stopped or reduce too far.

As with the previous embodiment, the control system is able to actuate the two flow control modules 240, 242 independently of one another so that the speed, volume and timing of the movement of the two flexible elements can be individually controlled. Furthermore, the rate at which the flexible elements are moved need not be linear as indicated in the graph in FIG. 26. Thus the first flexible element 192 could be moved back towards the first position more rapidly over an initial phase of movement to quickly re-start the flow of the second material and then at a slower rate. However, the control system can be programmed to move either of the first and second flexible members, or indeed any other types of movable member used to vary the volumes of the first and second supply paths, in many other and possibly more complex modes to create a range of extrusion effects.

In the embodiment shown in FIG. 27, the flexible elements 192, 198 are located about an inner actuation member. However, in an alternative arrangement the flexible member could be positioned about the inner face of the conduit member 244 or an outer actuation member and deformed radially inwardly by the introduction of hydraulic fluid in their respective hydraulic chambers.

It will be appreciated that various alternative movable fluid actuated members can be provided in the supply paths for the first and second materials to selectively vary the volumes of the supply paths and hence the flow rates of the first and second materials.

As discussed above with reference to FIGS. 9, 10A and 10B, in a fifth extrusion technique in accordance with the invention it is necessary to rotate the injectors 22. There will now follow a brief description of several drive arrangements for rotating all or part of an inner portion of the die.

Figure 23:
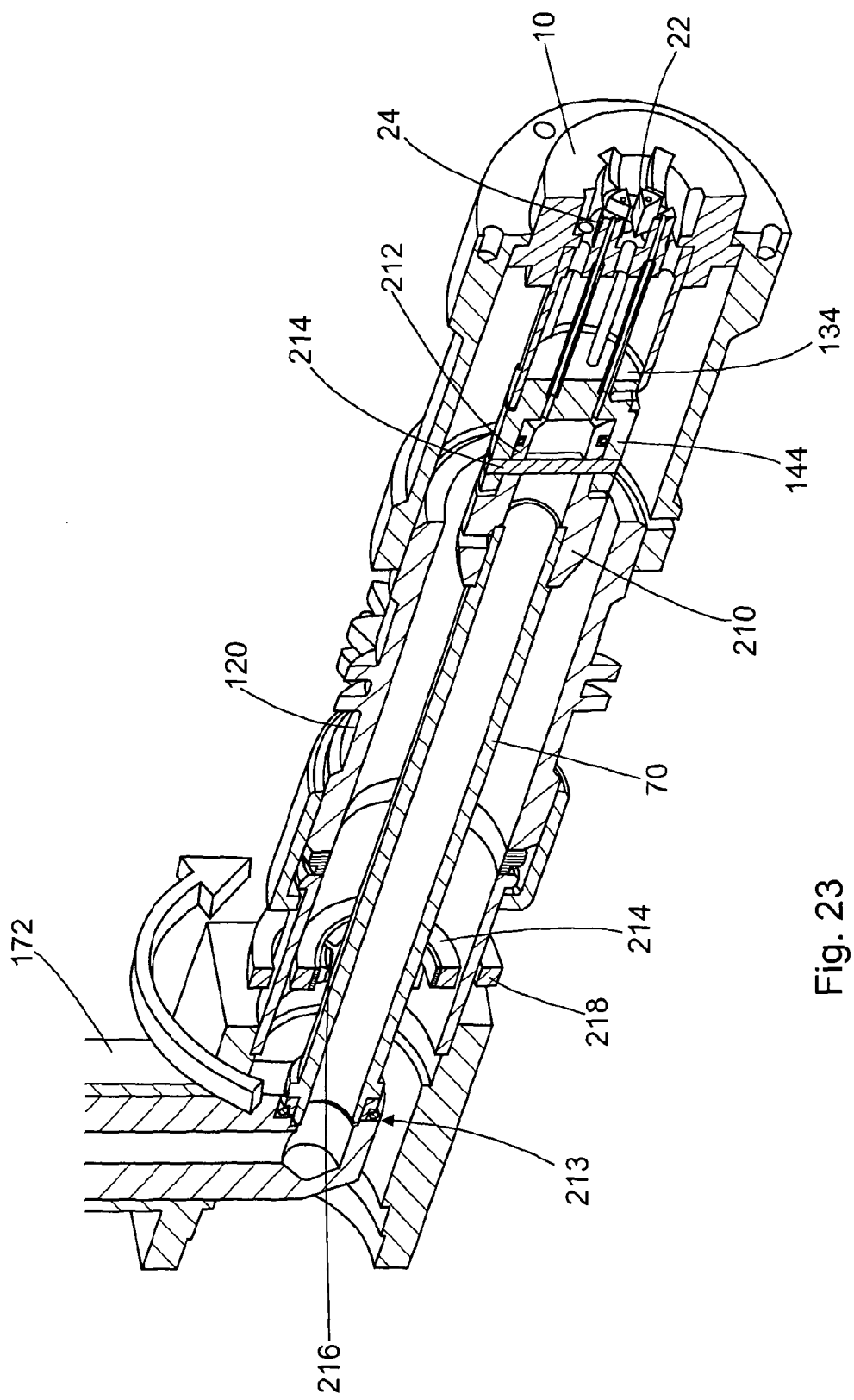
FIG. 23 is a perspective sectional view through a yet further embodiment of an apparatus in accordance with the invention, the apparatus having a drive arrangement for rotating an inner part of an extrusion die for use in carrying out the fifth technique in accordance with the invention.

FIG. 23 illustrates a magnetic drive arrangement for rotating all or part of the inner part 24 of the die 10 and which can be used to rotate the injectors 22. In this embodiment, the extruder apparatus is similar to the apparatus as described above in relation to FIG. 18 except that there is no reciprocal shuttle member 80 between the inner tube 70 and the annular flange 144 on the manifold 134. Instead, a collar 210 is mounted rotationally fast to a forward end of the inner tube 70. The collar 210 has an annular flange 212 which locates inside the annular flange 140 on the manifold and the two flanges 212, 140 are mechanically linked by a pin 214 so that rotation of the inner tube 70 and collar 210 is transmitted to the manifold 134 and via the cage 132 and the support plate 130 to the injectors 22. In this embodiment, the support plate 130 is rotatably mounted in the outer part 19 of the die as discussed in above with reference to the embodiment shown in FIG. 18. The rear end of the inner tube 70 is rotatably connected with the inlet supply port 172 using a suitable bearing and seal arrangement indicated generally at 213. An inner annular or part annular magnet 214 is positioned about the inside of the barrel 120 and is mounted rotationally fast with the inner tube by means of an annular or part annular flange 216. Apertures in the flange 216 allow the chocolate to flow between the magnet 214 and the inner tube 70. An outer annular or part annular magnet 218 is mounted about the outside of the barrel and is magnetically coupled with the inner magnet 214 so that rotation of the outer magnet 218 about the barrel results in a corresponding rotation of the inner magnet 214 and hence of the injectors 22. An actuator arrangement (not shown) rotates the outer magnet 218 under the control of a control system for the extruder. Any suitable actuation arrangement can be used to rotate the outer magnet 218.

The arrangement sown in FIG. 23 is particularly suitable where the injectors 22 are rotated in a continuous motion. However, the rotary magnetic drive arrangement could also be in relation to the embodiment described above in relation to FIGS. 10A and 10B, in which the injectors are rotated through a set angle.

Figure 24:
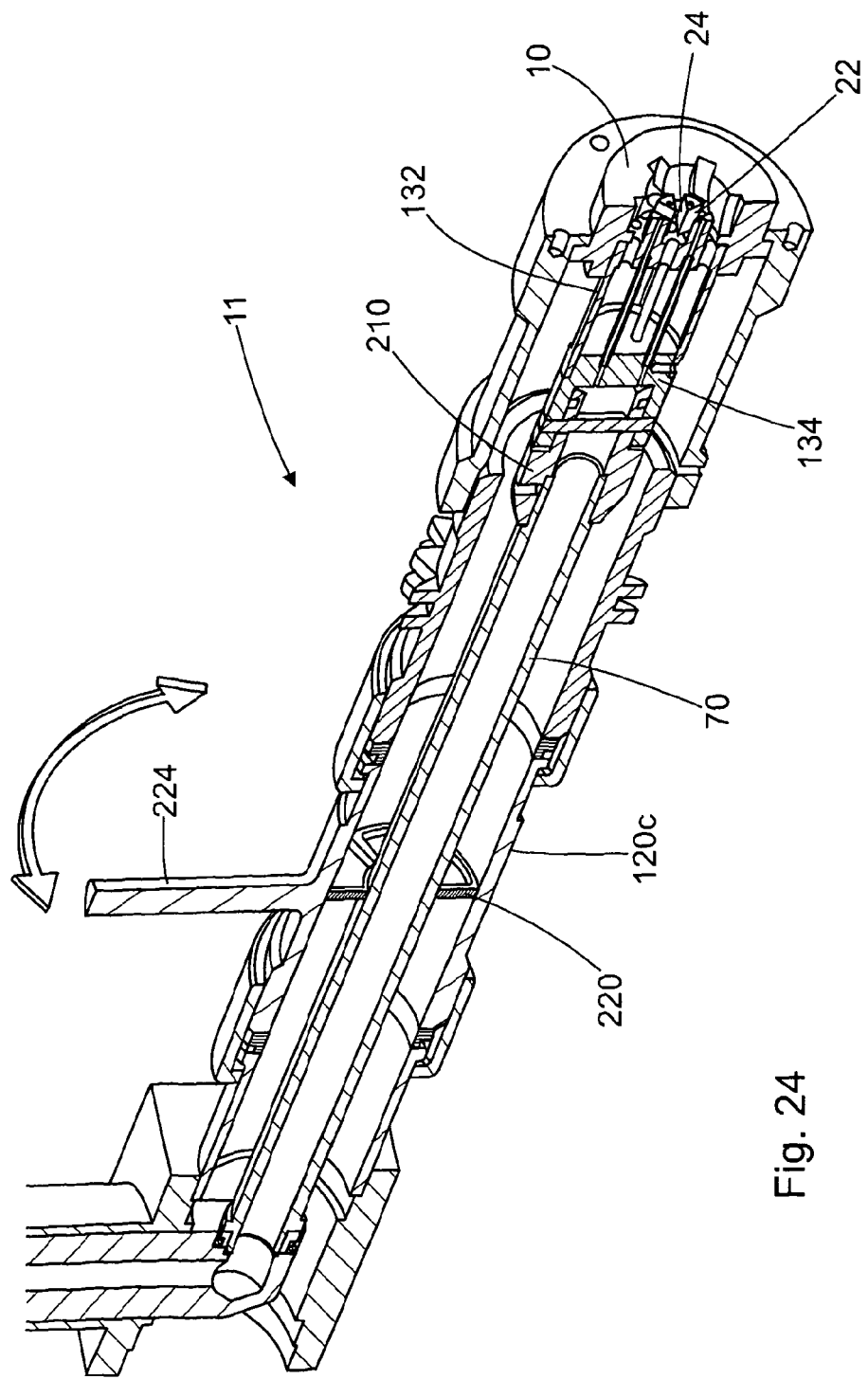
FIG. 24 is a view similar to that for FIG. 24 but showing an alternative drive arrangement for rotating an inner part of an extrusion die for use in carrying out the fifth technique in accordance with the invention.

FIG. 24 illustrates an alternative arrangement for rotating an inner part 24 of the die 10. The extruder apparatus 11 as illustrated in FIG. 24 is in most respects the same as the apparatus illustrated in FIG. 23 discussed above. However, rather than using a magnetic coupling to rotate the inner tube 70, the inner tube 70 is mechanically connected with a rotary portion 120C of the outer barrel 120 by means of an annular flange 220. The flange 220 has apertures to enable the chocolate to flow past the flange between the outer barrel 120 and the inner tube 70. Rotary movement of the barrel section 120C is transmitted to the inner tube 70 through the flange 220 and from the inner tube 70 to the injectors 22 via the collar 210, manifold 134, cage 132 and the support plate 130.

The embodiment shown in FIG. 24 is particularly adapted for rotating the inner die 24 quickly from one angular position to another. Accordingly, an actuator arm or crank 224 projects from an outer surface of the rotary section 120C of the barrel. A suitable actuator (not shown), such as a pneumatic or other fluid driven ram for example, acts on the arm 224 to move the barrel section 120C between the two angular positions. However, the drive arrangement could be adapted to rotate the injectors continuously.

Either of the above embodiments for rotating an inner part 24 of the die described above could be combined with any of the flow control mechanisms described herein, including the reciprocating shuttle arrangement of the types described above with reference to FIGS. 18 and 21 to pulse the flow of the liquid filling material and chocolate. In such an arrangement, rotary movement of the inner tube 70 could be transmitted to the manifold 134 through a modified inner support rod 146. Furthermore, whilst in the embodiments shown the entire inner part 24 of the die including the injectors is rotated. The arrangements could be modified to rotate only a part of the inner part 24 of the die, such as the rotary element 60 as described above with reference to FIGS. 13A and 13B.

As discussed previously, the die head arrangement can be adapted to produce an extrudate body having a broad range of possible of cross sectional shapes, including but not limited to: star shaped, circular, square, triangular, rectangular, or irregular by varying the profile of the extrusion aperture. The number, size and shape of the filled chambers can also be varied as desired by provided an appropriate number of outlets of the desired size and shape. For example, an extruded chocolate bar might have a single, central, generally circular filled chamber 18 which might occupy anything from 3% to 40% or more of the overall volume of the bar. Alternatively a plurality of chambers 18 can be formed. For example, the die can be arranged to produce a product having a generally triangular cross sectional profile with three filled chambers. Those skilled in the art will realise that a large number of possible configurations can be produced using the methods and apparatus of the invention.

Figure 30:
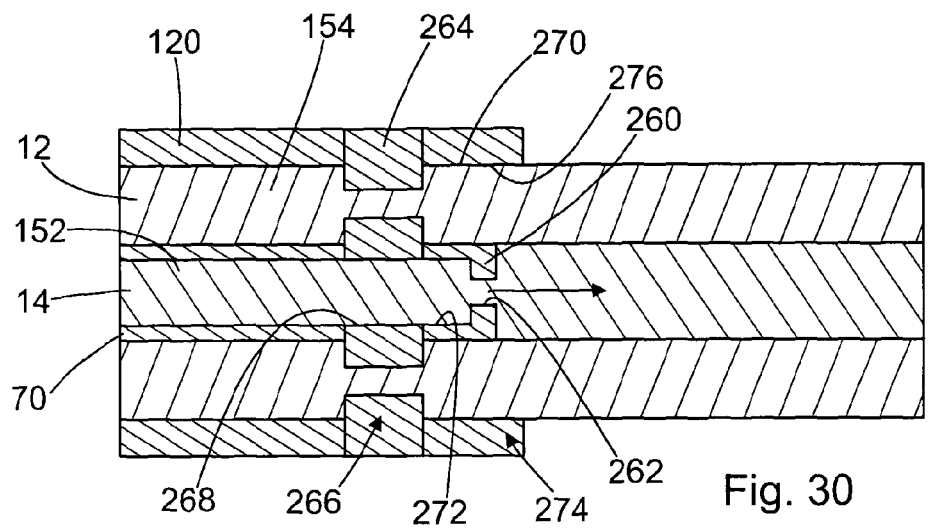
FIG. 30 is a schematic cross sectional view through a die head arrangement for use in apparatus in accordance with the invention.

In the previous embodiments, the fluid outlets for the second filling material 14 have comprised elongate needle like injectors 22. However, this need not be the case and any suitable fluid outlets can be used. FIG. 30 illustrates schematically an alternative die head arrangement 10 having a nozzle 260 with a single central outlet orifice 262 through which the second filling material 14 flows into the extrudate body. The die has a main body portion 264 which includes an aperture plate 266 that extends across the supply paths 154, 152 for the first and second materials respectively. In this case, the second material 14 is fed to the die head through an inner conduit 70 and the first material is feed to the die head through the annuals between the inner conduit 70 and an outer conduit 120. The aperture plate has a central aperture 268 which is in fluid communication with the interior of the inner conduit 70. A number of further apertures 270 through which the first material flow are provided in the aperture plate about the central aperture 268 and are in fluid communication with the annulus between the inner and outer conduits 70, 120. The nozzle 260 is mounted to the outer axial face of the aperture plate over the central aperture 268 and has a central bore 272 through which the second material can flow to the outlet orifice 262. It will be noted that the outlet orifice 262 has a smaller diameter than the bore 272. It has been found that this produces beneficial effects in helping to reduce stringing of the filling material when the flow of the second material is stopped. Without wishing to be tied to any particular theory, it is believed that using fluid outlet 262 which has a smaller diameter or width than the flow path immediately upstream of the aperture increases the back-pressure which makes the suck back of the second material more effective when the volume of the second material supply path is initially increased to stop the flow of the second material into the extrudate body.

The die head arrangement 10 as shown in FIG. 30 also has an annular shroud 274 which is mounted to the outer face of main body portion and projects downstream beyond the end of the nozzle. The inner surface 276 of the should defines the extrusion aperture into which the first material 12 flows to form the extrudate body and so the cross-section shape of the inner surface of the shroud determines at least partially the cross-sectional profile of the extrudate body. The shroud 274 extends downstream by a sufficient distance to allow the first material in the extrudate body to cool sufficiently to hold its shape when it exits the shroud. In this embodiment, the shroud projects beyond the downstream end of the nozzle. The external surface of the nozzle 260 helps to define the cross-sectional shape of the filled chamber 18 produced in the extrudate body when the second material flows through the outlet orifice 262. In this case the nozzle is generally circular in cross-section and is arranged to form a single, relatively large diameter chamber 18 in the extrudate body.

In an advantageous arrangement, the shroud 274 and/or the nozzle 260 can be separate items removable mounted to the main body 264 of the die head. This enables the same die main body to be used with a range of different shrouds 274 and/or nozzles 260 to produce a range of different products. In additional, the shroud and the nozzle can be manufactured from polymeric materials that are less likely to stick to the first and second materials as they cool whereas the main body 264 can be manufactured from a metallic material to withstand the greater temperatures and pressures to which it is subjected. However, this need not be the case and the shroud and or the nozzle could be integral parts of the die main body.

Figure 31:
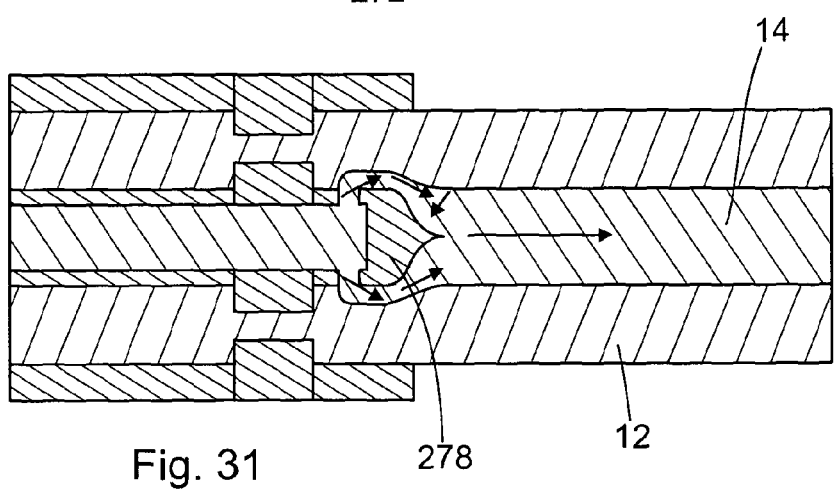
FIGS. 31 and 32 are schematic cross sectional views through a further die head assembly having an alternative nozzle and illustrating the flow of the materials about the nozzle during filling and non-filling phases of the extrusion process respectively.
Figure 32:
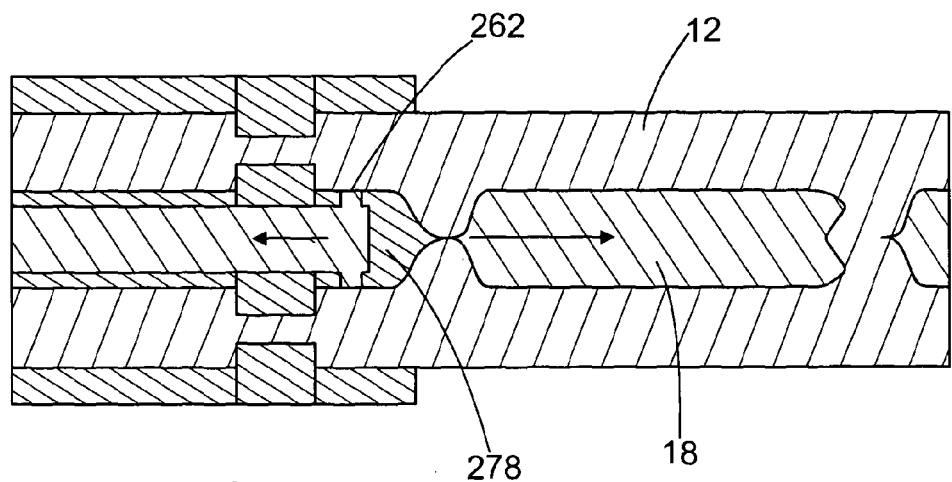

The nozzle 260 can also be profiled to help the flow of the materials. FIGS. 31 and 32 illustrate use of a nozzle having a generally conical body 278. The body is positioned with its apex at the downstream end generally in-line with the longitudinal axis of the die. The fluid outlets 262 for the second material are located at the base of the conical body and direct the second material generally radially outwardly where is flows about the outer surface of the conical body to form a single central filled chamber 18 as illustrated in FIG. 31. When the flow of the second material is stopped as illustrated in FIG. 32, the first material 12 is able to flow smoothly about the outer surface of the conical body to form an unfilled section of the extrudate body with a minimum of stringing of the second material. This arrangement has been found to be particularly effective where the second filling material is relatively viscous, such as a caramel.

After extrusion, 16 the extrudate body is divided into individual lengths to form the individual confectionery products. Each division is made through the centre of one of the intermediate sections 30 in the extrudate body. As noted previously, in most applications it is expected that the extrudate body 16 will be cut or otherwise divided at each intermediate section 30 so that each confectionery product has a filled section 31 which extends for substantially the entire length of the product with end caps of the first material. However, it would also be possible to produce product having one or more intermediate sections spaced along their length by cutting the extrudate body at every other or every third intermediate section, for example. The extrudate body 16 may be cut into individual lengths using any suitable means such as a blade or the air crimping arrangement described above with reference to FIG. 8.

It is important that the extrudate body 16 is cut or otherwise divided through one of the intermediate sections 30. There are a number of ways in which this can be achieved. For example, the timing of the cutter (not shown) may be synchronised with the action of the die head. However, slippage and/or stretching of the belt on to which the extrudate body is extruded may give rise to problems in ensuring accurate synchronisation over a prolonged period of production. In an alternative arrangement, marks or graduations are provided on the belt. A control system uses a first camera at the die head to detect a section of the belt on which an intermediate section 30 is formed and a second camera at the cutter head used to detect when that section is located under the cutter in order to trigger actuation of the cutter.

In further alternative arrangements, a control system is used to detect the intermediate sections 30 in the extrudate body itself in order to trigger the cutter. In one system, a mark is made on the exterior of the extrudate body at or close to the die head when an intermediate section 30 is extruded and a camera or other sensor used to detect the mark at the cutter. The mark could be a partial cut through the intermediate section 30 produce at the die head. Alternatively, a control system for the trigger may use a sensor arrangement for detecting the intermediate sections 30 in the extrudate body at the cutter. This could include use of an imaging system, such as X-ray or sonar, or other arrangements for sensing the relative densities of the intermediate sections 30 and the filled sections 17 of the extrudate body 16.

The extrusion apparatus 11 will typically also comprise a control system (not shown) which may included a processer, memory and sensors for monitoring and controlling operation of the apparatus and in particular the flow of the first and/or the second food material through the die and injectors.

Where the apparatus has a flow control mechanism for pulsing the flow of the first material and in particular a flow control mechanism capable of rapidly increasing the volume of the first material supply path, the flow control mechanism could be used to divide the extrudate body as each product length is formed. In this arrangement, whilst an unfilled intermediate section of extrudate forming the second end cap 30A of a first product is being formed, the first material flow control mechanism is actuated to cause a rapid increase in the volume of the first material flow path so as to suck back the first material from the die. This will separate the first material in the die from the first product which is carried away on the belt. The first material flow control mechanism is actuated to reduce the volume of the first material flow path and re-start the flow of the first material through the die to form a further unfilled section of extrudate body which forms a first end cap 30B of the next product. The extrusion cycle then continues with a filling phase before the next unfilled section is produced to form the second end cap 30A of the next product. Once a second end cap 30A of sufficient thickness is formed, the first material flow control mechanism is actuated again to suck back the first material from the die and the process is repeated.

The extrusion apparatus may be supplied with a first material 12 which has been tempered to an extrudable consistency as described in GB 2 186 476 A entitled "Method of Tempering Edible Compositions", the entire contents of which are hereby incorporated by reference. Particularly, where the first food material is a confectionery material such as chocolate, it may be tempered to a clay-like consistency and delivered to the extrusion die under pressure in a cold extrusion process. References to "cold extrusion" and the like refer to extrusion carried out with the material at or close to room temperature opposed to "hot extrusion" in which the material is extruded at an elevated temperature.

The filled chambers 18 can be of any size. The apparatus and methods of the present invention can be used to produce products in which the diameter/width of the, or each chamber, ranges from a few micron up to several centimeters or larger. For example, in a product such as a chocolate bar having only one filled chamber, the chamber may be several centimeters in diameter/width. At the other extreme, the apparatus and methods of the present invention could be used to produce products having an inner region in which there are a large number of very small filled chambers which may take the form of capillaries. The chambers or capillaries may have diameter/width of 3 mm or less. In some embodiments, the chambers or capillaries have a diameter/width of no more than 2 mm, 1 mm, 0.5 mm, 0.25 mm or less. It is possible to have small chambers or capillaries having a diameter/width of no more than 100 μm, 50 μm or 10 μm. For this type of application, the inner part of the die may comprise a large number of very fine injector outlets positioned close together through which the second food material is introduced. This will produce an extrudate body in which there are a large number of very fine, closely packed filled chambers which will give the inner region a different texture giving rise to increased sensory pleasure for the consumer.

In a further variation, more than one filling material can be used. Different chambers can be filled with different filling materials if desired to provide a distinctive taste and texture experience for the consumer. Alternatively, the filling material may contain a mixture of two or more distinct components, which may or may not be miscible with each other. The two or more components and/or semi-solids employed in the filling composition may be included in the same or different amounts and may have similar or distinct characteristics. More specifically, in some embodiments, the two or more components may differ in a variety of characteristics, such as for example, viscosity, colour, flavour, taste, texture, sensation, ingredient components, functional components and/or sweeteners.

In one embodiment, each, or at least one, chamber is filled with a first filling material which forms a rigid porous structure and a second, flowable or liquid filling is introduced into the pores of the first filling material. The first filling material could be the same material as the first food material used for the outer casing but treated so that it forms a porous structure when it solidifies.

It should also be understood that the first material may be a mixture of two or more distinct components, which may or may not be miscible with each other. In some applications, it may be desirable to extrude two or more first materials to form the extrudate body. For example, it is known to extrude two different types of chocolate, typically white chocolate together with a milk or dark chocolate, to produce a marbled effect.

In some applications it may be desirable to be able to temporarily increase the flow of the second filling material and/or to temporarily decrease the flow of the first material in order the produce different extrusion effects. This might be used for example during the filling phase of the extrusion process to vary the cross section of the extrudate body and/or to modify the filled chambers. Those skilled in the art will appreciate that the various control arrangements described above can be modified to allow the flow of the either or both of the first and second materials to be increased and/or decreased as desired.

The methods and apparatus described above are particularly suitable for extruding chocolate bars having a liquid filling but can be adapted for extruding other confectionery or indeed non-confectionery food products with different fillings. Hard candy, chewing gum, bubble gum, toffee, chocolate, fudge, and chewy candy are all suitable materials for use as the first material when extruding confectionery products, though other confectionery materials can also be used. Suitable first materials for extruding non-confectionery food products include: cheese, dough, biscuit, pastry and pet food with fillings of soft cheese, cheese, meat, jelly, jam, fruit paste etc. It should be noted though that the methods and apparatus described herein can be adapted for co-extruding any suitable materials, not limited to food or confectionery materials, such as: plastics, polymers, rubber (natural and synthetic) and the like.

It should also be understood that many of the methods described above can be combined in different ways as required to satisfactorily extrude a filled product depending on the particular application and the nature of the materials being extruded. Similarly, it should also be understood that the various embodiments of apparatus for carrying out the methods are also only exemplary and that features described in relation to one embodiment may be combined or incorporated into other embodiments where appropriate. Thus, the foregoing embodiments are not intended to limit the scope of protection sought, but rather to describe examples as to how the invention may be put into practice. Independent patent protection may be sought for any of the aspects of the methods and apparatus disclosed herein not limited to those aspects set out in the appended claims.

The invention claimed is:

1. A method of manufacturing confectionery products, each product comprising an outer casing of a first confectionery material and containing at least one chamber filled with a second confectionery material, the method being carried out using apparatus comprising an extrusion die defining an extrusion aperture and at least one fluid outlet within the die, the apparatus defining a first material supply path along which the first material flows to the die and a second material supply path along which the second material flows to the at least one fluid outlet, the method comprising extruding the first material through the die to form an extrudate body and delivering the second material through the at least one fluid outlet in the die to form at least one chamber filled with the second material within the extrudate body, wherein the method comprises periodically and momentarily varying the extrusion process to produce a section of extrudate body having no chamber filled with the second material, in which periodically and momentarily varying the extrusion process comprises periodically and momentarily increasing the volume of the second material supply path to temporally reduce the flow of the second material into the extrudate body from the at least one fluid outlet, and is performed using at least one flexible element located upstream of the die in each of the first material supply path and the second material supply path, each flexible element comprising a tubular membrane actuated by a fluid actuation system operable to introduce or remove a hydraulic fluid within a fluid chamber to move each flexible element.

2. A method as claimed in claim 1, wherein the at least flexible element in the second material supply path is at least partially located in the second material supply path and movable between at least a first and a second position to vary the volume of the second material supply path, the arrangement being such that movement of the at least one flexible element in a direction from the first position towards the second position increases the volume of the second material supply path and that movement of the at least one flexible element in a direction from the second position towards the first position decreases the volume of the second material supply path, wherein the method comprises periodically moving the at least one flexible element in a direction from the first position towards the second position and subsequently moving the at least one flexible element in a direction from the second position towards the first position in order to periodically and momentarily reduce the flow of second material into the extrudate body through the at least one fluid outlet.

3. A method as claimed in claim 1, wherein the method comprises periodically and momentarily increasing or surging the flow of the first material through the die by periodically and momentarily decreasing the volume of the first material supply path, and wherein the at least one flexible element in the first material supply path is at least partially located in the first material supply path and movable between at least a first position and a second position to vary the volume of the first material supply path, the arrangement being such that movement of the at least one flexible element in a direction from the first position towards the second position decreases the volume of the first material supply path and that movement of the at least one flexible element in a direction from the second position towards the first position increases the volume of the first material supply path, wherein the method comprises periodically moving the at least one flexible element in a direction from the first position towards the second position and subsequently moving the at least one flexible element in a direction from the second position towards the first position in order to periodically and momentarily increase the flow of the first material through the die.

4. A method as claimed in claim 1, wherein the cross-sectional areas of the extrusion aperture and the at least one fluid outlet remain constant throughout the extrusion process.

5. A method as claimed in claim 1, comprising a second material delivery device for causing the second material to flow along second material supply path from a source to the at least one fluid outlet, wherein periodically and momentarily varying the extrusion process to produce a section of extrudate body having no chamber filled with the second material comprises operating the second material delivery device so as to cause the second material to flow along the second material supply path to the at least one fluid outlet in a pulsed flow.

6. A method as claimed in claim 1, wherein the method comprises delivering the second material through a plurality of fluid outlets within the die to form a corresponding number of chambers filled with the second material in each of the filled sections of the extrudate body.

7. A method as claimed in claim 1, wherein the method comprises producing an elongate extrudate body having filled sections containing at least one chamber filled with the second material separated by intermediate sections in which no chamber filled with the second material is defined, the method comprising dividing the elongate extrudate body into lengths, each division being made through one of the intermediate sections.

8. A method as claimed in claim 1, wherein the first material is chocolate and the second material is a liquid confectionery material.

\* \* \* \* \*

UNITED STATES PATENT AND TRADEMARK OFFICE
CERTIFICATE OF CORRECTION

PATENT NO. : 9,067,349 B2  
APPLICATION NO. : 13/580981  
DATED : June 30, 2015  
INVENTOR(S) : Haines et al.

Page 1 of 2

It is certified that error appears in the above-identified patent and that said Letters Patent is hereby corrected as shown below:

In the Specification

At column 7, line 14, the printed patent reads "...further alternatively, where..."; the patent should read --...further alternative, where...--.

At column 8, line 22, the printed patent reads "...as set out above, above including..."; the patent should read --...as set out above, including...--.

At column 14, line 64, the printed patent reads "...may comprises a first..."; the patent should read --...may comprise a first...--.

At column 22, line 56, the printed patent reads "...cross sectional through part..."; the patent should read --...cross sectional view through part...--.

At column 25, line 2, the printed patent reads "...is surround by continuous..."; the patent should read --...is surrounded by continuous...--.

At column 38, line 15, the printed patent reads "...provided were the push rod..."; the patent should read --...provided where the push rod...--.

At column 38, line 21, the printed patent reads "...between then barrel 120..."; the patent should read --...between the barrel 120...--.

At column 45, line 9, the printed patent reads "...stopped or reduce too far..."; the patent should read --...stopped or reduced too far...--.

At column 46, line 8, the printed patent reads "...arrangement sown in FIG. 23..."; the patent should read --...arrangement shown in FIG. 23...--.

Signed and Sealed this  
Twelfth Day of April, 2016

Michelle K. Lee  
*Director of the United States Patent and Trademark Office*

CERTIFICATE OF CORRECTION (continued)
U.S. Pat. No. 9,067,349 B2

In the Specification

At column 47, line 36, the printed patent reads "...276 of the should defines..."; the patent should read --...276 of the shroud defines...--.